(12) United States Patent
Black et al.

(10) Patent No.: US 10,380,772 B2
(45) Date of Patent: Aug. 13, 2019

(54) SYSTEM AND METHOD FOR NON-LINEAR AND DISCONTINUOUS PROJECT TIMELINES

(71) Applicants: Safford T Black, Highlands Ranch, CO (US); James L Black, Centennial, CO (US); Nathan W Black, Kansas City, MO (US)

(72) Inventors: Safford T Black, Highlands Ranch, CO (US); James L Black, Centennial, CO (US); Nathan W Black, Kansas City, MO (US)

( * ) Notice: Subject to any disclaimer, the term of this patent is extended or adjusted under 35 U.S.C. 154(b) by 32 days.

(21) Appl. No.: 15/797,327

(22) Filed: Oct. 30, 2017

(65) Prior Publication Data

US 2019/0130611 A1    May 2, 2019

(51) Int. Cl.
*G06T 11/20* (2006.01)
*G06Q 10/10* (2012.01)
*G06Q 10/06* (2012.01)

(52) U.S. Cl.
CPC ........ *G06T 11/206* (2013.01); *G06Q 10/0631* (2013.01); *G06Q 10/0633* (2013.01); *G06Q 10/103* (2013.01); *G06Q 10/1093* (2013.01)

(58) Field of Classification Search
CPC .............. G06F 3/0482; G06F 3/04847; G06F 3/04842; G06F 3/0484; G06F 16/248; G06F 3/0481; G06F 16/9038; G06F 16/2477; G06F 16/24542; G06F 16/24564; G06F 2203/04806; G06F 16/447; H04L 41/22; G06T 11/206; G06T 2200/24; G06T 3/40; G06T 11/60; G06Q 10/0637; G06Q 10/10; G06Q 10/103; G06Q 10/00; G06Q 10/06; G06Q 10/06311; G06Q 10/063114; G06Q 10/06313; G06Q 10/06314; G06Q 10/109; G06Q 10/1097
See application file for complete search history.

(56) References Cited

U.S. PATENT DOCUMENTS

2015/0253967 A1*  9/2015  De ..................... G06F 3/04845
                                                     715/771
2018/0095938 A1*  4/2018  Monte .................. G06F 3/0488

* cited by examiner

*Primary Examiner* — Xiao M Wu
*Assistant Examiner* — Scott E Sonners

(57) ABSTRACT

A computer-implemented system that transforms one or more project plans to create a graphical project view. The project view contains a set of markers along a time axis, and one or more time axis rules which define the appearance of discontinuous timespans, non-linear timespans, or both along the time axis. Once created, users may alter its appearance by adding, removing, or changing the time axis rules to modify the set of timespans along the time axis. Timespan adjustment also causes markers to shift horizontally and adjust their widths so that the dates on the time axis always align with the dates of the markers. The system also can create templates containing time axis rules and other settings, but no markers. Templates are used to create new project views from different project plans, while maintaining the same time axis geometry.

16 Claims, 45 Drawing Sheets

| Event ID | Event Name | StartTime | FinishTime | % Complete |
|---|---|---|---|---|
| 1 | Foxtrot | 6/29/17 12:00:00 AM | 7/3/17 11:59:59 PM | 50% |
| 2 | Golf | 6/1/17 12:00:00 AM | 6/19/17 11:59:59 PM | 100% |
| 3 | Hotel | 6/15/17 12:00:00 AM | 6/20/17 11:59:59 PM | 100% |
| 4 | India | 6/21/17 12:00:00 AM | 6/30/17 11:59:59 PM | 75% |
| 5 | Juliet | 6/23/17 12:00:00 AM | 6/28/17 11:59:59 PM | 25% |

FIG. 27

SYSTEM AND METHOD FOR NON-LINEAR AND DISCONTINUOUS PROJECT TIMELINES

BACKGROUND OF THE INVENTION (a) Field of the Invention

This invention pertains to a computer-implemented system that creates visual project reports where sets of tasks and milestones appear along a time axis that can contain non-linear or discontinuous timespans.

(b) Discussion of Prior Art

Project management is as much about communication as it is execution, but projects by their very nature are complex, which makes it difficult to effectively communicate the big picture to stakeholders or executives.

Commercially-available project management software such as MICROSOFT® Project or ORACLE® PRIMAVERA® P6® focus on the management of project details, but do a rudimentary job of creating visual reports that are concise and are easy for laypeople to understand. One of the reasons that project details are often difficult to understand is the fact that traditional project reports have a linear time axis and show all elapsed time between when a project begins and when it ends. In many cases, people's understanding can be improved by zooming in on a particular subset of time between a project's overall Start and Finish Times. For example, in a project that spans 2017-2020, it may be more efficient to enlarge the 2017 portion of the report relative to 2018-2020, thereby focusing people's attention on the near-term project deliverables.

On a related note, people's understanding can also be improved by completely eliminating sections of time from the time axis that are not relevant to the overall execution of the project. For example, project work usually does not take place on weekends, so eliminating non-working weekends from a project report will allow people to focus their attention on the scheduled working time that remains visible in the project report.

The concept of a time axis that is non-linear or discontinuous has addressed similar problems in other fields such as document management (U.S. Pat. No. 8,812,123), collaborative storytelling (U.S. Pat. No. 8,566,348), and temporal-spatial visualization (U.S. Pat. Nos. 8,966,398, 7,688,322).

Non-linear and discontinuous time axes have never been applied by a project management software application in a rules-based or a drag-and-drop manner. As a result, creating project reports on anything other than a continuous, linear time axis has been a largely manual, non-standard, and inflexible process.

DRAWINGS

Figure 2:
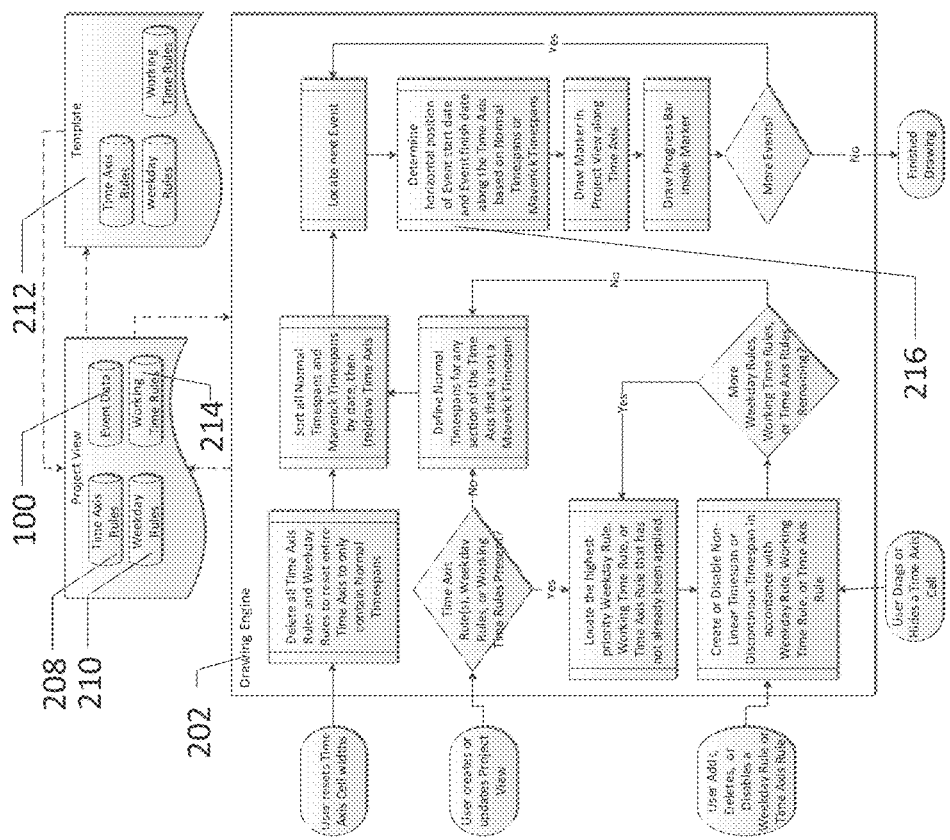

FIG. 2 shows the process for illustrating Event Data by drawing Markers in a new Project View along a Time Axis based on the Data Attributes for each Event in the Event Data and upon Time Axis Rules, Weekday Rules, and Working Time Rules from a Template according to an embodiment of the present invention. In this figure, solid lines show the flow of control, whereas dashed lines show the flow of data.

Figure 1:
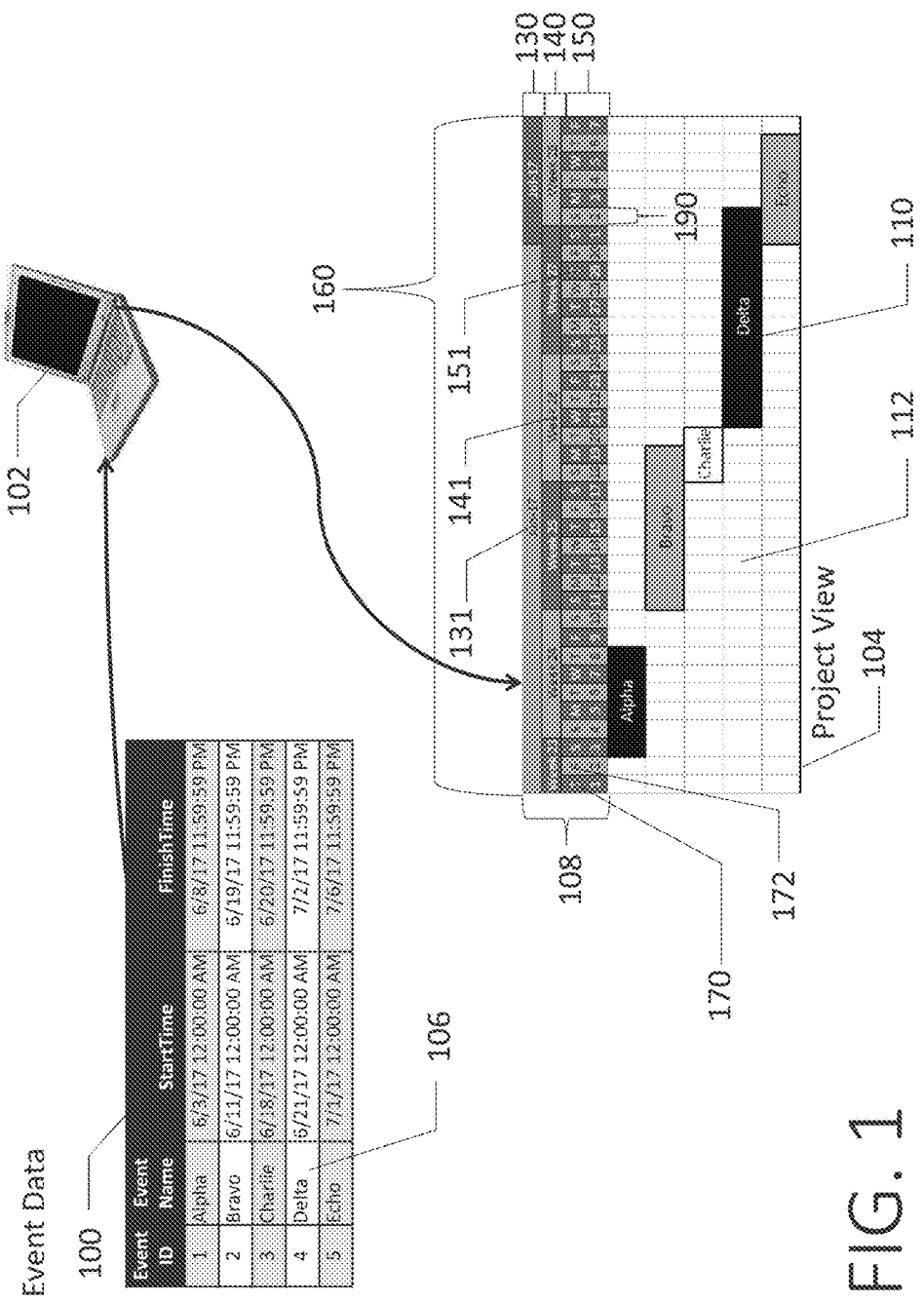
FIG. 1 shows a high-level overview of the computer-driven process, which transforms Event Data into a Project View in which Markers are displayed along a Time Axis according to an embodiment of the present invention.
Figure 2A:
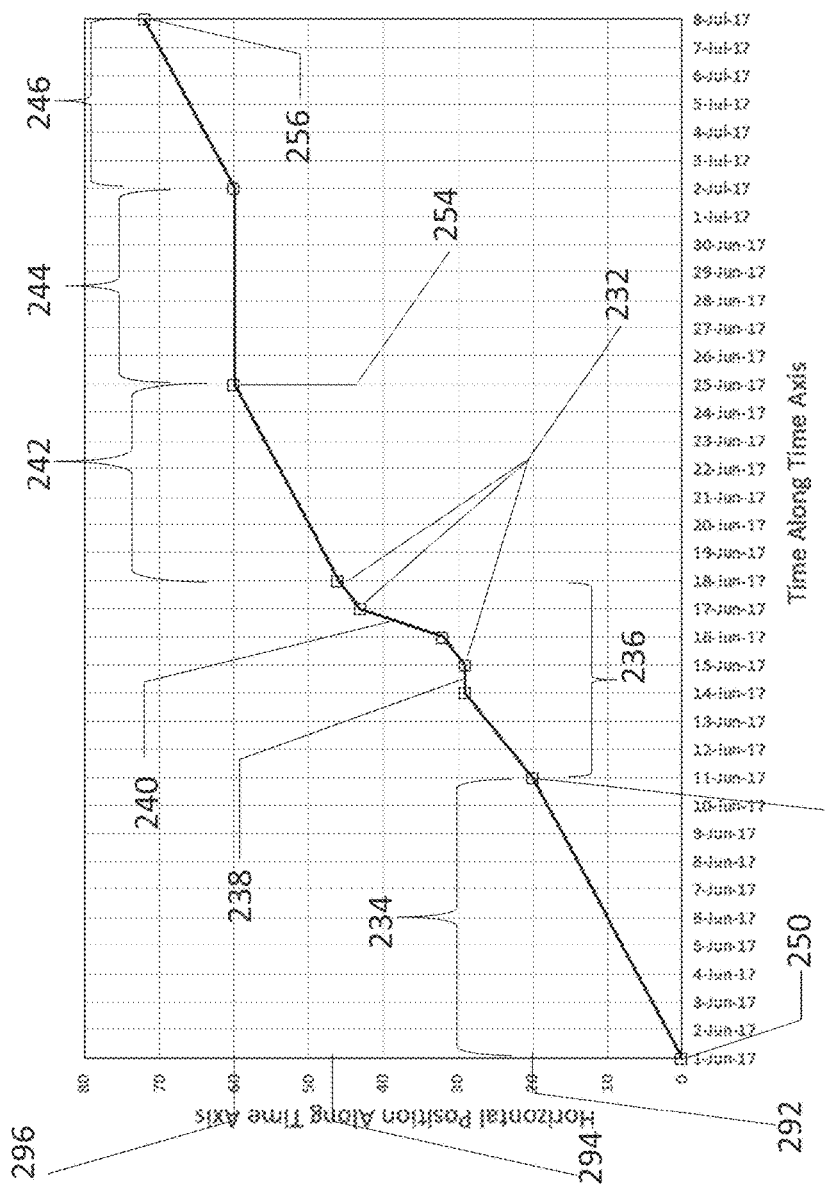

FIG. 2A shows two examples of a Sampled Time-Space Function that implements a set of Time Axis Rules, Weekday Rules, and Working Time Rules by mapping each of a Time Node to a horizontal position measured from the left edge of a Time Axis. The two examples of Sampled Time-Space Functions shown here correspond to the Time Axis configurations of FIG. 1 (diamonds) and FIG. 15 (squares).

Figure 2B:
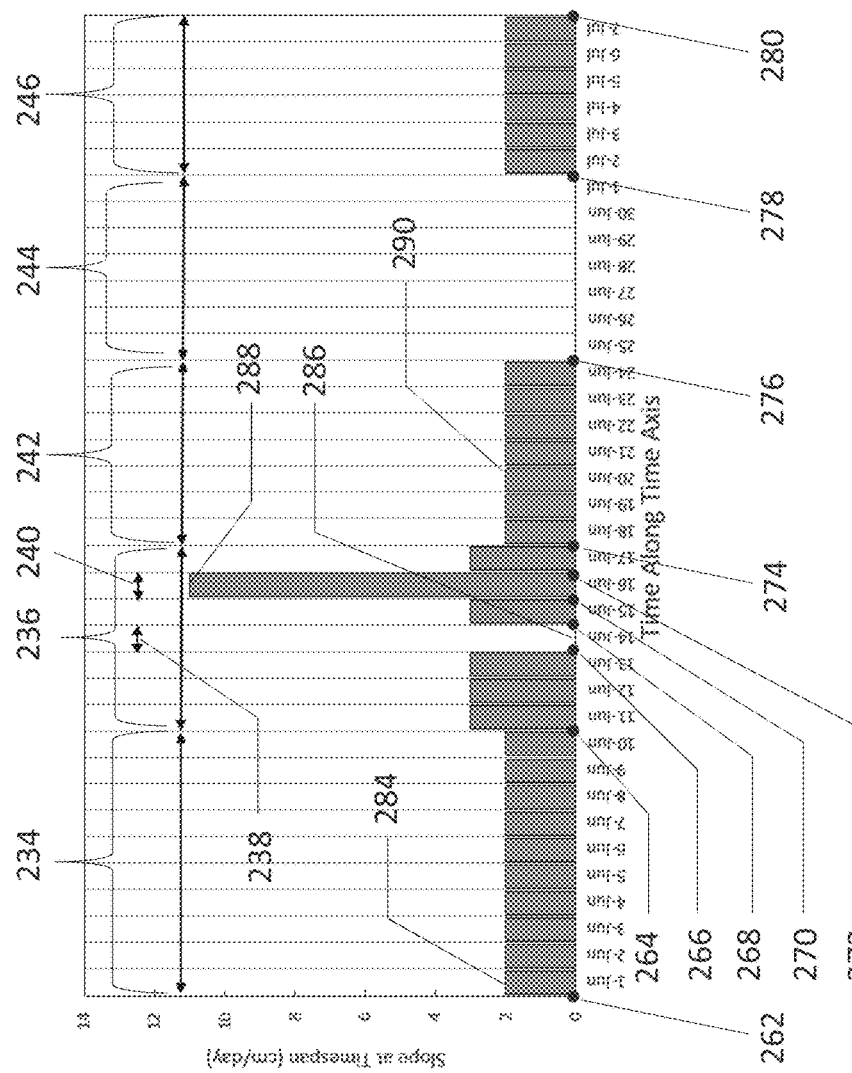

FIG. 2B shows the Timespans, Time Nodes and Time Slopes of a Sampled Time-Space Function that implements a set of Time Axis Rules, Weekday Rules, and Working Time Rules by mapping each of a Time Node to a horizontal position measured from the left edge of a Time Axis. The Time Nodes shown here are for the Sampled Time-Space Function of FIG. 15 (squares).

Figure 3:
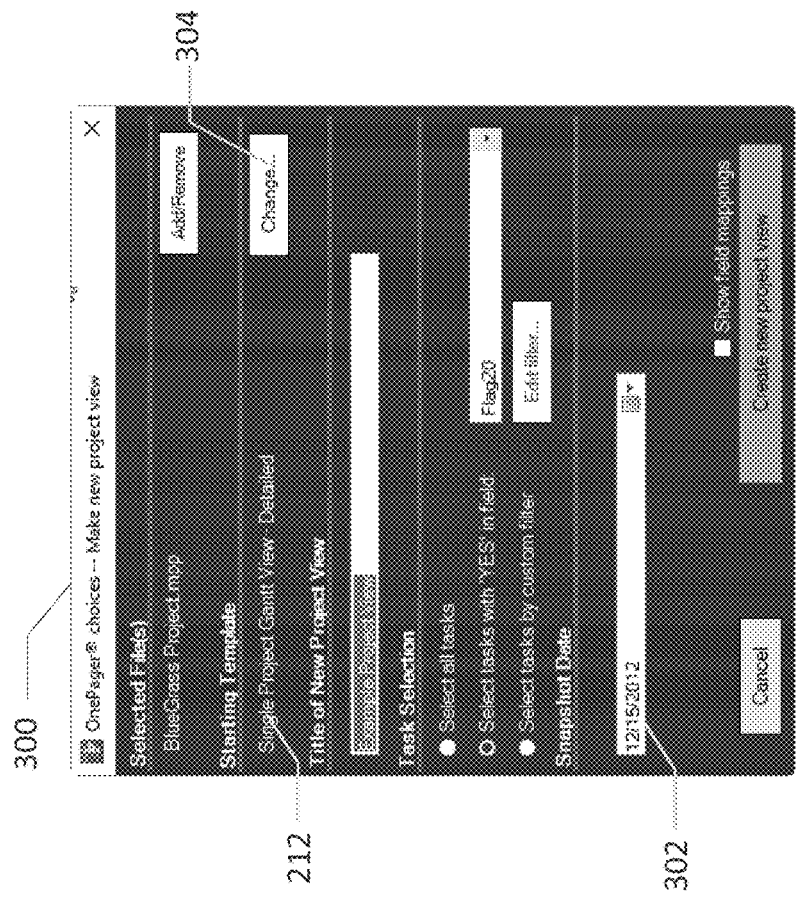

FIG. 3 shows a form method to create a new Project View from Event Data according to an embodiment of the present invention.

Figure 4:
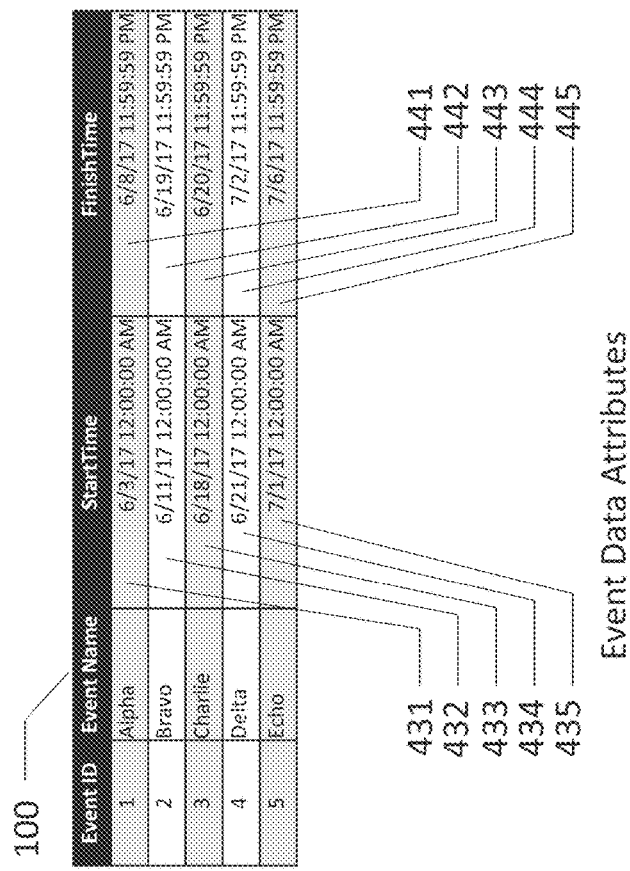

FIG. 4 shows Data Attributes for an Event according to an embodiment of the present invention.

Figure 5:
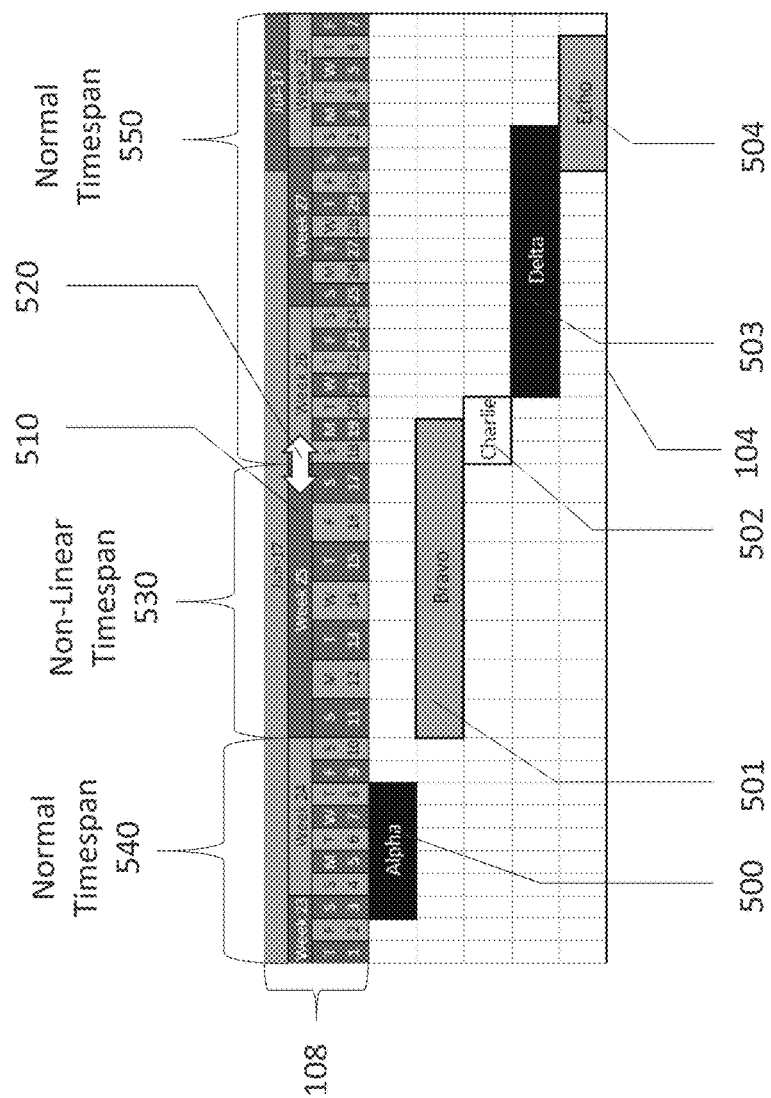

FIG. 5 shows an example Project View according to an embodiment of the present invention with a set of Markers along a Time Axis. The Time Axis consists of both Normal Timespans and Non-Linear Timespans. A user is using the Cursor Control Device to expand the width of a weekly Time Axis Cell along the Time Axis, thereby causing all of the daily Time Axis Cells underneath it to expand proportionally.

Figure 6:
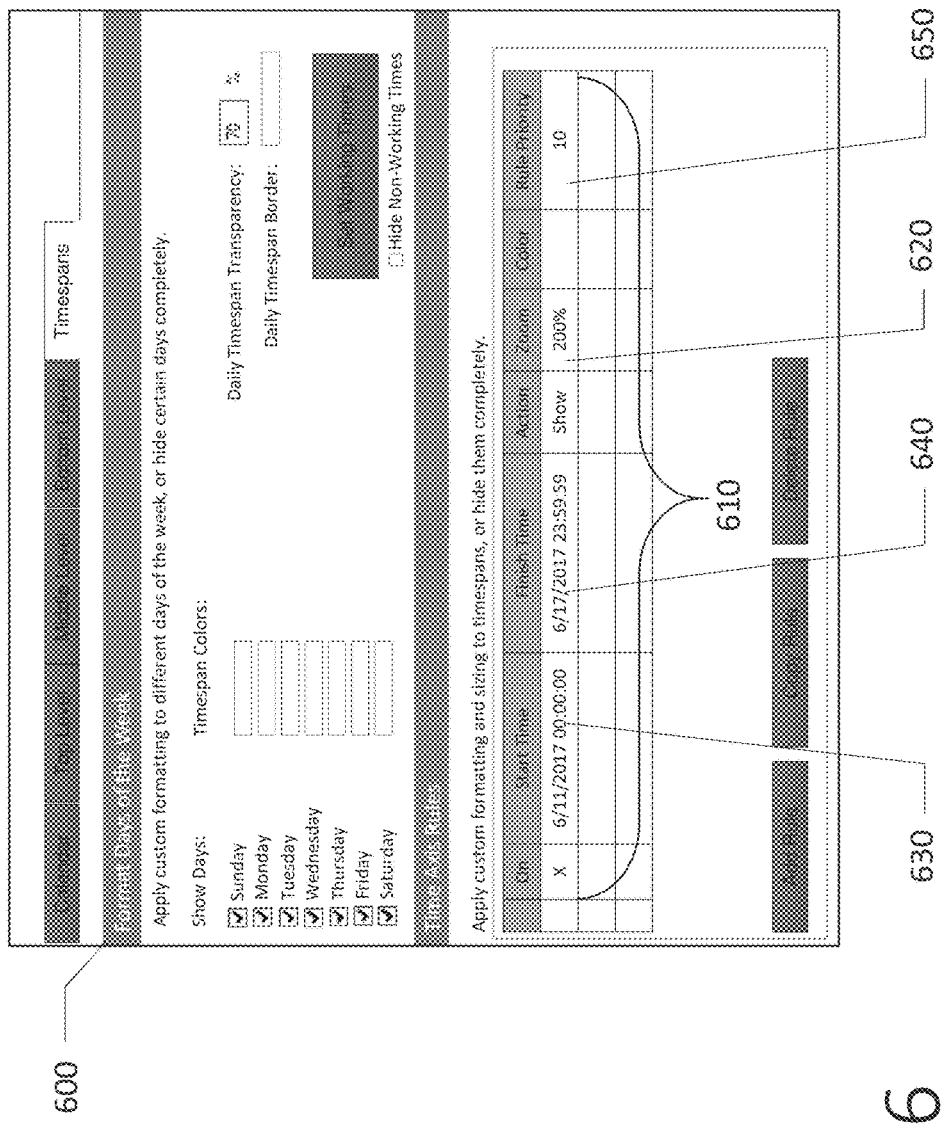

FIG. 6 depicts a Time Axis Configuration Screen where an embodiment of the present invention has added a Time Axis Rule, reflecting the user's stretch of a week's worth of time by a Zoom Factor of 200% in the previous FIG. 5.

Figure 7:
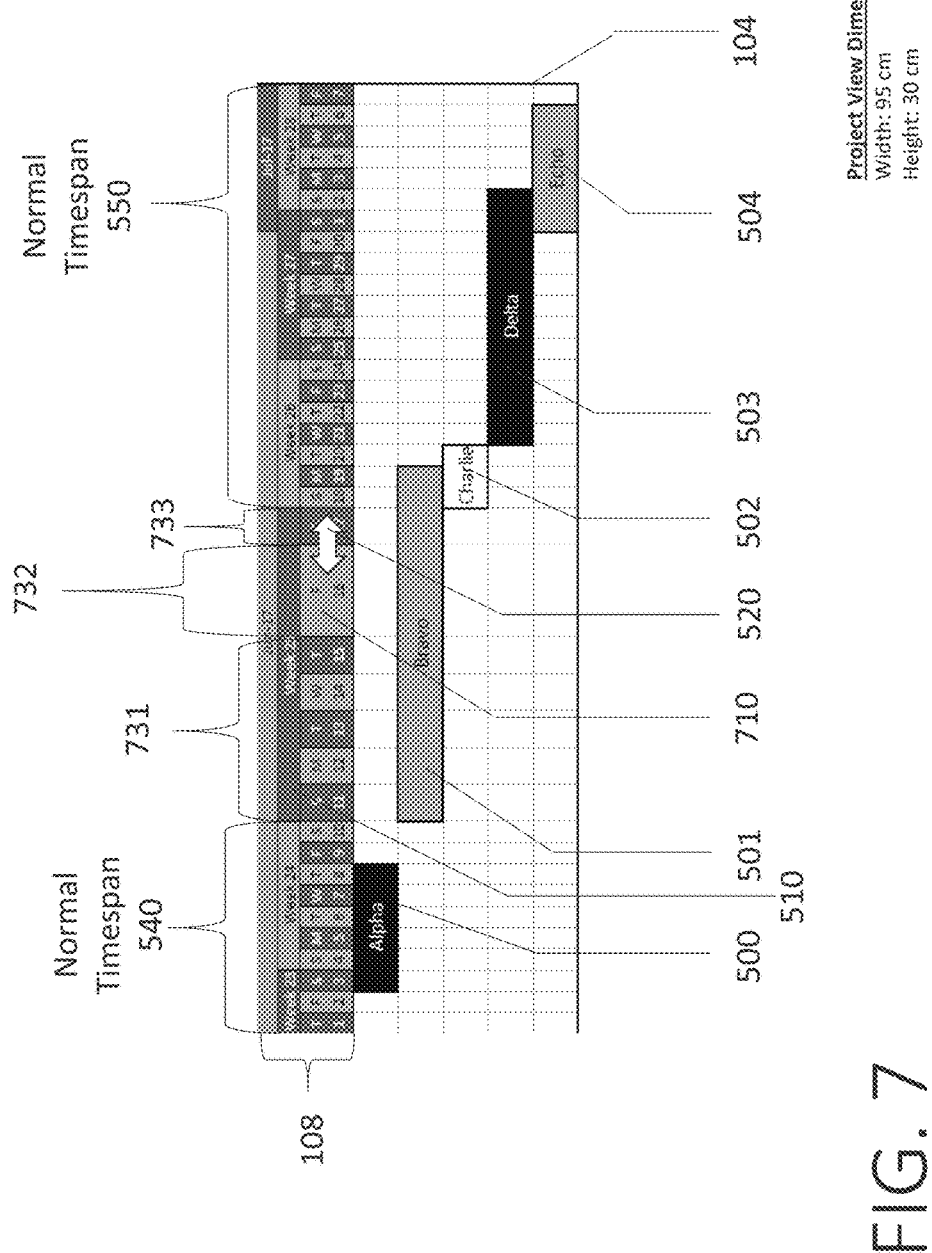

FIG. 7 depicts how the user may further stretch the Time Axis by expanding a daily Time Axis Cell, therefore creating an additional Non-Linear Timespan for the affected Time Axis Cell in an embodiment of the present invention.

Figure 8:
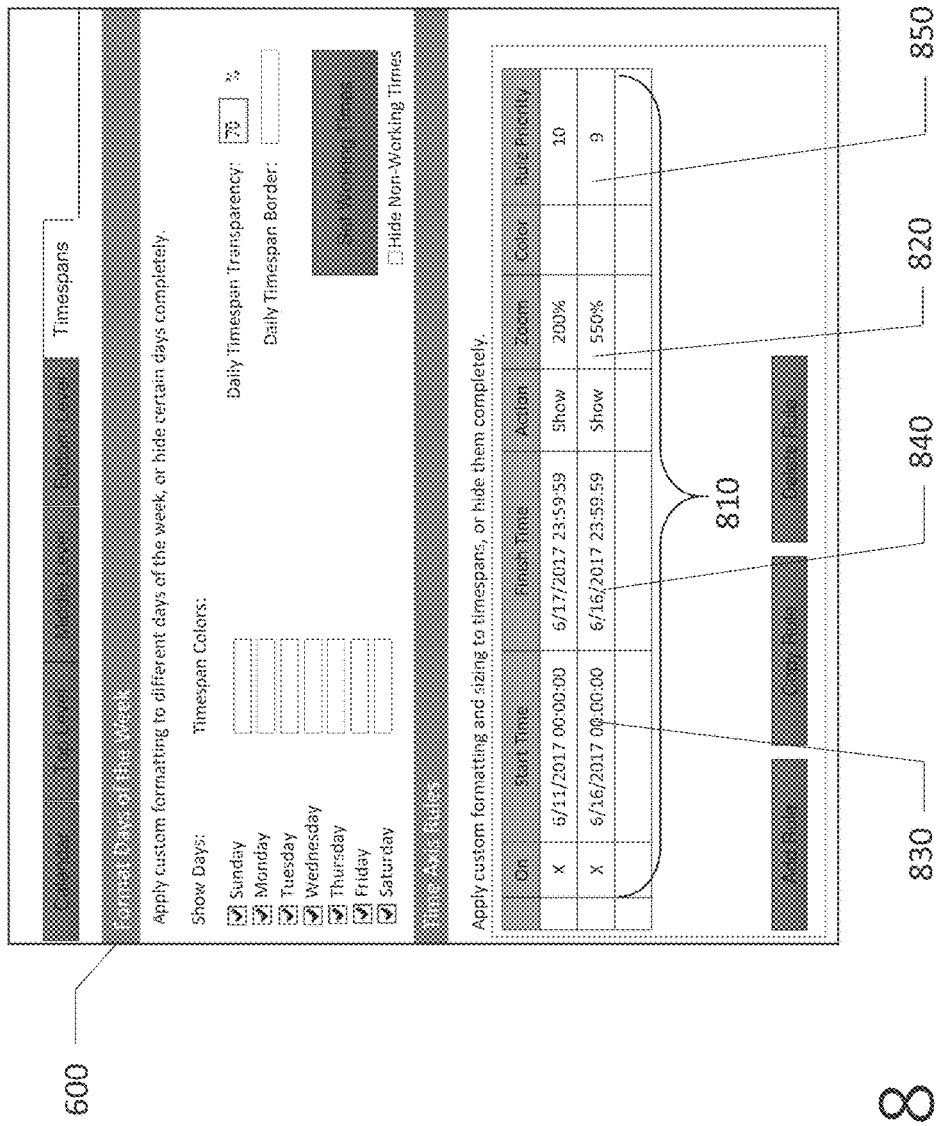

FIG. 8 depicts the Time Axis Configuration Screen again, reflecting the addition of a second Time Axis Rule corresponding to the resizing of the daily Time Axis Cell in the previous FIG. 7.

Figure 9:
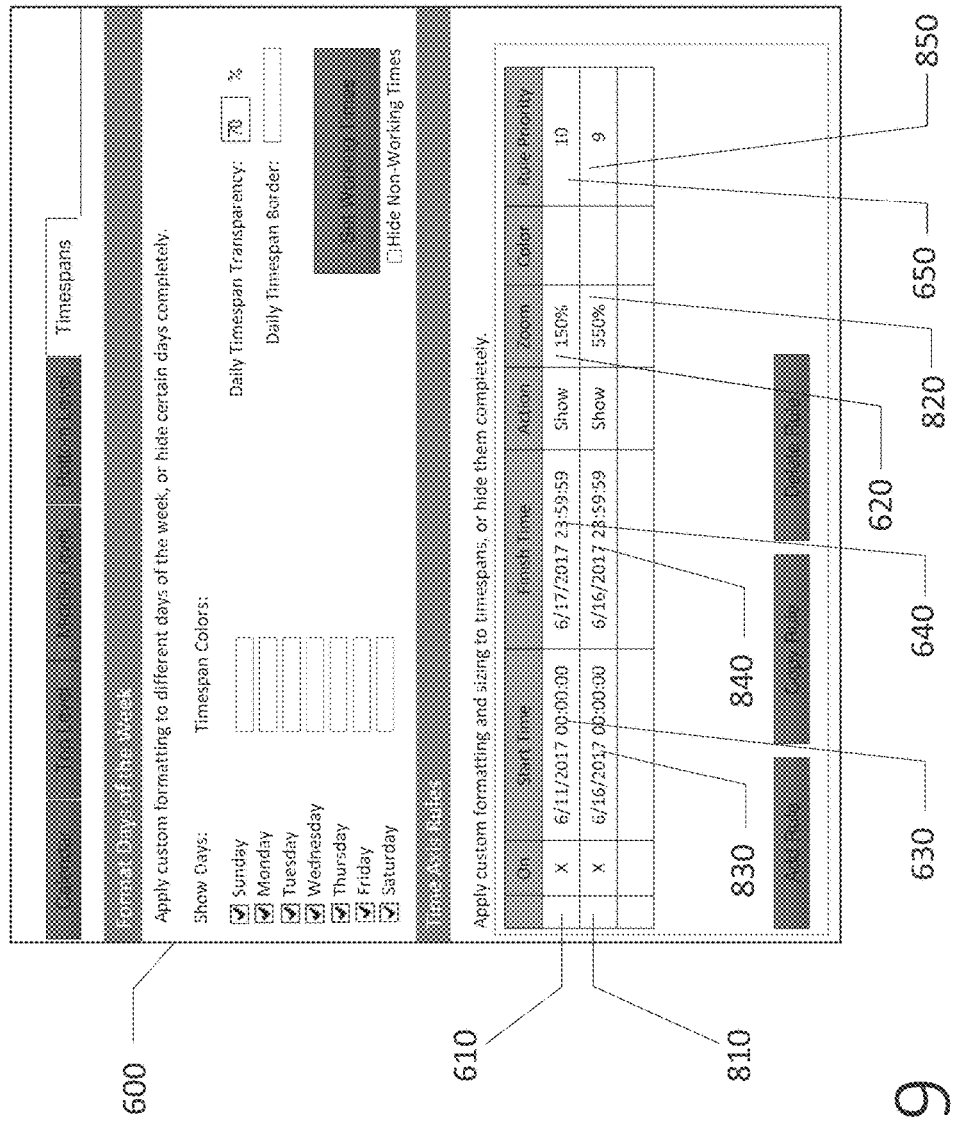

FIG. 9 is an embodiment of the present invention showing how the user can adjust the Zoom Factor for the first Time Axis Rule in the Time Axis Configuration Screen.

Figure 10:
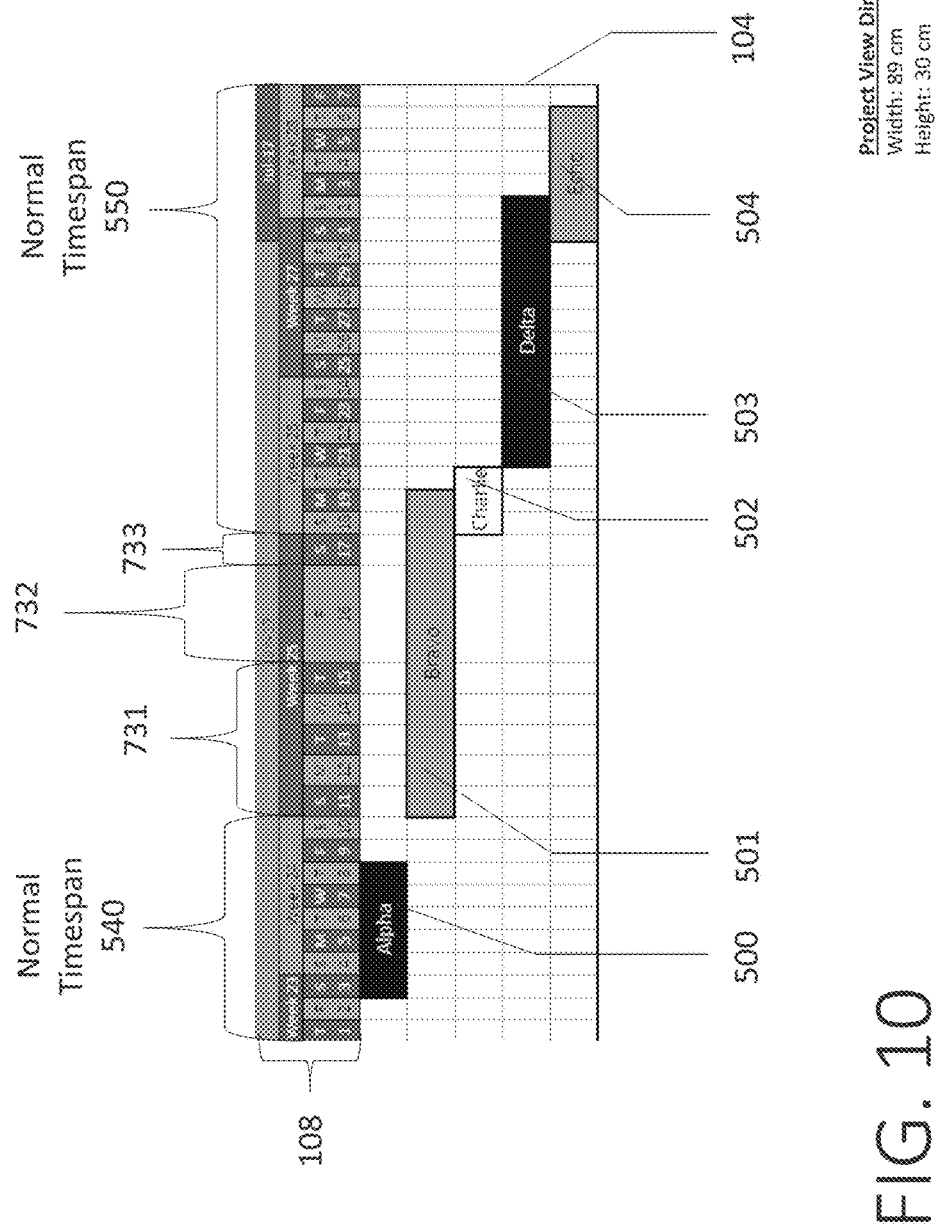

FIG. 10 illustrates how the Non-Linear Timespans associated with the first Time Axis Rule from FIG. 9. are reduced to accommodate the change in Zoom Factor from 200% to 150%.

Figure 11:
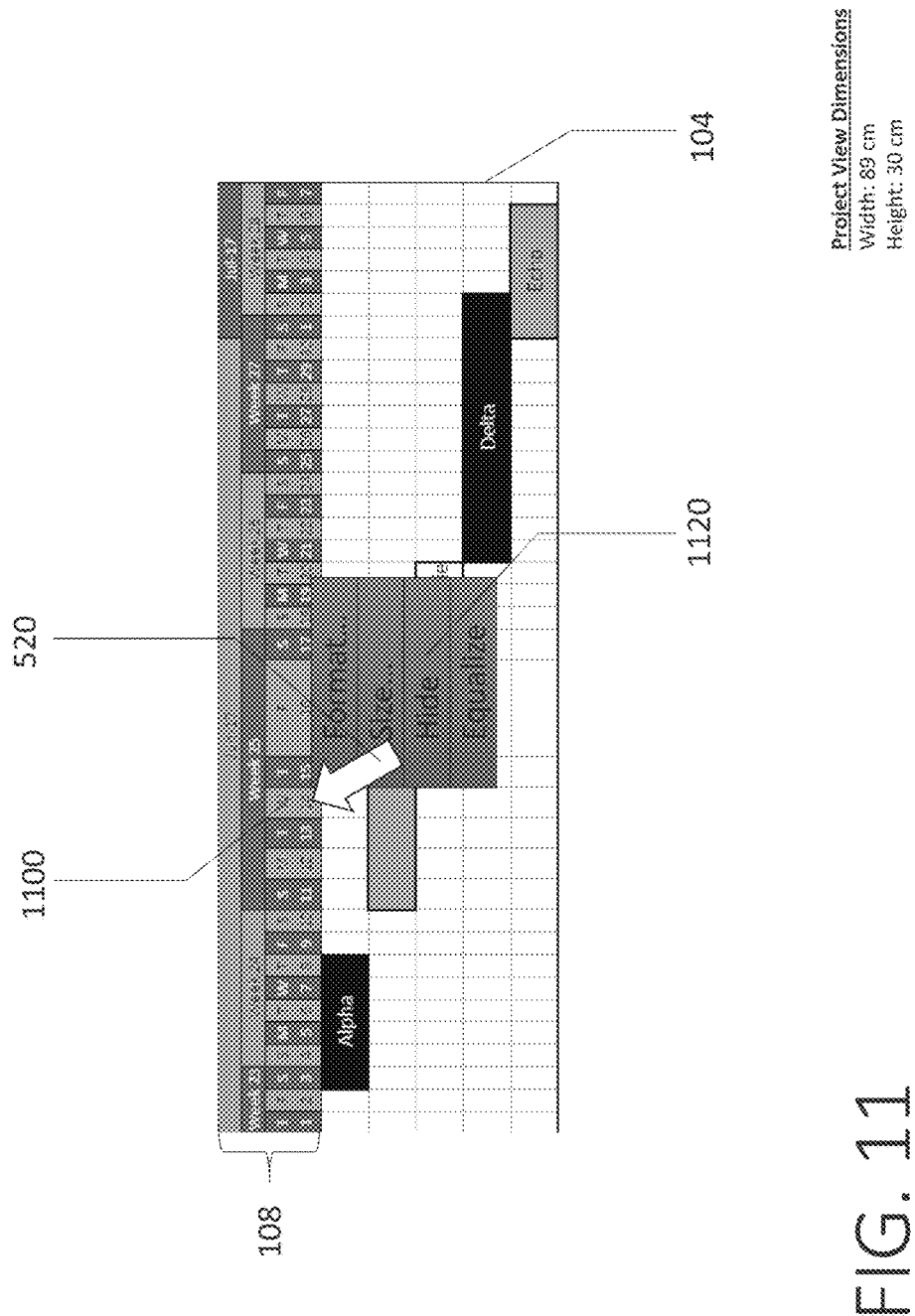

FIG. 11 shows how the user can right-click the Cursor Control Device (mouse), and choose a Hide option from a Context Menu to hide a specific daily (Jun. 14, 2017) Time Axis Cell from the Time Axis.

Figure 12:
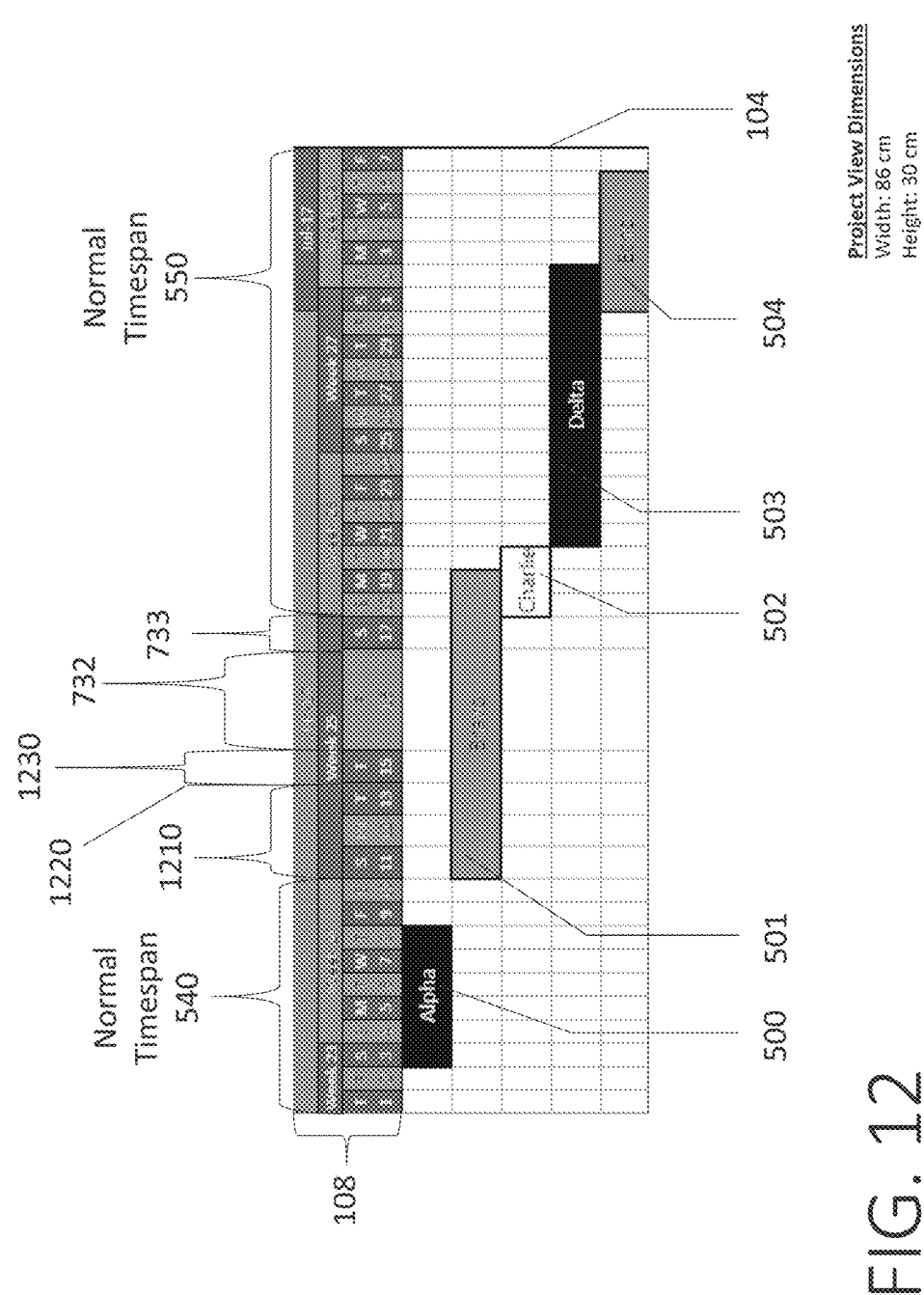

FIG. 12 shows the result of the hide operation in FIG. 11, as the Time Axis Cell corresponding to Wednesday, Jun. 14, 2017 is now missing from the Time Axis and is represented as a Discontinuous Timespan.

Figure 13:
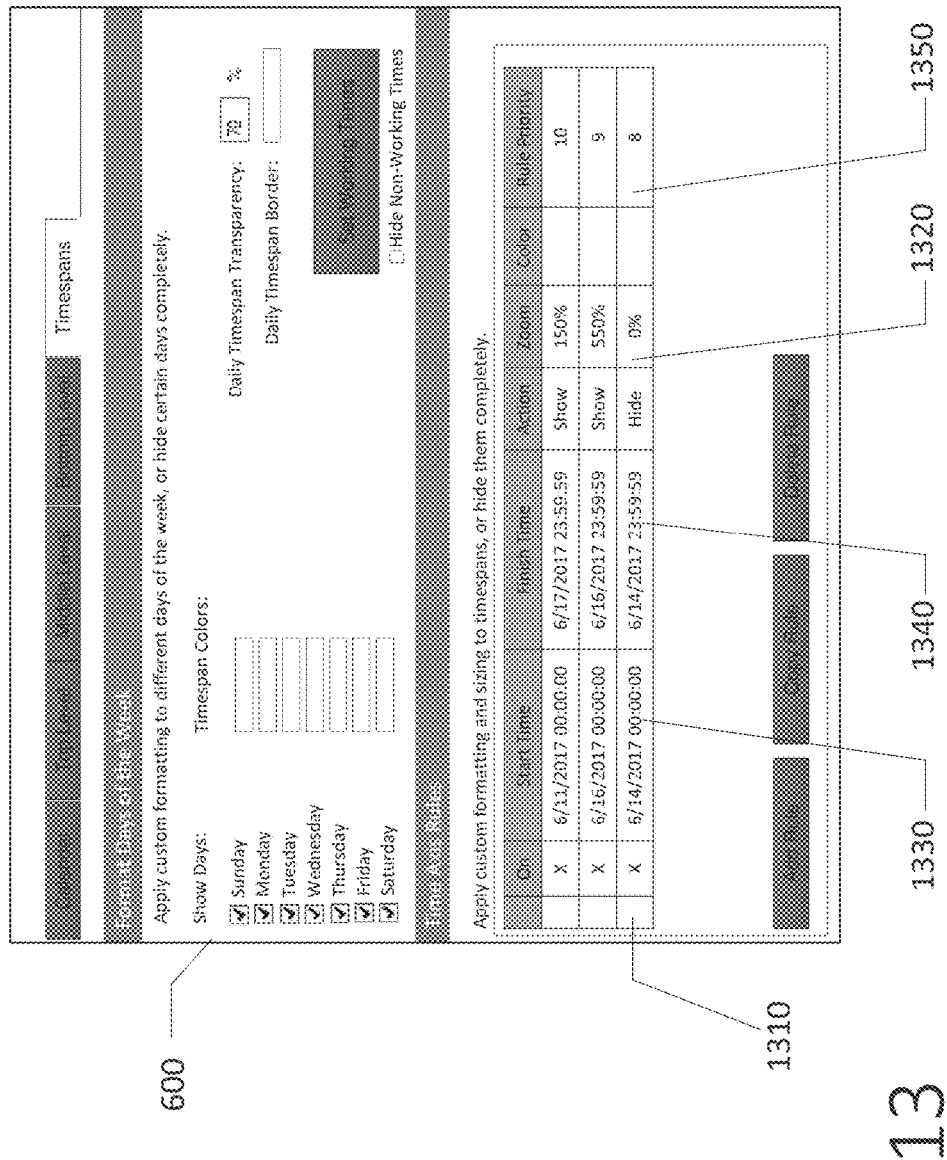

FIG. 13 shows the Time Axis Configuration Screen with the addition of a third Time Axis rule which corresponds to the hiding of the Time Axis Cell for Jun. 14, 2017 in the previous two FIG. 11 and FIG. 12.

Figure 14:
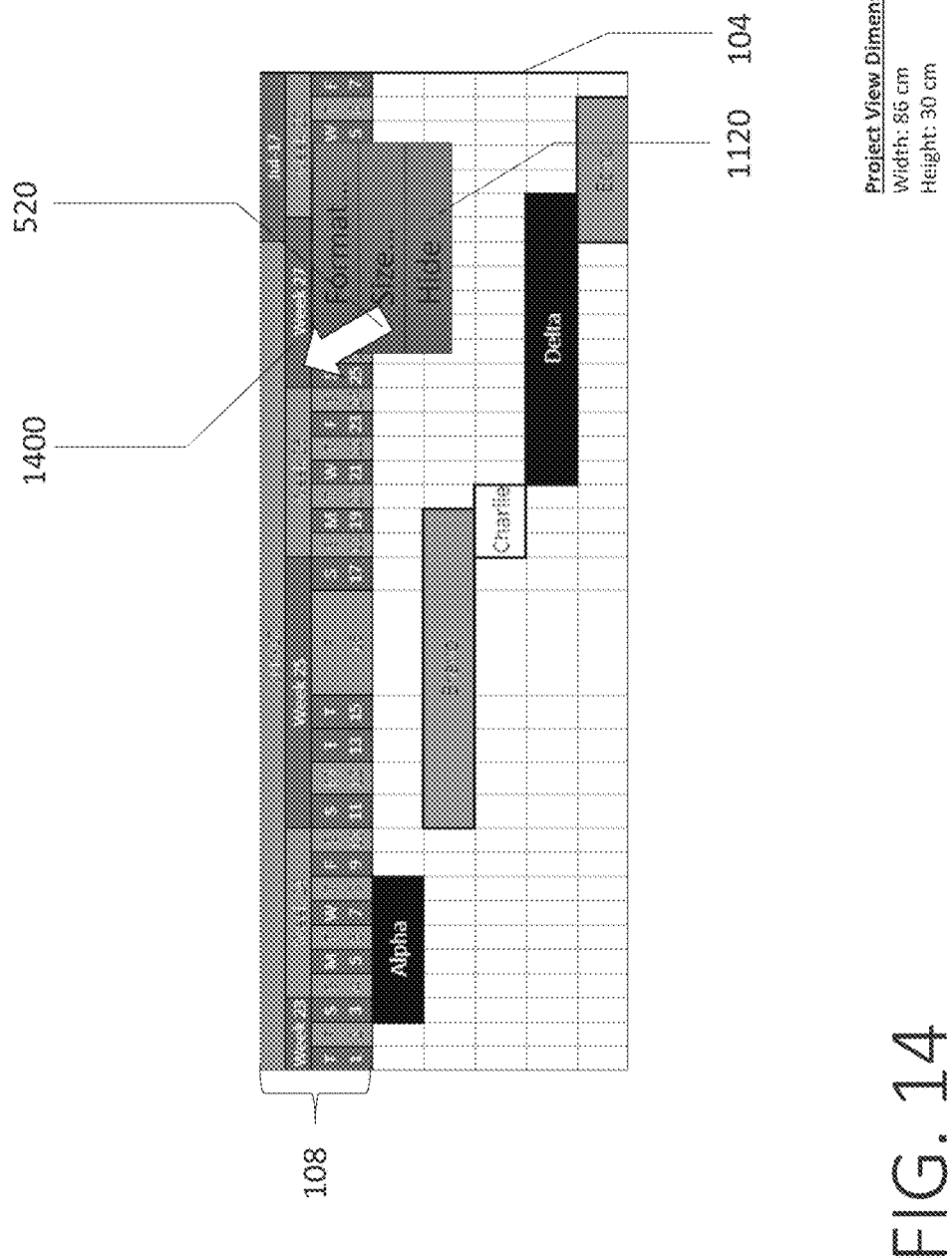

FIG. 14 shows how the user can right-click the Cursor Control Device (mouse), and choose a Hide option from a Context Menu to hide a specific weekly Time Axis Cell ("Week 27") from the Time Axis.

Figure 15:
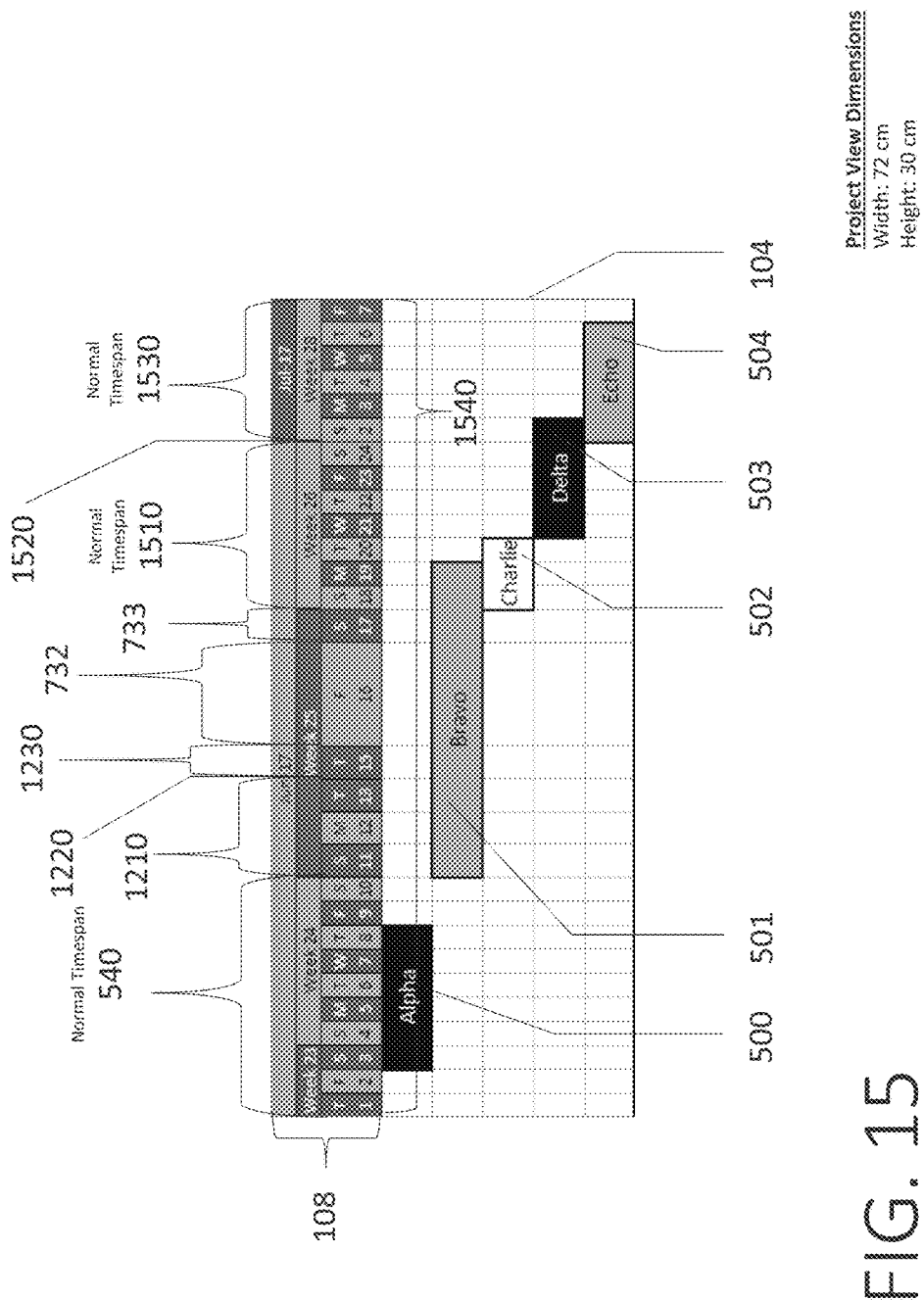

FIG. 15 shows the Project View with the Time Axis missing "Week 27", and a Discontinuous Timespan in its place due to the week being hidden.

Figure 16:
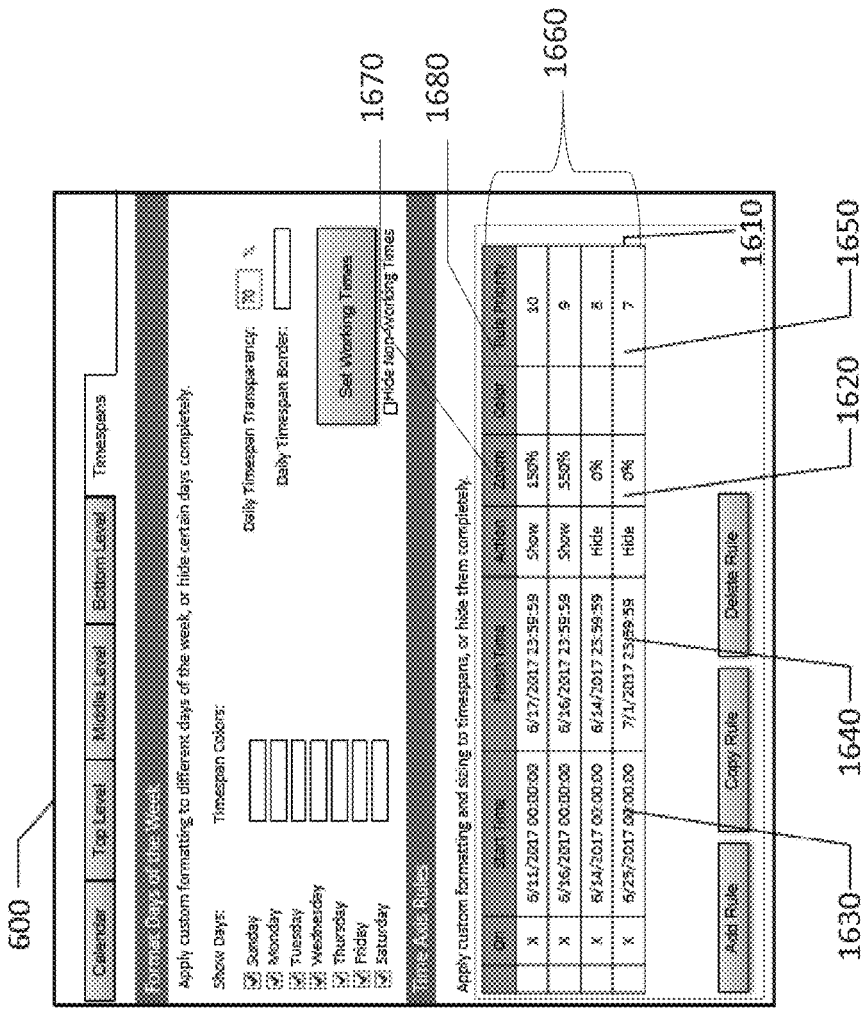

FIG. 16 shows the Time Axis Configuration Screen with the addition of a fourth Time Axis rule which corresponds to the hiding of the Time Axis Cell for the week beginning on Jun. 25, 2017 and ending on Jul. 1, 2017 in the previous two FIG. 14 and FIG. 15.

Figure 17:
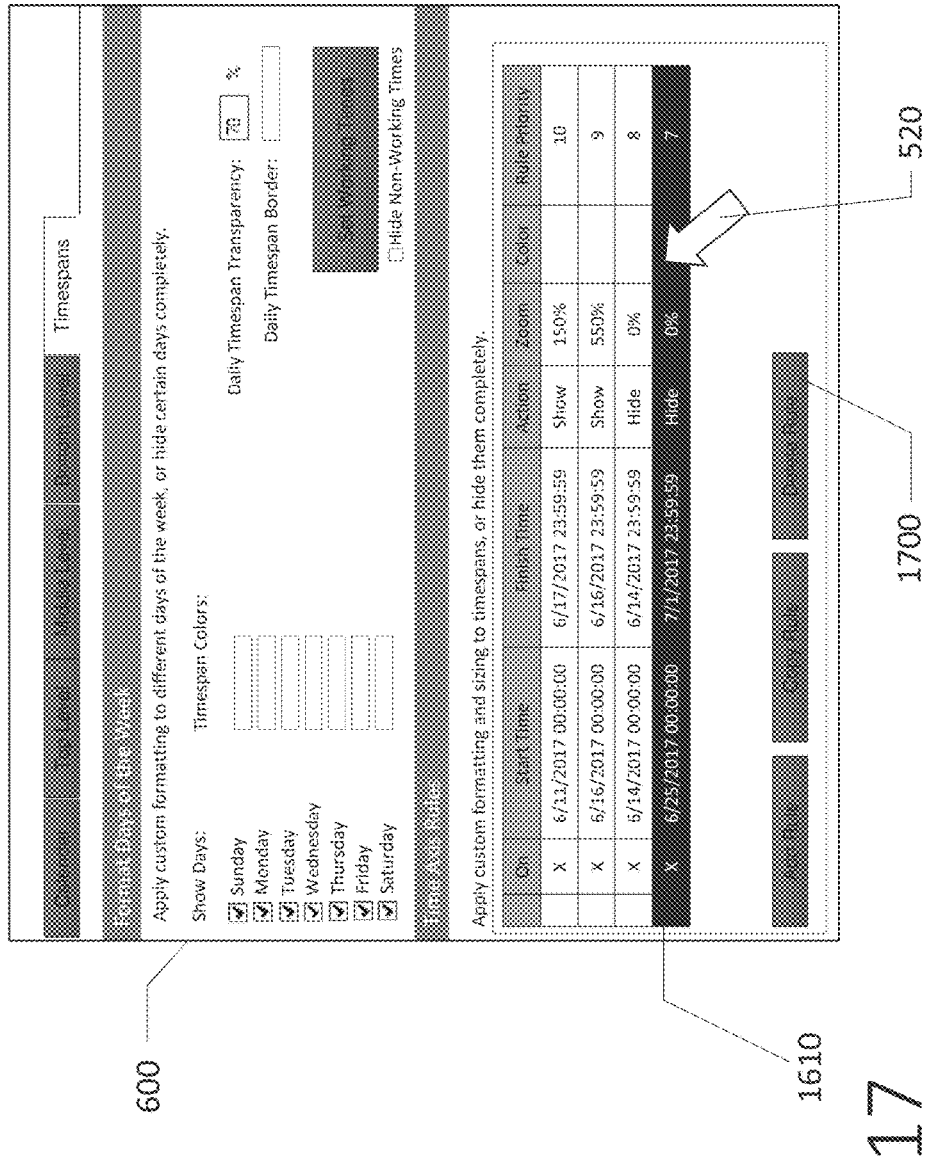

FIG. 17 shows how the user can delete one or more Time Axis Rules from the Time Axis Configuration Screen. In this case, the fourth Time Axis Rule is being deleted.

Figure 18:
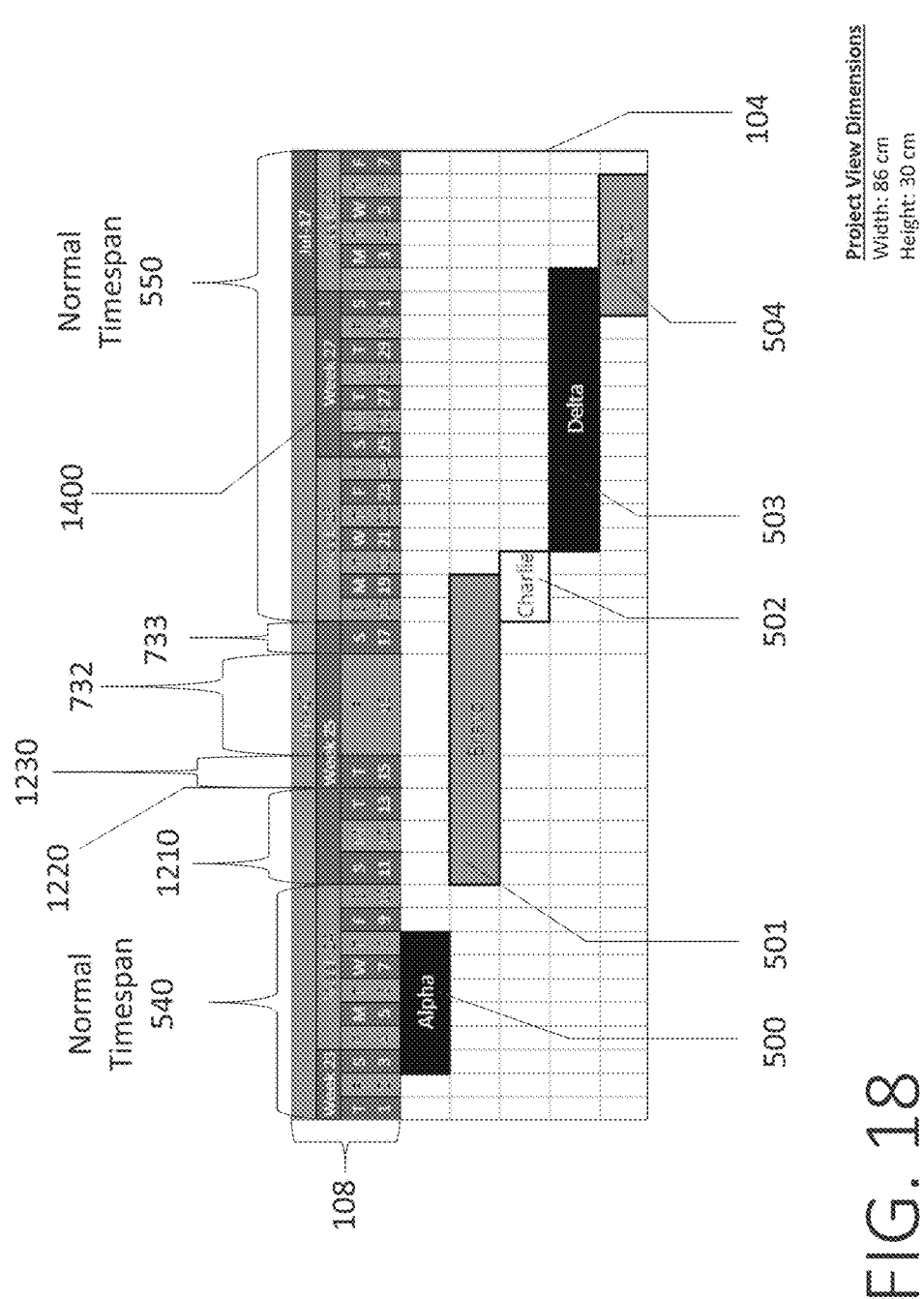

FIG. 18 shows the Project View redrawn and the Time Axis unhiding "Week 27" as a result of the fourth Time Axis Rule and corresponding Discontinuous Timespan being deleted.

Figure 19:
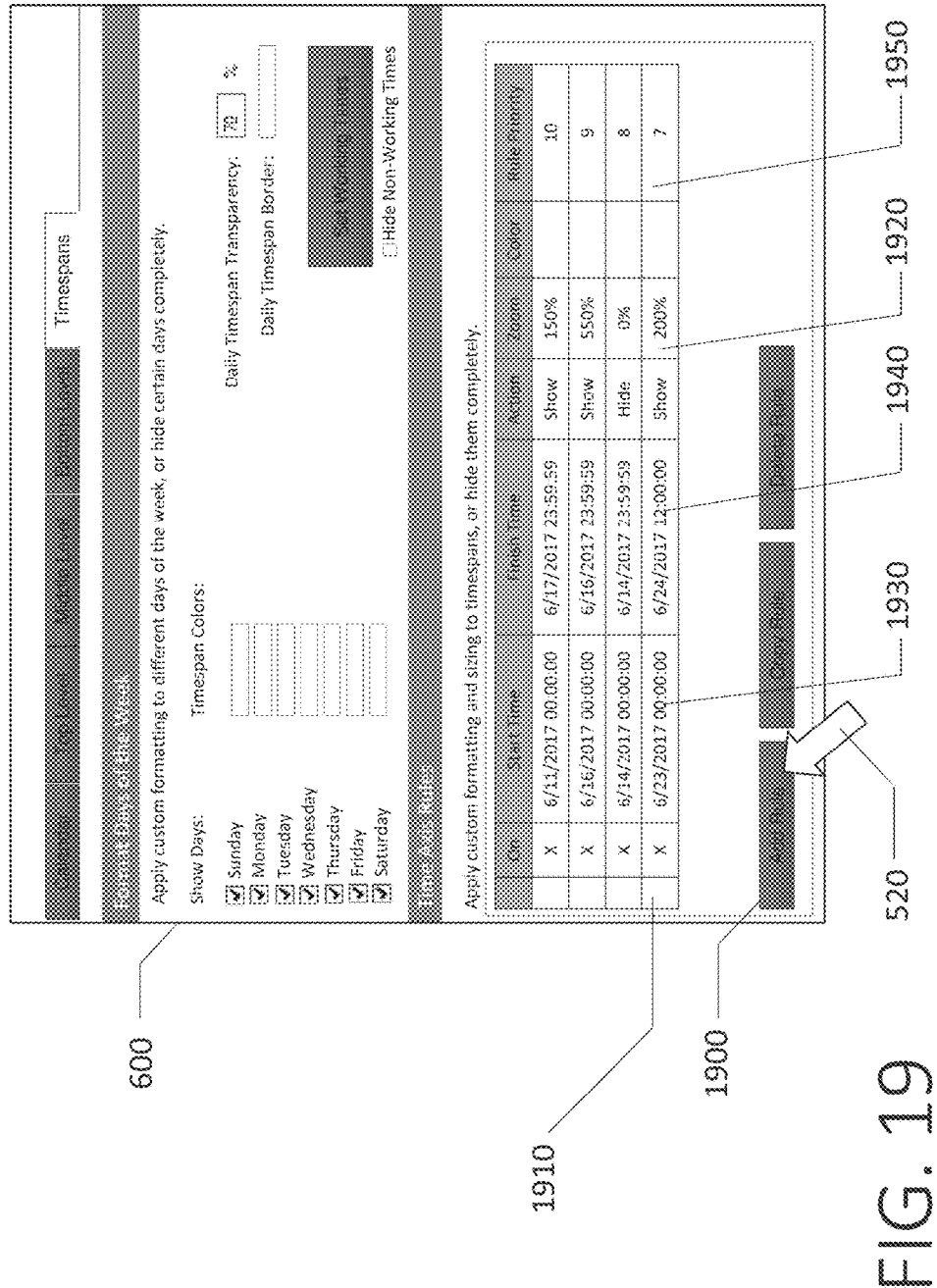

FIG. 19 shows how the user can add a fourth Time Axis Rule through the Time Axis Configuration Screen. This fourth Time Axis Rule stretches a 36-hour Timespan by a Zoom Factor of 200%.

Figure 20:
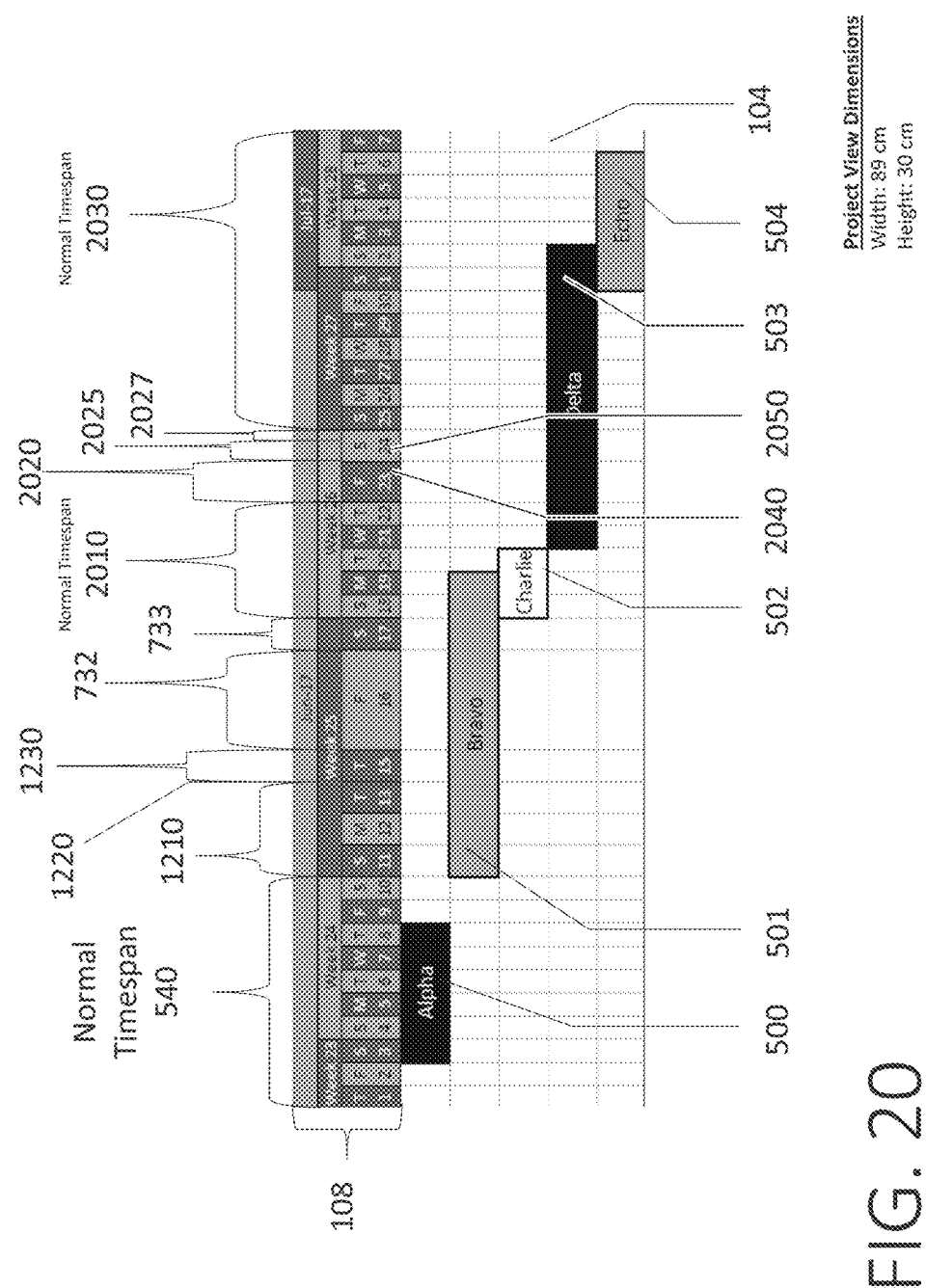

FIG. 20 indicates how the Time Axis is redrawn to reflect the stretched 36-hour Timespan that was created as a result of the fourth Time Axis Rule in FIG. 19. The first Time Axis Cell affected by the Time Axis Rule is stretched by 200%, while the second Time Axis Cell is stretched by 200% only for the first twelve hours. The second twelve hours of the second Time Axis Cell remain at 100%, due to the overall duration of the Time Axis Rule being 36 hours, not 48 hours.

Figure 21:
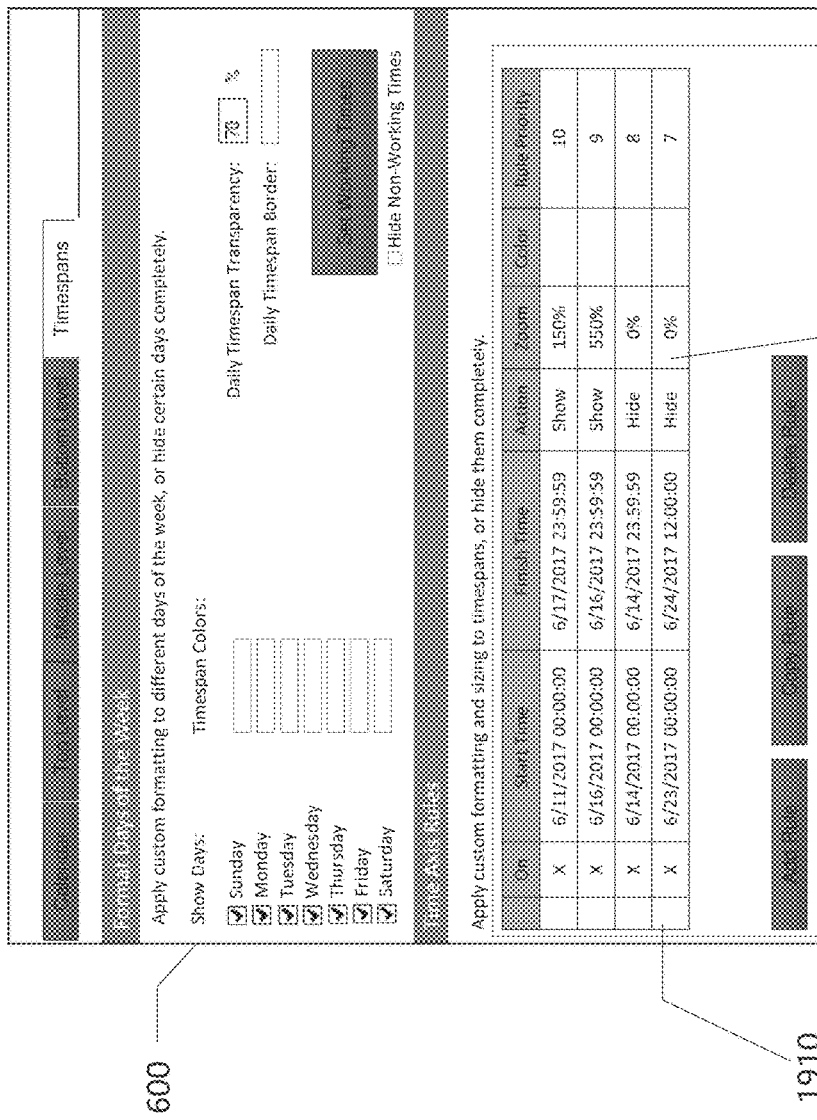

FIG. 21 shows how the fourth Time Axis Rule can be changed to hide the 36-hour Timespan instead of stretching it. The Zoom Factor for the fourth Time Axis Rule is changed from 200% to 0%, which creates 36 hours of Discontinuous Timespans instead of 36 hours of Non-Linear Timespans.

Figure 22:
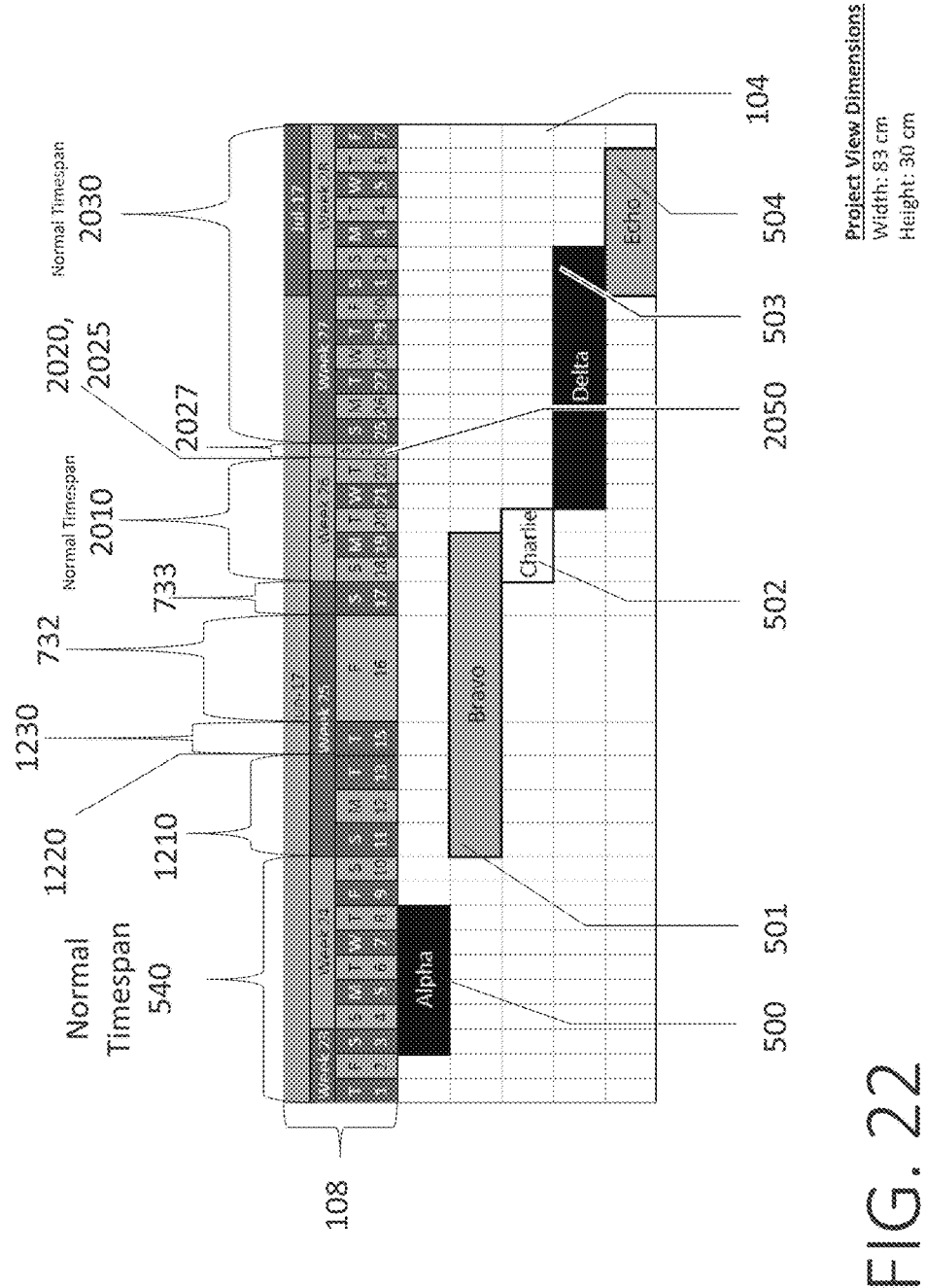

FIG. 22 shows the 36 hours of Discontinuous Timespans that result from the change of the Zoom Factor in FIG. 21. The resulting 36 hours are removed from the Time Axis.

Figure 23:
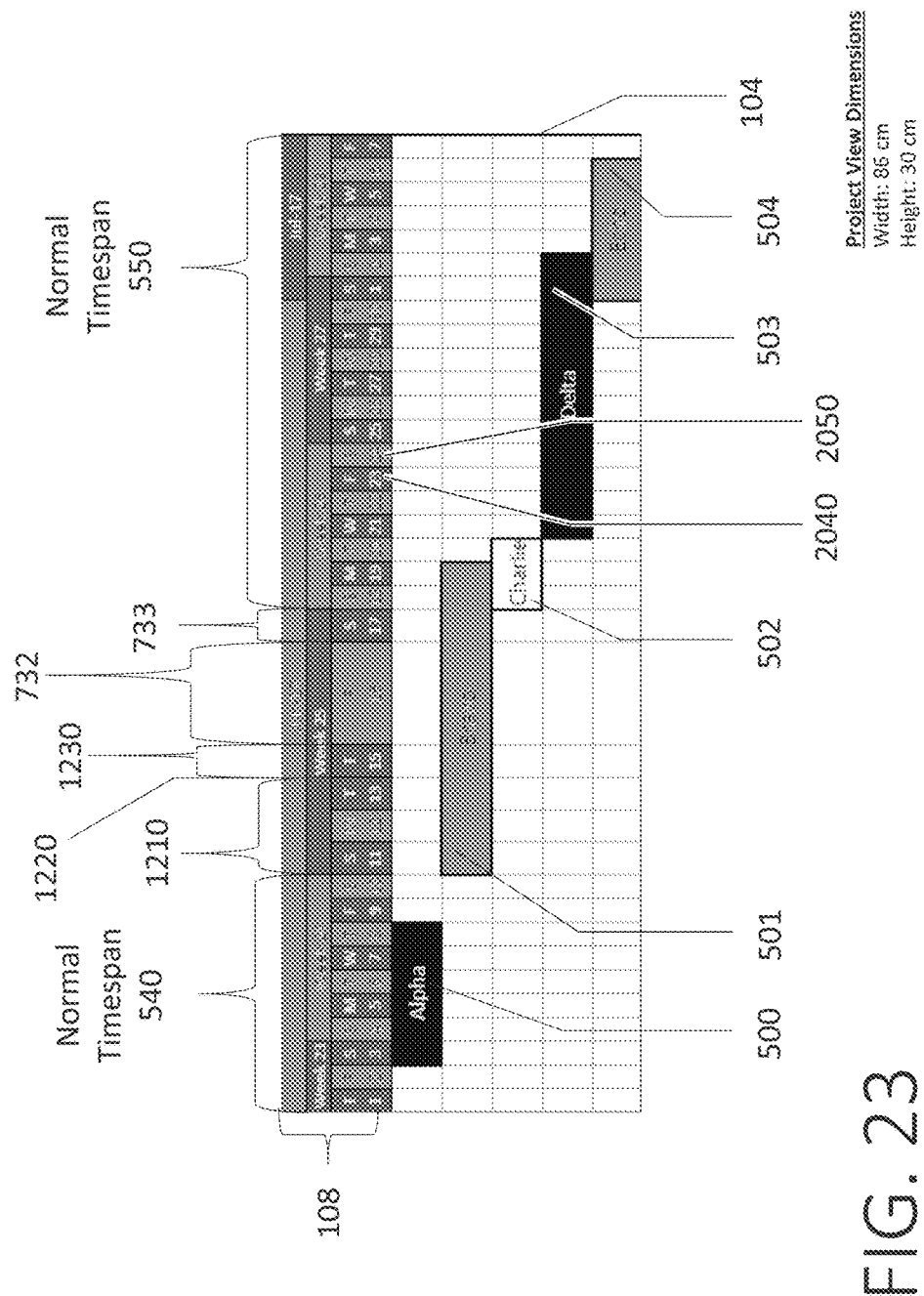

FIG. 23 illustrates the results of deleting the fourth Time Axis Rule, thereby eliminating the 36 hours of Discontinuous Timespans and restoring a Normal Timespan in its place.

Figure 24:
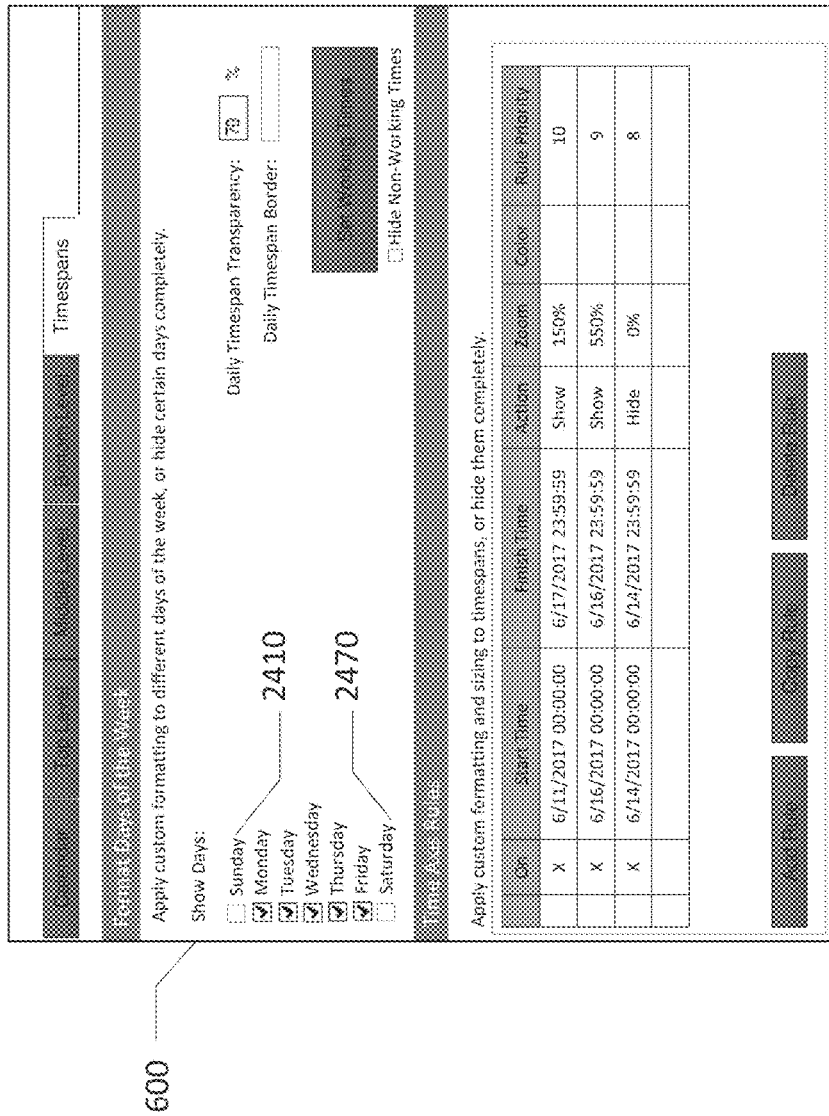

FIG. 24 shows how the Time Axis Configuration Screen can eliminate certain weekdays from the Time Axis by unchecking checkboxes corresponding to, in this case, Sunday and Saturday, which creates a Weekday Rule to hide all occurrences of these days from the Time Axis.

Figure 25:
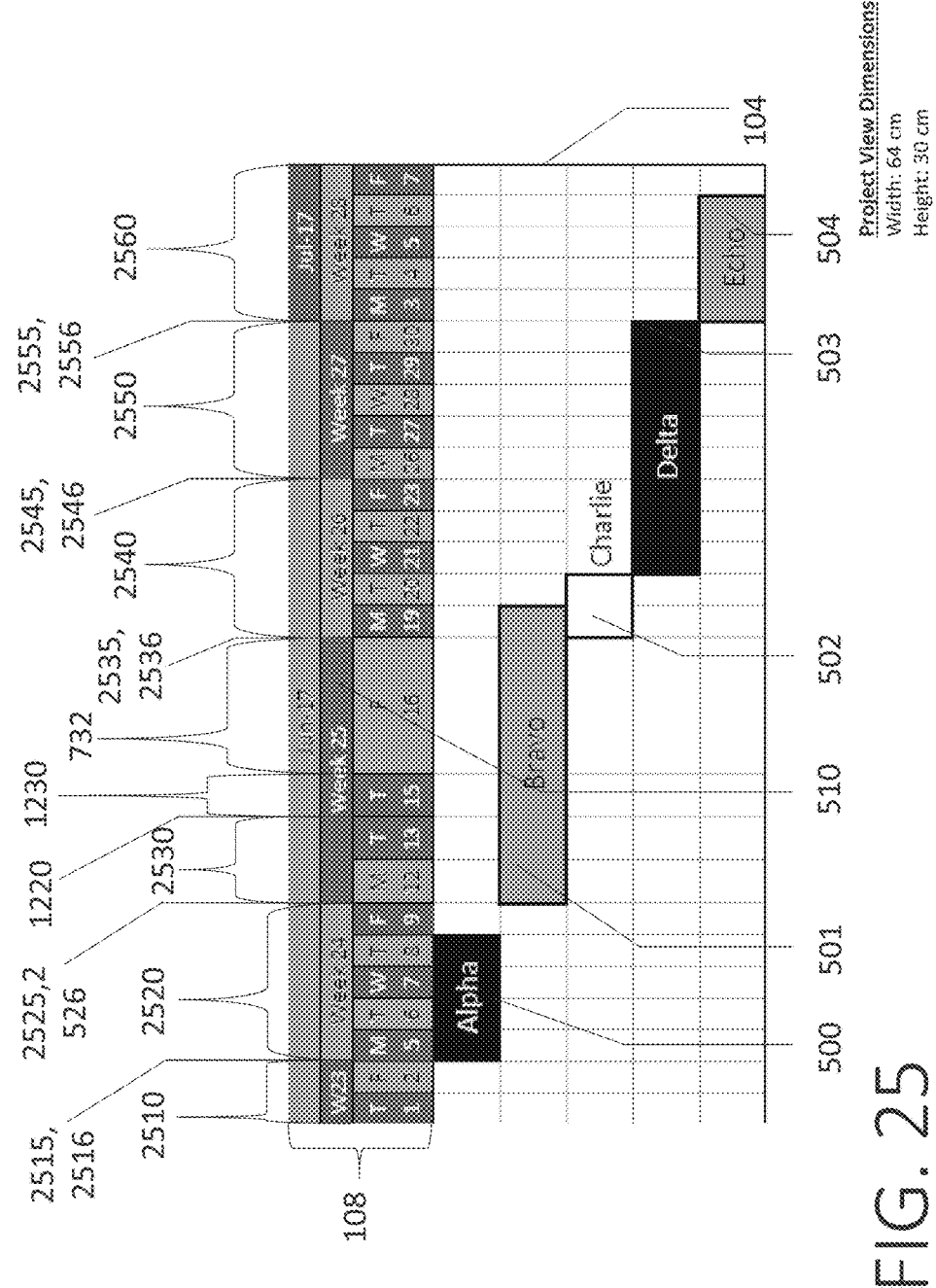

FIG. 25 shows the Project View with a redrawn Time Axis after Saturdays and Sundays have been removed on account of the Weekday Rules to hide weekends. Discontinuous Timespans now exist along the Time Axis in place of Saturdays and Sundays.

Figure 26:
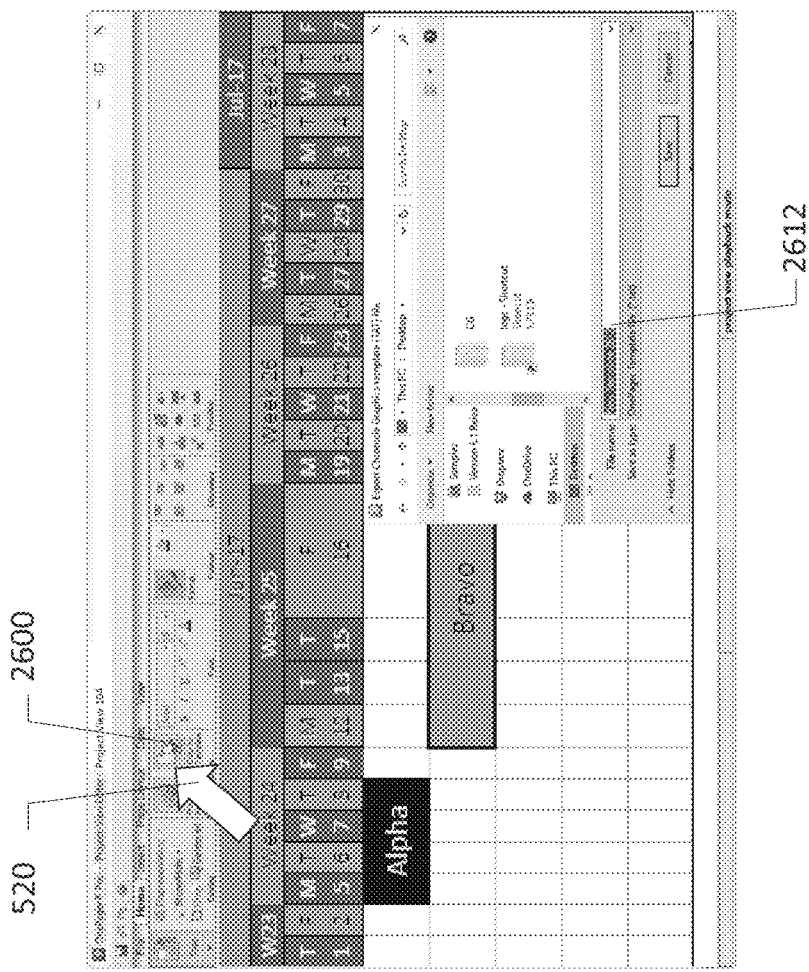

FIG. 26 depicts the process of taking the settings (Time Axis Rules, Weekday Rules, Working Time Rules, etc.) from the current Project View and copying them to a Template, from which a similar Project View may be created in the future. The Template does not contain any Event Data.

FIG. 27 introduces a new set of Event Data, unrelated to the Event Data first presented in FIG. 4. Unlike the first set of Event Data in FIG. 4, this new set of Event Data has Event Data Attributes for Percent Complete.

Figure 28:
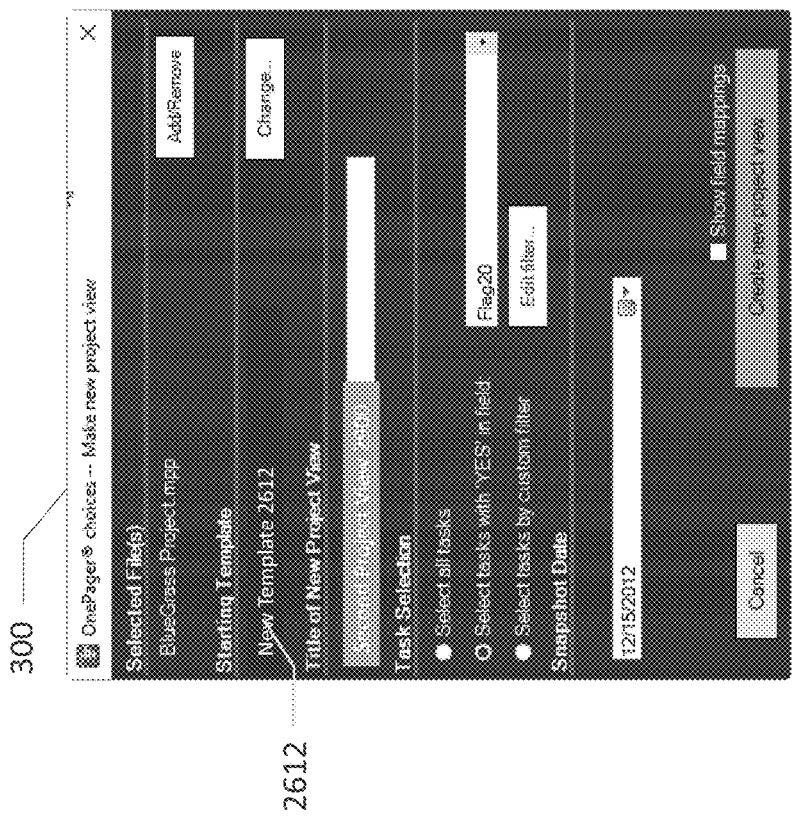

FIG. 28 illustrates how the user can create a new Project View based on the Template shown in FIG. 26 and the new set of Event Data shown in FIG. 27.

Figure 29:
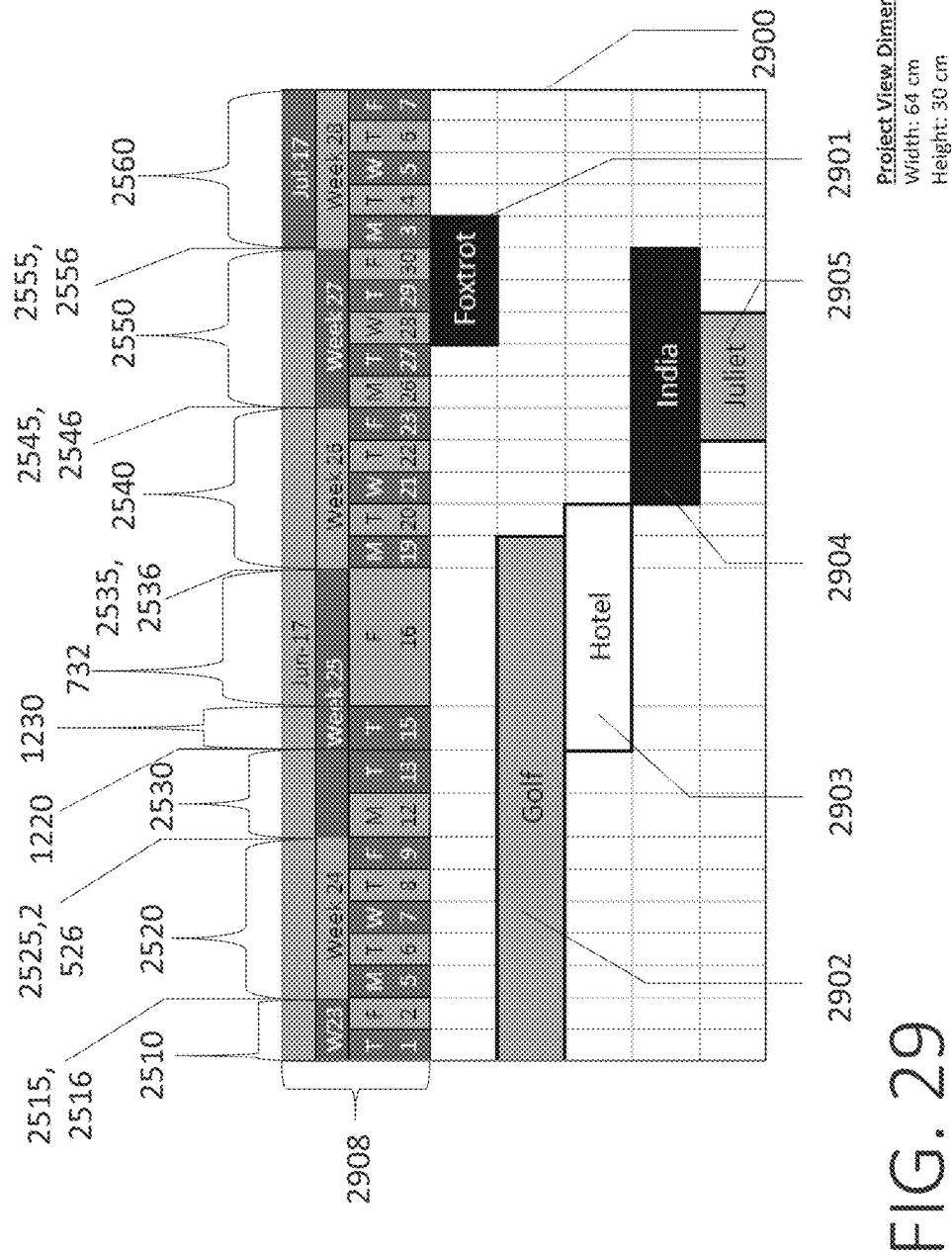

FIG. 29 shows the new Project View that was created in FIG. 26. The Time Axis has inherited its settings from the Template, and therefore has the same Normal Timespans, Non-Linear Timespans, and Discontinuous Timespans as the original Project View. However, the five Markers "Foxtrot", "Golf", "Hotel", "India", and "Juliet" in this new Project View are based on the second set of Event Data. The Markers "Alpha", "Bravo", "Charlie", "Delta", and "Echo" that appeared in the first Project View are not present in the second Project View.

Figure 31:
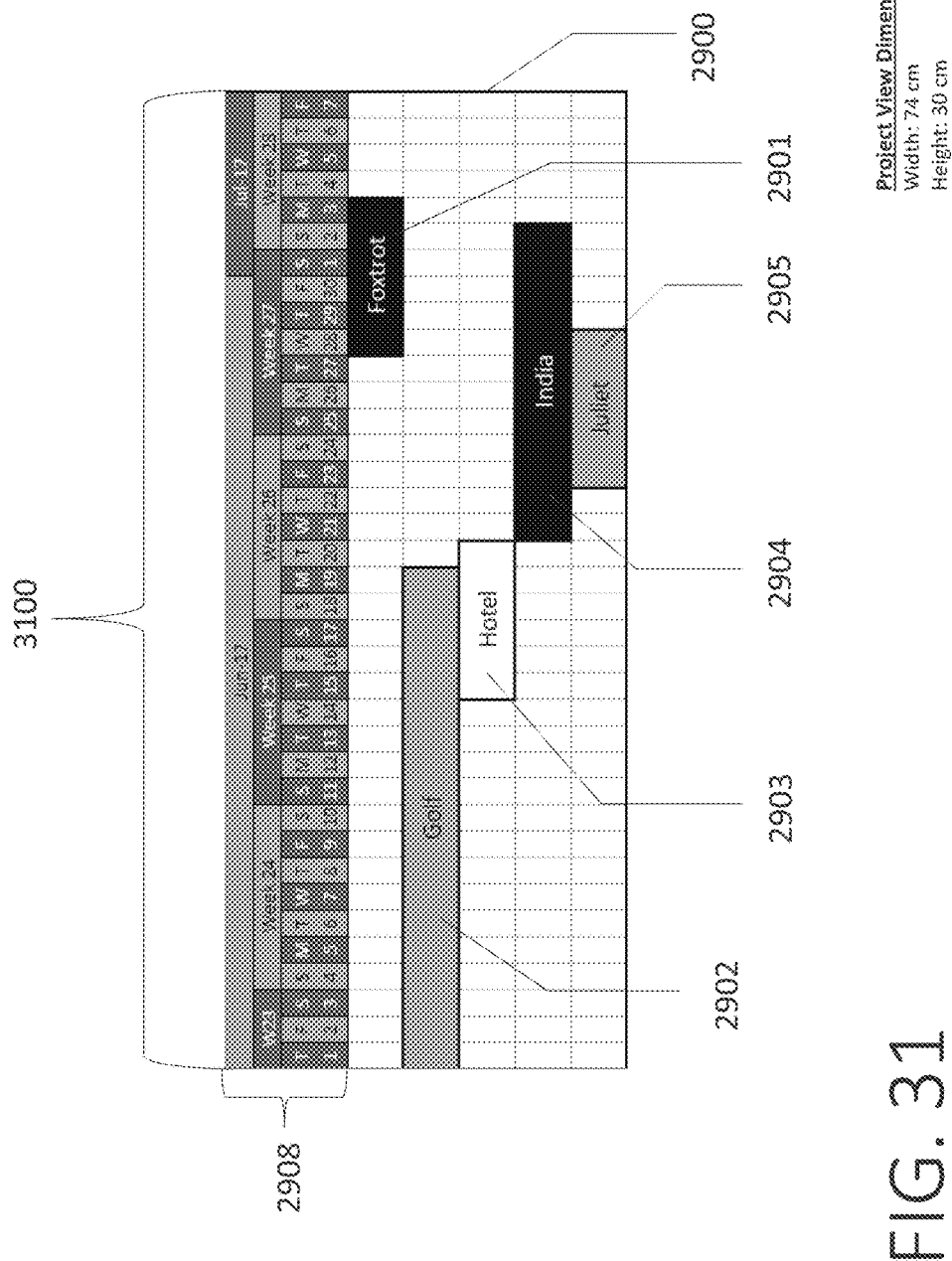

FIG. 31 shows the second Project View after all Time Axis Rules and Weekday Rules have been deleted. As a result, the Time Axis consists of a single, Normal Timespan.

Figure 32:
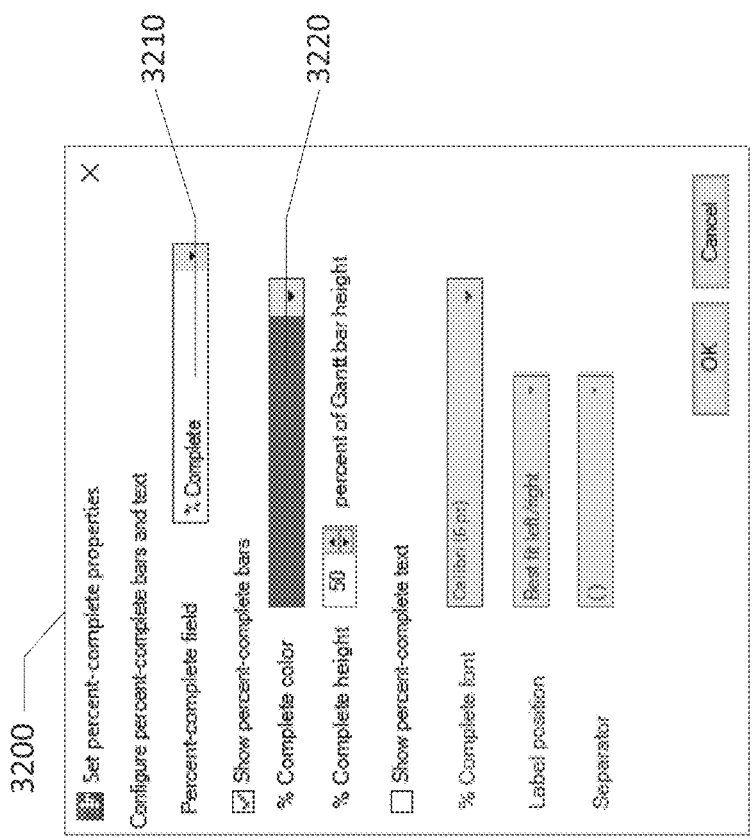

FIG. 32 shows a Percent Complete Settings Form where the user can enable and configure settings for Progress Bars.

Figure 33:
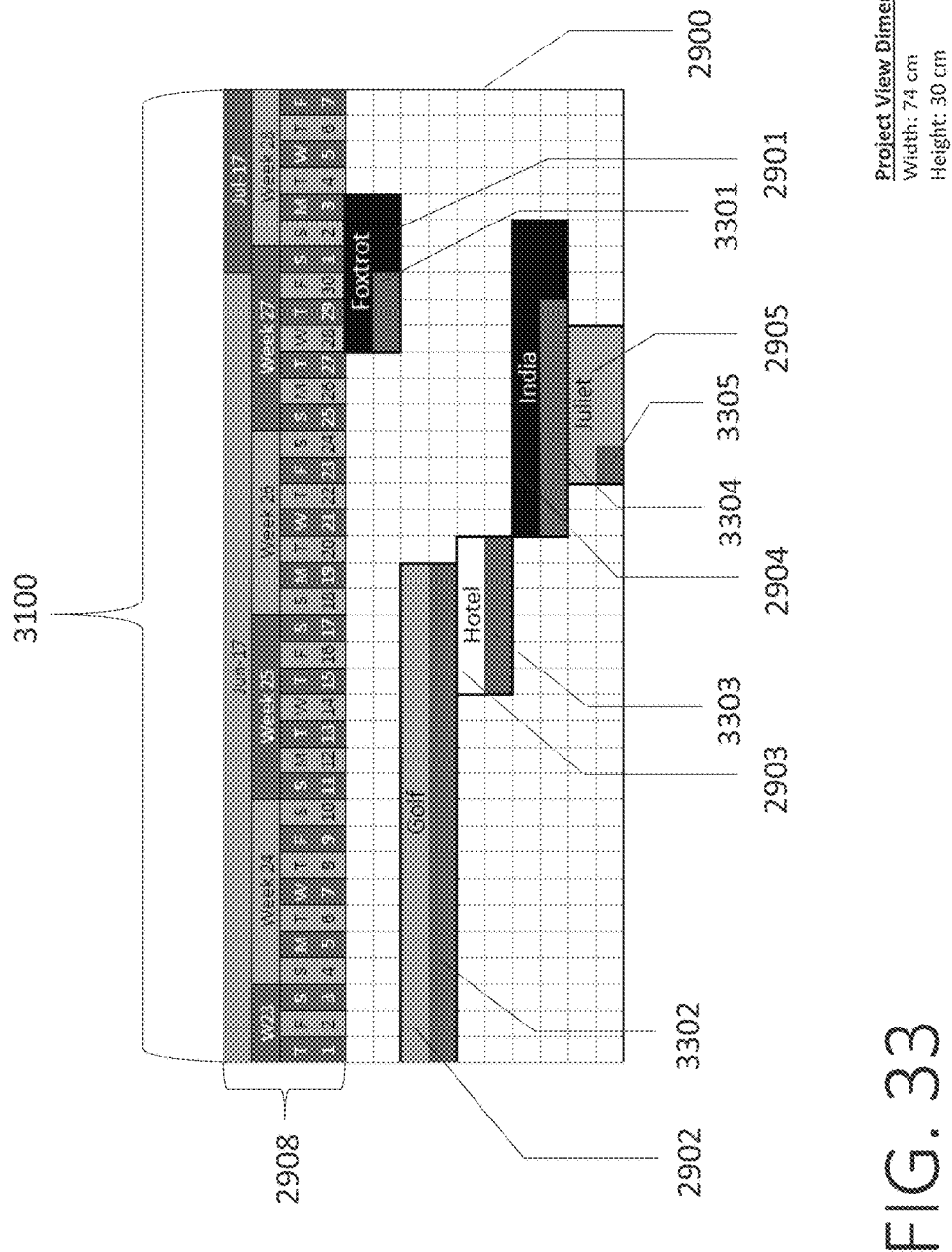

FIG. 33 illustrates how Progress Bars appear in relation to the Time Axis and the Markers in the second Project View. The Progress Bars are initially based on calendar days, so a Marker representing an Percent Complete Data Attribute of 50% complete will have a Progress Bar that is 50% the width of the Marker, regardless of weekends, holidays, or other Non-Working Time.

Figure 34:
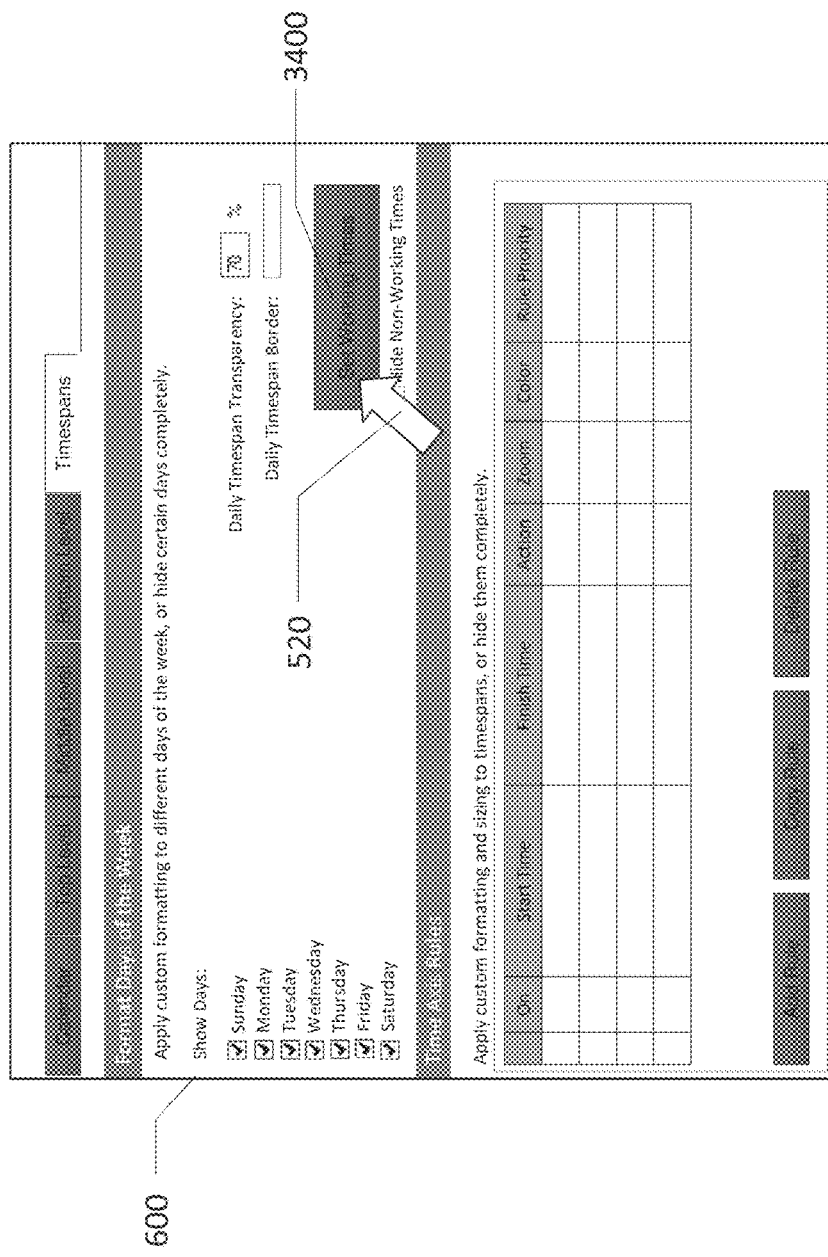

FIG. 34 shows a Set Working Times Button on the Time Axis Configuration Screen, which will open a Working Times Form when clicked.

Figure 35:
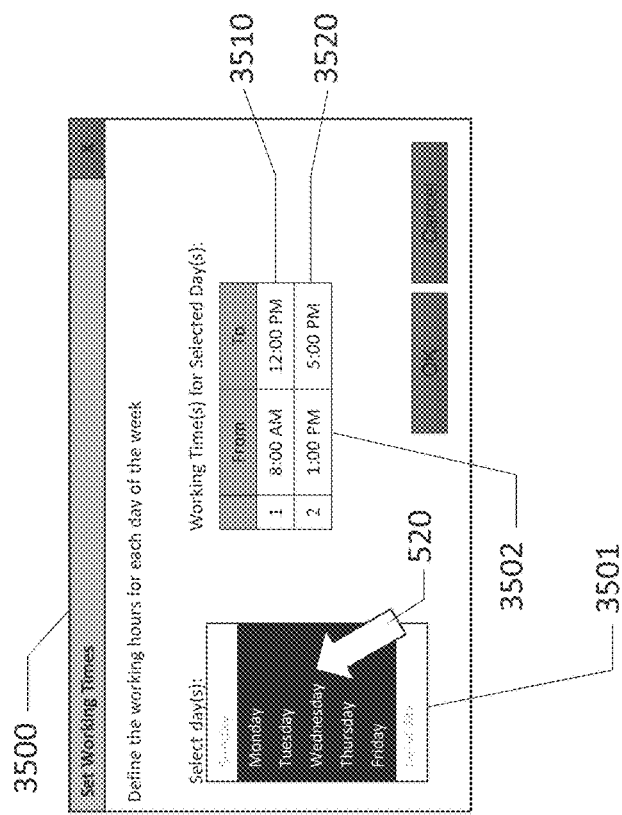

FIG. 35 shows the Working Times Form. Users can select one or more weekdays from a Weekday Selection List and then define one or more Working Time Rules in a Working Time Rules Grid. In this example, the user has defined Working Time Rules between 8:00 a.m. to 12:00 pm and from 1:00 p.m. to 5:00 p.m., Monday through Fridays. Because Saturday and Sunday do not have any Working Time Rules defined, they are interpreted to be Non-Working Time.

Figure 36:
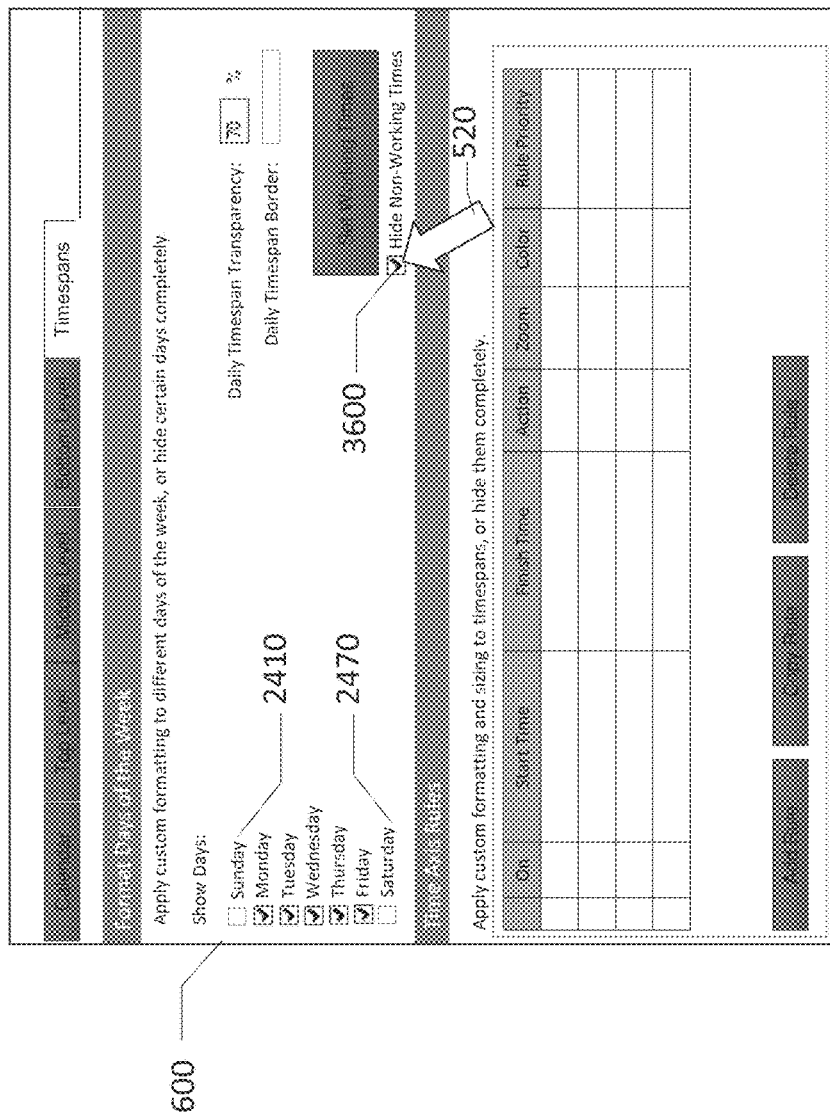

FIG. 36 shows how the user can choose to hide all of the Non-Working Time that was defined under the Working Time Rules shown in FIG. 35.

Figure 37:
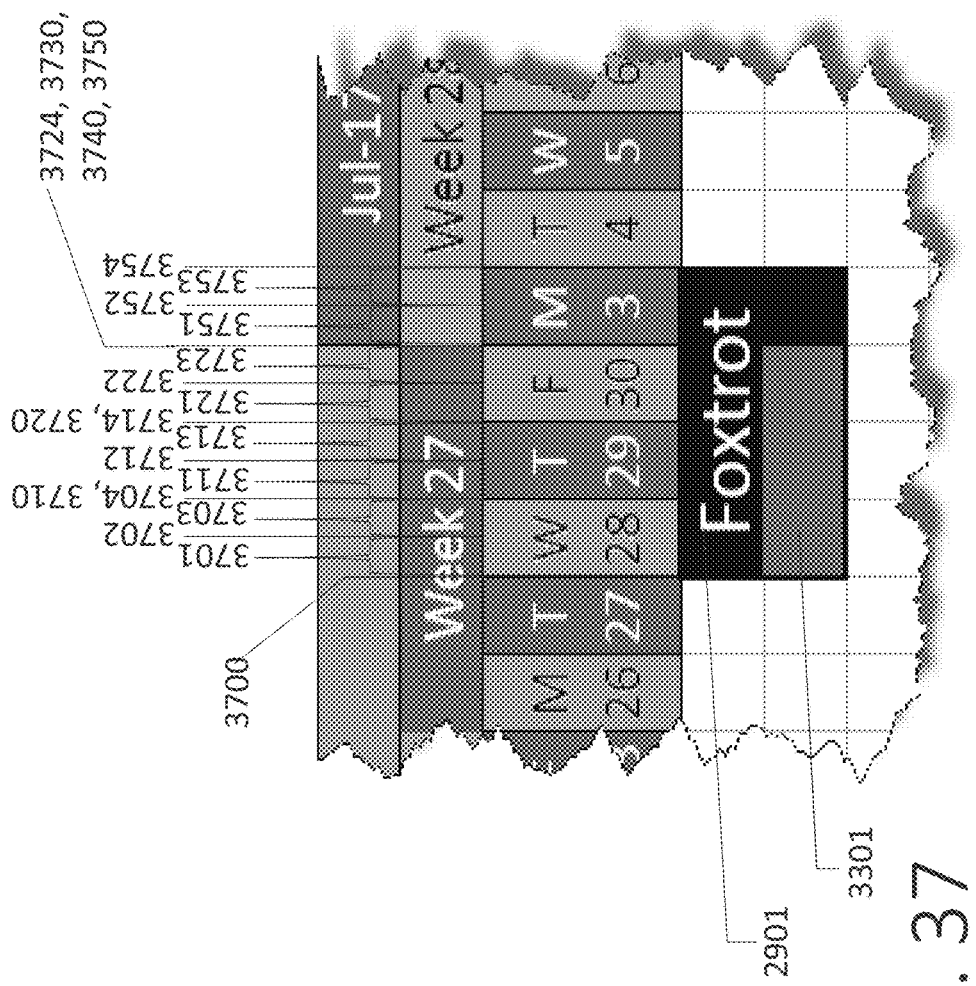

FIG. 37 shows a portion of the Project View, specifically a section of the Time Axis in close proximity to the "Foxtrot" Marker. The Time Axis has a multitude of Discontinuous Timespans due to the hiding of Non-Working Time that was configured in FIG. 36. Further, the width of the "Foxtrot" market is reduced in accordance with the same hiding of Non-Working Time.

Figure 38:
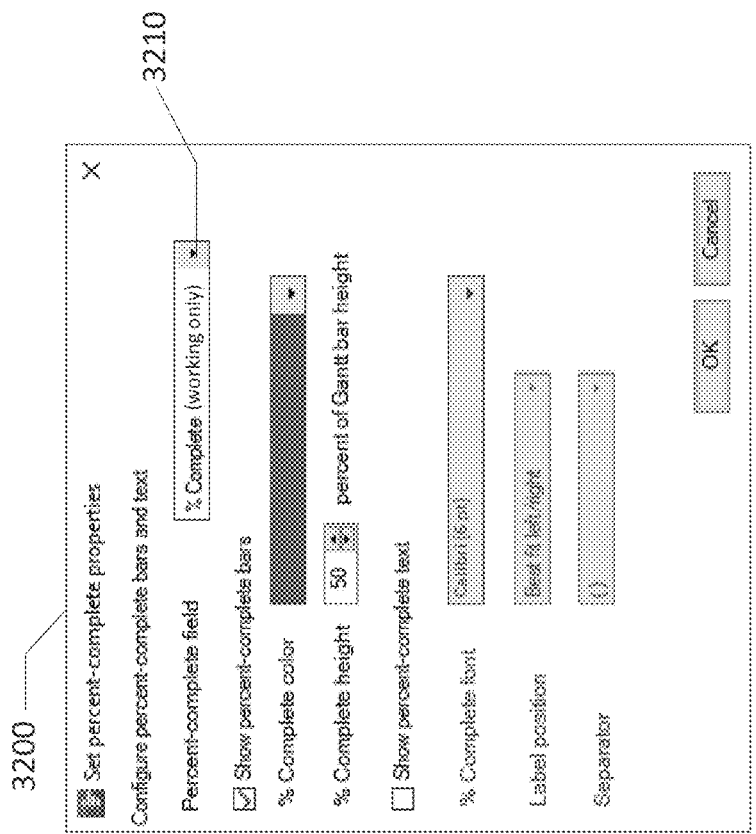

FIG. 38 illustrates how the user can use the Percent Complete Settings Form to tell the system to only consider Working Time when rendering Progress Bars along the Time Axis in the Project View.

Figure 39:
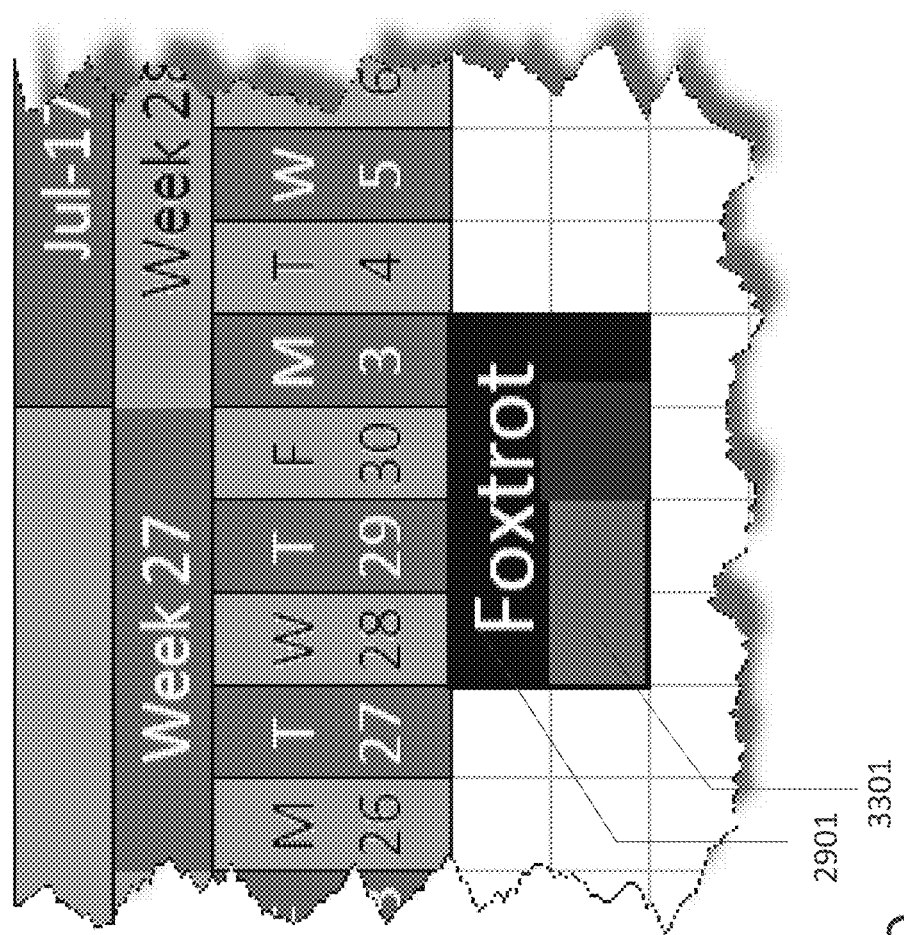

FIG. 39 shows the same subsection of the Project View and the Time Axis as FIG. 37. The "Foxtrot" Marker retains the same width, but the Progress Bar for the "Foxtrot" Marker now only appears as two working days in width (50% of the four working day width of the "Foxtrot" Marker) instead of three calendar days (50% of the six calendar day width of the "Foxtrot" Marker) that were originally shown in FIG. 37.

Figure 40:
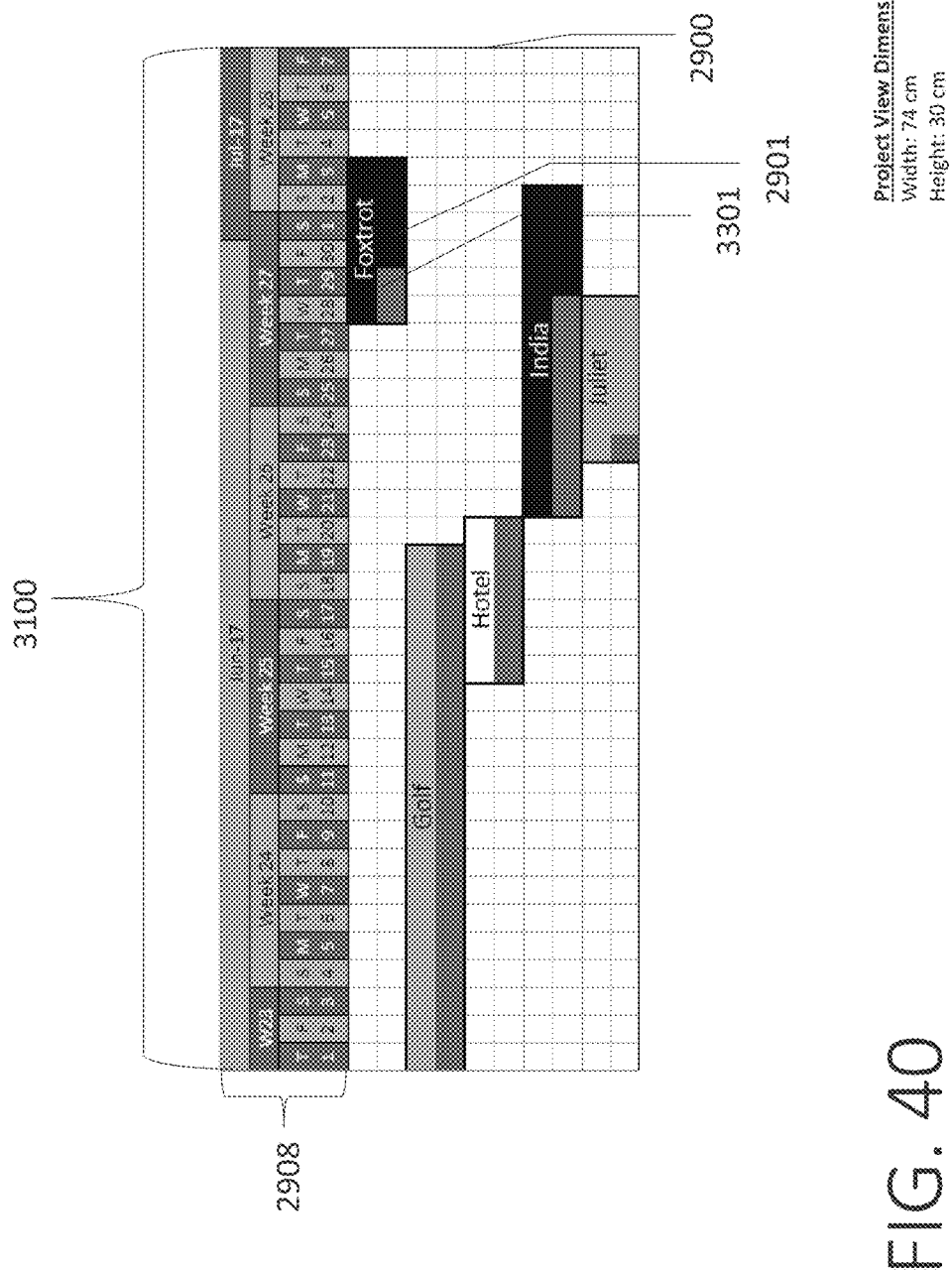

FIG. 40 shows the Project View again with Non-Working Time restored to the Time Axis. All Discontinuous Timespans are removed and replaced with a single Normal Timespan. The "Foxtrot" Marker appears wider at six calendar days, since the Saturday and Sunday in its middle have been restored. The Progress Bar for the "Foxtrot" marker remains at two working days. As a result, the Progress Bar for the "Foxtrot" marker looks like it is 33% across (2 working days divided by 6 calendar days) even though the Percent Complete Data Attribute has not changed from its original value of 50%.

Figure 41:
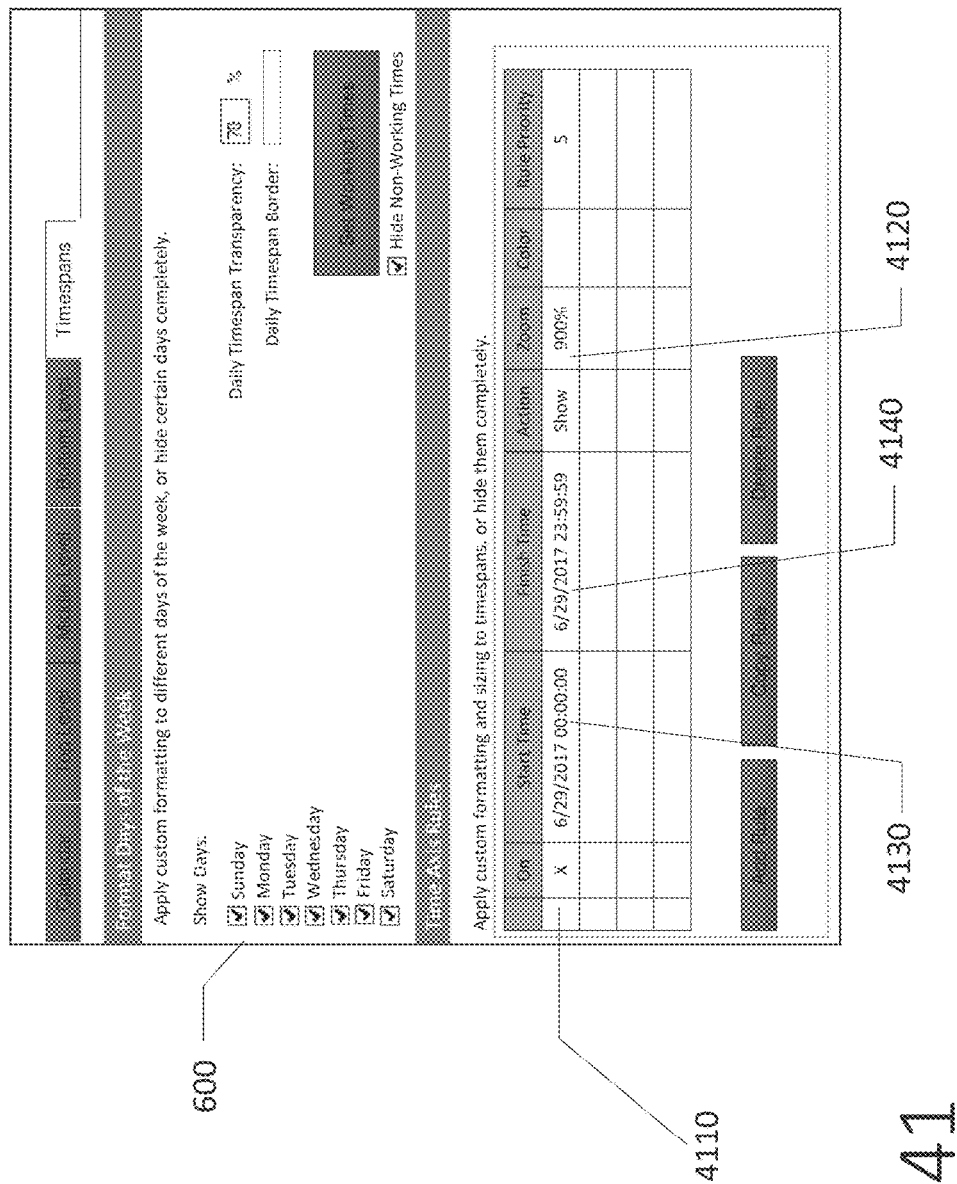

FIG. 41 shows the addition of a new Time Axis Rule, which expands Jun. 29, 2017 by a Zoom Factor of 900%.

Figure 42:
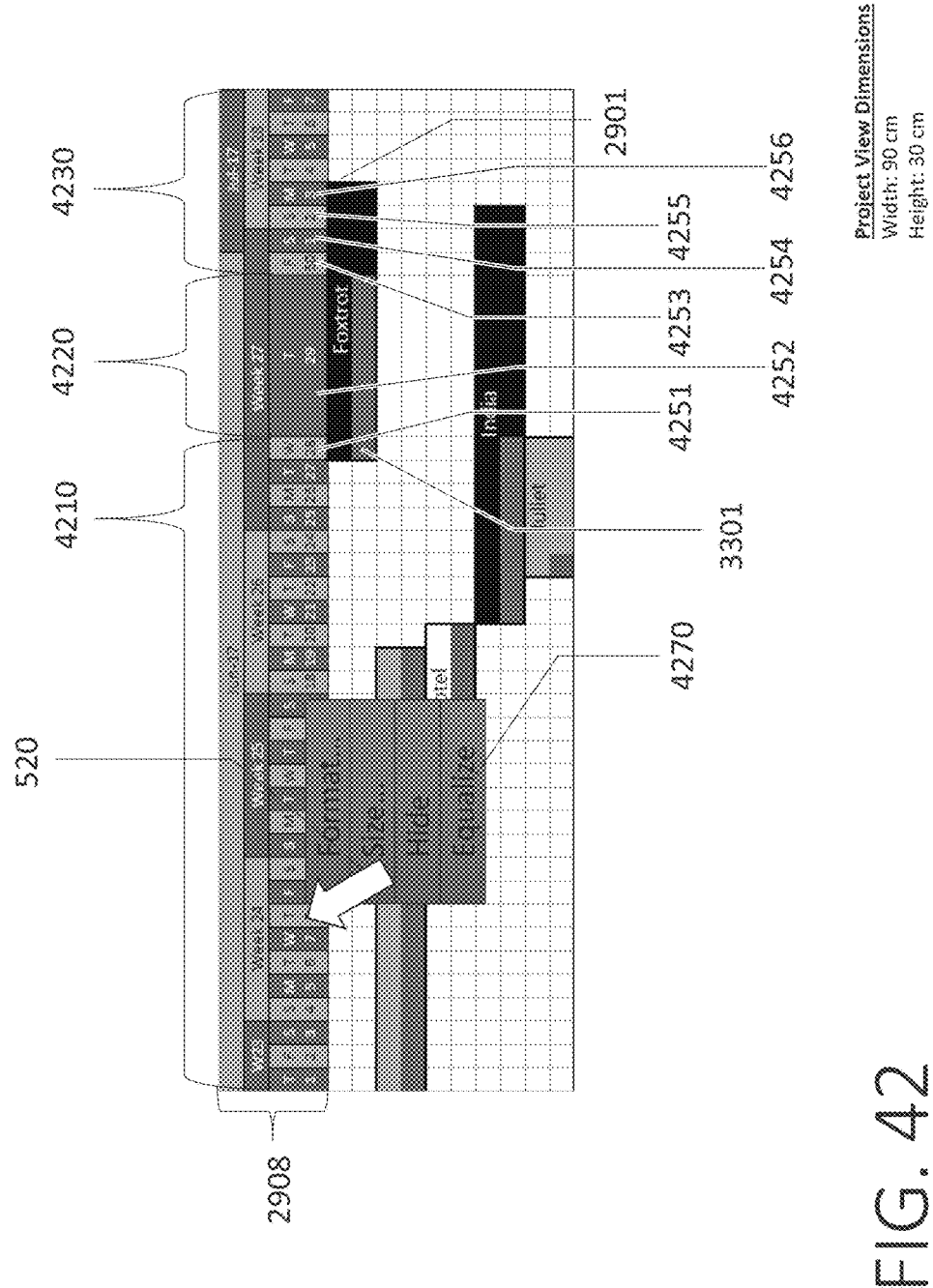

FIG. 42 shows how the Project View and Time Axis are redrawn to account for the addition of the new Time Axis Rule in FIG. 41. A Time Axis Cell corresponding to Jun. 29, 2017 is expanded by the Zoom Factor of 900%, creating a Non-Linear Timespan in the middle of a set of two Normal Timespans on either side. The "Foxtrot" Marker also increases its width and the width of its Progress Bar proportionately. Because the Progress Bar for the "Foxtrot" Marker covers Jun. 28, 2017 to Jun. 29, 2017 and the latter Time Axis Cell is stretched considerably, the width of the Progress Bar makes it appear that it is 71.4% along, since the remaining four Time Axis Cells on the Time Axis (Jun. 30, 2017 through Jul. 3, 2017) are of normal width. Again, this is incongruous with the Percent Complete Data Attribute of 50%, but is accurate due to the Non-Linear Timespan's widening effect on the second day of the Progress Bar. The user then right-clicks the Cursor Control Device on the Time Axis to bring up the Context Menu and chooses an Equalize Control to set all Time Axis Cells to a uniform width based on the overall width of the Time Axis.

Figure 43:
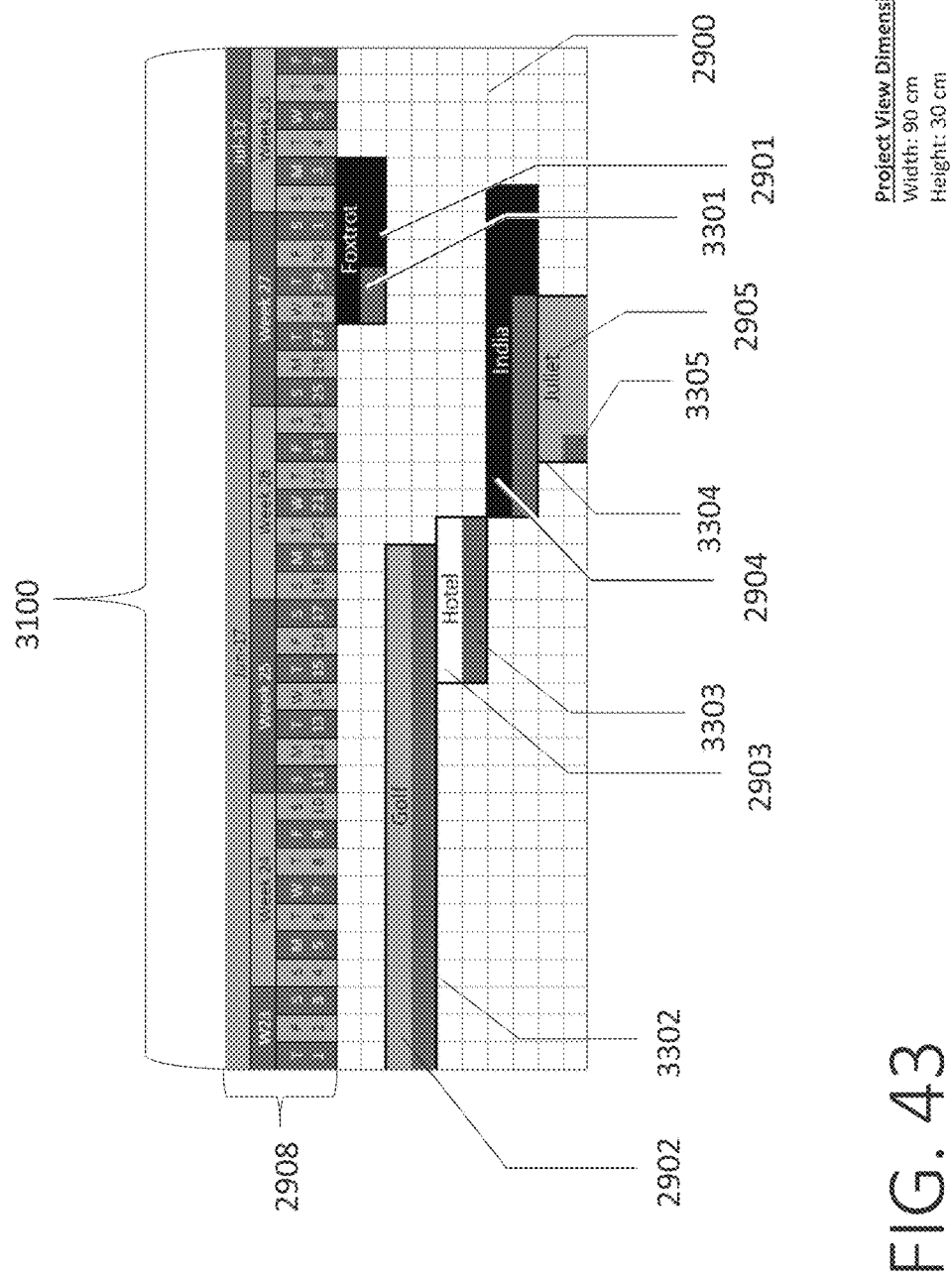

FIG. 43 shows how the Time Axis is redrawn after widths are equalized in FIG. 42. The Time Axis contains 37 Time Axis Cells, each one day in duration, and the total Time Axis Width is 90 centimeters. Dividing the total Time Axis width by the number of Time Axis Cells causes the Nominal Day Width 190 to change from 2.00 centimeters to 2.43 centimeters, and all 37 Time Axis Cells are resized to this homogenous width. All of the Markers and their corresponding Progress Bars are resized in accordance with these new dimensions as well.

DETAILED DESCRIPTION OF PREFERRED EXEMPLAR EMBODIMENTS

One embodiment of the invention, which is not intended to limit the scope of the invention, is a computer system that processes Event Data from one or more project plans, renders a set of Markers in Rows and Swimlanes initially along a linear Time Axis based on the Start or Finish Times for each Event.

Following the initial rendering, users of the system may choose to hide sections of the Time Axis to create one or more Discontinuous Timespans. Portions of Markers that are contained within a Discontinuous Timespan will be hidden to account for the gaps in time, causing such Markers to appear smaller or to be hidden altogether, depending on whether the Markers are fully contained within the Discontinuous Timespan, or only partially contained.

Users of the system may also choose to resize some Time Axis Cells, making them wider or narrower than neighboring Time Axis Cells, and thereby zooming in on a particular section of the Time Axis to create one or more Non-Linear Timespans. Any Markers that are contained within a Non-Linear Timespan will be resized, and Markers that abut the same Non-Linear Timespan will be repositioned to account for the different horizontal proportions.

Users of the system may also choose to define Working Time and Non-Working time, and use those definitions to control the display of Progress Bars along the Time Axis, or to hide Non-Working Time from the Time Axis entirely, thereby dynamically creating recurring Discontinuous Timespans for the Non-Working Times.

Following the creation of one or more Non-Linear Timespans or Discontinuous Timespans (hereafter, collectively referred to as Maverick Timespans), the user may choose to create a Template which captures these and other Time Axis settings. This Template can then be used to create a new Project View from a separate and unrelated set of Event Data. Because the Template contains settings relating to the Maverick Timespan properties of the Time axis, these same properties will apply to the newly-created Project View without requiring the user to re-establish the same Maverick Timespans again.

Glossary of Terms

The terms and phrases defined in this section are intended to have the meaning ascribed to them applied throughout this document including the claims unless clearly indicated otherwise explicitly or in context. Further, as applicable, the stated definitions are to apply, regardless of the word or phrase's case, to the singular and plural variations of the defined word or phrase.

Boundary: refers collectively to the start time and end time of a Time Axis Cell, a Time Axis Rule, or a Timespan.

Data Attribute: Elements of an Event that help define the meaning of the Event. Examples of Data Attributes include, but are not limited to Start Time, Finish Time, resource assignment, percent complete, assigned phase, cost, and status. Data Attributes can be constant across all Snapshots (Event Data Attributes), or can vary across Snapshots (Snapshot-Event Data Attributes). Both Event Data Attributes and Snapshot-Event Data Attributes are collectively called Data Attributes.

Discontinuous Timespan: a span of time, consisting of a start time and a finish time which is hidden from a Time Axis. For example, if a Time Axis initially consists of seven days (Sunday to Saturday), and then a user chooses to hide Wednesday and Thursday, then the Timespan beginning on Wednesday 12:00:00 AM and ending on Thursday 11:59:59 PM is considered discontinuous, and will be hidden from view.

Drawing Engine: software that computes the x location of and then draws Markers along the Time Axis in a Project View.

Event: a task or milestone in a project plan.

Event Data: a non-transient data store containing one or more Events. Examples of Event Data include, but are not limited to project plans in the memory of a computer in an application such as Microsoft Project.

Horizontal Position: a horizontal coordinate x that corresponds to a time t along the Time Axis. The Horizontal Position x is a value measured in centimeters (cm) from the left edge of the Time Axis.

Marker: the symbol employed to represent an Event in a Project View. For example, Events may be represented by colored rectangles, diamonds, or other symbols. The horizontal coordinates of a Marker relative to the Time Axis convey the Start Time and/or End Time of the Event that the Marker represents. The Marker may also contain graphical representations of other Data Attributes such as Percent Complete, which may be represented by an overlay on top of the symbol that represents Start Time and End Time of the Event.

Maverick Timespan: any timespan that is either a Non-Linear Timespan or a Discontinuous Timespan. The opposite of a Maverick Timespan is a Normal Timespan.

Nominal Day Width: a constant, either defined explicitly by the user, or computed by the invention, based on the total width of a linear Time Axis divided by the number of days contained within the Time Axis. The width of a Normal Timespan is defined as the duration of the Normal Timespan in days multiplied by the Nominal Day Width. For example, if the Nominal Day Width is defined or computed to be 2 centimeters, then any week within a Normal Timespan will be 14 centimeters (2 centimeters×7 days) wide.

Normal Timespan: any Timespan that is not a Maverick Timespan. Any timespan whose Zoom Factor is 1 is considered to be a Normal Timespan. The opposite of a Normal Timespan is a Maverick Timespan, which can be either a Discontinuous Timespan or a Non-Linear Timespan.

Non-Discrete Time Axis Rule: a Time Axis Rule where either the start time, the finish time, or both does not align with a discrete Time Axis Cell anywhere on a Time Axis Level. For example, if a Time Axis Level consists of daily Time Axis Cells as the smallest unit of time, but a Time Axis Rule covers a 12-hour Timespan, the Time Axis Rule is considered to be a Non-Discrete Time Axis rule since the 12-hour timespan does not intersect with both the start time and finish time of any daily Time Axis Cell.

Non-Linear Timespan: a Timespan, consisting of a start time and a finish time, in which the horizontal proportions of the Time Axis differ from the default proportions of the Time Axis. For example, if a Time Axis initially consists of seven equally-sized days (Sunday to Saturday), and then a user causes Wednesday and Thursday to be double the width of the remaining five days, then the timespan beginning on Wednesday 12:00:00 AM and ending on Thursday 11:59:59 PM is a Non-Linear Timespan, since it differs from the default width of the remaining five days, which are Normal Timespans.

Non-Working Time: any time on the calendar that is not explicitly defined as Working Time. In the example of a 40-hour work week, Saturday and Sundays are typically considered Non-Working Time, as are the hours in a day when people are not in the office (e.g. 5:00 p.m. overnight until 8:00 a.m. the next day, plus 12:00 p.m. to 1:00 p.m. for lunch).

Project View: a collection of Markers, combined with a Time Axis, and various display settings to present the occurrence of Events. A Project View can contain one or more projects and can contain one or more Snapshots, but shall not be limited in scope to contain multiple projects, or to contain Snapshots.

Percent Complete: a number, ranging from zero to 100 which represents how much progress has been made against completing an Event. For example, if an Event is scheduled to take four days to complete, and two days of work have been successfully completed with two days of work remaining, the Event is computed to be 50% complete.

Prioritized Rules: a set of Time Axis Rules, ordered based on their Time Axis Rule Priorities.

Row: a rectangular area on the computer screen whose width includes the entire width extent of the Time Axis and which contains zero or more Markers. Each Row constrains the vertical position of the markers it contains to be between the Row's top and bottom edges.

Sampled Time-Space Function: a time-ordered collection of (t,x) pairs where t (a Time Node) is a sampled time along a Time Axis and x (a Horizontal Position) is measured from the left edge of the Time Axis and determined by a set of Time Axis Rules. The Time Nodes in the collection of pairs are constructed to include all times where the Time Axis Rules change along the Time Axis.

Skip Unit: an integer that defines the number of discrete time units between each Time Axis Cell. For example, when a Time Axis Level has a Skip Unit of one (1) and is set to show months, the Time Axis Level will show every month in sequence without skipping any months. If the Skip Unit changes from one (1) to two (2), then the Time Axis Level will show every other month, and each Time Axis Cell will represent two months instead of one.

Snapshot: a version of a project plan containing the Data Attributes on a specific date or the Data Attributes for a specific "what-if" scenario.

Swimlane: a rectangular area on the computer screen whose width includes the entire width extent of the Time Axis and which contains one or more vertically-adjacent Rows. A Swimlane thus contains zero or more Markers whose vertical position is constrained to be between the Swimlane's top and bottom edges.

Template: A collection of settings, including but not limited to Time Axis Rules, Weekday Rules, and Working Time Rules, which define the Timespans along a Time Axis and, when combined with Event Data, define the horizontal positioning and width of Markers in a Project View. Templates do not contain any Event Data, and a single Template may be used to create comparable Project Views using different sets of Event Data.

Time Axis: a graphical representation of a time scale showing one or more units of time that serve as reference points for the progression of Events in a project plan. A Time Axis typically appears at the top or bottom of a Project View, but may also float vertically elsewhere in the body of a Project View as an intermediate reference point.

Time Axis Cell: a rectangle representing a discrete unit of time that appears on a particular Time Axis Level. For example, if a Time Axis Level is configured to display months and Skip Unit is 1, then each Time Axis Cell on the Time Axis Level will display one discrete month.

Time Axis Level: a vertical division of a Time Axis, each displaying a common unit of time. For example, a Time Axis may have three levels (top, middle, bottom). The top level may be set to show months, the middle level to show weeks, and the bottom level to show days.

Time Axis Rule: a logical rule which defines the Start Time, Finish Time, and behavior of a Maverick Timespan.

Time Axis Rule Priority: an integer which defines which Time Axis Rule should take precedence when more than one Time Axis Rule applies to all or part of the same Timespan. Lower numbers indicate a higher priority. For example, if two Time Axis Rules exist for all or part of the same Timespan, the Time Axis Rule with the lowest number will take precedence.

Time Interval: an period of time between two adjacent Time Nodes. This is employed in computing the Sampled Time-Space Function.

Time Node: a sampled value of time along a Time Axis that constitutes the time value of a (t,x) pair in a Sampled Time-Space Function. The Time Nodes in the Sampled Time-Space Function are constructed to include all times where the set of Time Axis Rules change along the Time Axis.

Time Slope: a quantity with units centimeters per day that when multiplied by a Time Interval between two adjacent Time Nodes yields a horizontal distance between the two adjacent Time Nodes.

Timespan: an interval of time along a Time Axis consisting of a start time and a finish time. Every Time Axis Rule defines at least one Timespan. Weekday Rules and Working Time Rules define a plurality of Timespans.

Weekday Rule: a logical rule which applies to a particular weekday or set of weekdays (e.g. Friday, Saturday). Unlike Time Axis Rules, which have a defined Start Time and Finish Time, Weekday Rules apply to all specified weekdays on the Time Axis. For example, a Weekday Rule that applies to Sunday will apply to every Sunday on the time axis, and will not be constrained by a specific Timespan. When the user chooses to hide Saturday and Sunday on the Time Axis via a Weekday Rule, one hidden Timespan per week is generated and it runs from midnight on Saturday morning until midnight on Sunday night. Weekday Rules are always applied with a higher priority than Time Axis Rules and Working Time Rules.

Working Time: one or more periods of time when work is scheduled to take place on a project. For example, in the typical 40-hour work week, work is performed Monday through Friday, from 8:00 a.m. to 5:00 p.m. with one-hour break for lunch.

Working Time Rule: a rule that defines when Working Time is scheduled. In the example of a 40-hour work week, the user would create a Working Time Rule for Monday-Friday between 8:00 a.m. to 12:00 p.m. and then a second Working Time Rule for Monday-Friday between 1:00 p.m. to 5:00 p.m. to get to 40 hours of Working Time each week. When the user chooses to hide non-working time, the combination of these two Working Time Rules generates fifteen (15) hidden Timespans per week, namely five working days per week times three non-working Timespans per day (midnight to 8:00 am, 12:00 pm to 1:00 pm, and 5:00 pm to midnight). Working Time Rules are always applied with higher priority than Time Axis Rules.

Zoom Factor: a percentage by which a Non-Linear Timespan differs in horizontal width from a Normal Timespan of the same duration. For example, if a one-day duration Non-Linear Timespan is 4 centimeters wide and the Nominal Day Width is 2 centimeters, then the Zoom Factor for the Non-Linear Timespan is 200%, since a day that is 4 centimeters in width is twice as wide as the default 2 centimeters dictated by the Nominal Day Width.

Description and Operation

Figure 0:
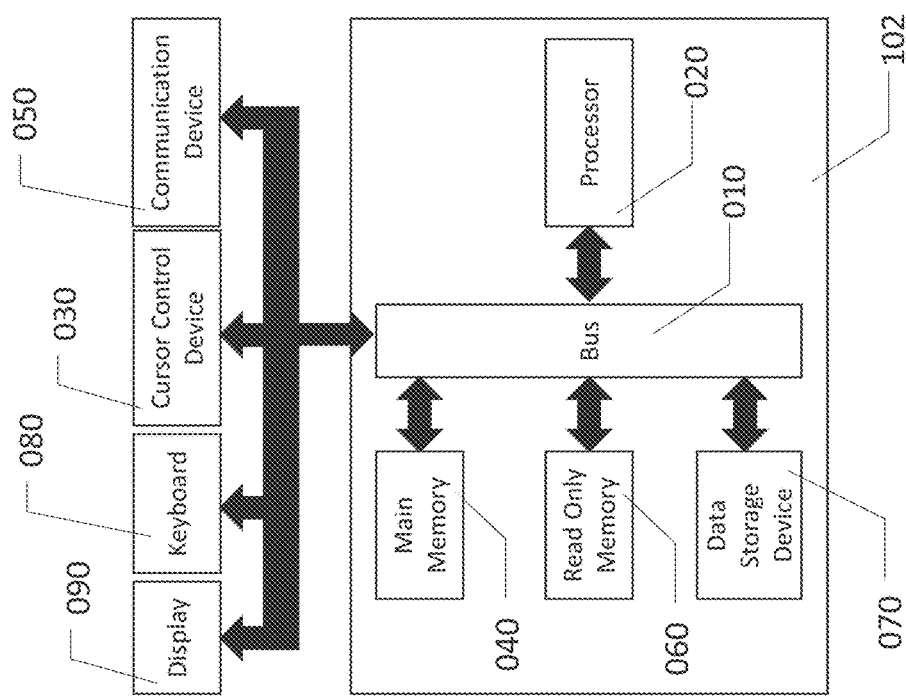
FIG. 0 shows a typical computer system, consisting of main memory, read only memory, a data storage device, and a processor connected to a bus. The computer is peripherally connected to a display, a keyboard, a cursor control device such as a mouse, and a communication device.

FIG. 0 illustrates an exemplary computer system 102 upon which embodiments of the invention may be implemented. Computer system 102 comprises a bus or other communication means 010 for communicating information, and a processing means such as processor 020 coupled with the bus 010 for processing information. Computer system 102 further comprises a random access memory (RAM) or other dynamically-generated storage device 040 (referred to as main memory), coupled to bus 010 for storing information and instructions to be executed by processor 020. Main memory 040 also may be used for storing temporary variables or other intermediate information during execution of instructions by processor 020. Computer system 102 also comprises a read only memory (ROM) and/or other static storage device 060 coupled to bus 010 for storing static information and instructions for processor 020.

A non-transitory data storage device 070 such as a magnetic disk drive, an optical disk drive and/or flash drive storage may also be coupled to computer system 102 for storing information and instructions. Computer system 102 can also be coupled via bus 010 to a display device 090, such as an LED Monitor or smart-phone screen, for displaying information to an end user. Typically, an alphanumeric input device (keyboard) 080, including alphanumeric and other keys, may be coupled to bus 010 for communicating information and/or command selections to processor 020. Another type of user input device is cursor control 030, such as a mouse, a trackball, touch screen, or cursor direction keys for communicating direction information and command selections to processor 020 and for controlling cursor movement on display 090.

A communication device 050 is also typically coupled to bus 010. The communication device 050 may include a network interface card, a modem, a wireless transceiver or other well-known interface device for purposes of providing a communication link to support a local or wide area network. In this manner, the computer system 102 may be coupled to the internet or other cloud-based computing network.

It is appreciated that a lesser or more equipped computer system than the example described above may be desirable for certain implementations. Therefore, the configuration of computer system 102 will vary from implementation to implementation depending upon numerous factors, such as price constraints, performance requirements, security restrictions, technological improvements, and/or other circumstances. Further, computing machines as used herein include tablet computers, smart phones and other similar devices wherein the input and display devices may, for instance, both comprise a touch screen.

It should be noted that, while the operations described herein may be performed under the control of a programmed processor, such as processor 020, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

One embodiment of the invention is illustrated in FIG. 1. A set of Event Data 100 is present on a computer 102 implementing the invention, which transforms the Event Data 100 into a Project View 104 that is displayed on the screen of the computer 102. An example Marker "Delta" 110 corresponds to an Event 106, which is a task or milestone in a project plan. In this example, the Event is a task entitled "Delta," and its Marker 110 is positioned horizontally along a Time Axis 108 according to its Start Time of Jun. 21, 2017 at 12:00:00 AM and its Finish Time of Jul. 2, 2017 at 11:59:59 PM. The Time Axis 108 contains a top Time Axis Level 130 set to months with a series of monthly Time Axis Cells 131, a middle Time Axis Level 140 set to weeks with a series of weekly Time Axis Cells 141, and a bottom Time Axis Level 150 set to days, with a series of daily Time Axis Cells 151. The Time Axis 108 spans a total of 37 days, from Jun. 1, 2017 through Jul. 7, 2017. The initial Project View 104 has a Time Axis 108 that is entirely linear and continuous, due to the fact that all of the Time Axis Cells 151 in the given Time Axis Level 150 are of the same width and to not have missing time between them. Because of this, the entire Time Axis 108 consists of a single Normal Timespan 160.

FIG. 2 illustrates the detailed method for creating the new Project View 104 from Event Data 100. One or more sets of Event Data 100, in this case, project plans, are loaded into the non-transient storage of the computer 102. A Configuration Form 300 is shown in FIG. 3, and specifies an initial Snapshot date 302 and a Template 212 for the Project View 104. The Template provides the initial settings and formatting for each Marker 110, for the Time Axis 108, and other elements of the Project View 104. The user may choose from a set of available Templates 212 by clicking on a Change button 304, and his Template 212 choice will be displayed on the Configuration Form 300. In this example, the Template 212 will define a total width of 74 centimeters for the Time Axis 108. Because the bottom Time Axis Level 150 contains exactly 37 one-day Time Axis Cells 151, a Nominal Day Width 190 is computed to be 2 centimeters (74 centimeters divided by 37).

A Drawing Engine 202 creates a Sampled Time-Space Function 232 that maps each time along the Time Axis 108 to a Horizontal Position x measured in centimeters from the left edge of the Time Axis 108. Once this mapping function is computed, the Drawing Engine 202 draws the Time Axis 108 in the Project View 104 to account for any Maverick Timespans 530 and Normal Timespans 160. The Drawing Engine 202 then horizontally positions all Event Data 100 by converting each Event's Start Time and Finish Time to Horizontal Position x and drawing the corresponding Markers 110 along the Time Axis 108 in the Project View 104.

A process 216 for the Drawing Engine 202 to compute Horizontal Position x for each Event Start Date and Event Finish Date is to generate the Sampled Time-Space Function 232 consisting of a time-ordered collection of (t, x) pairs at set of discrete sample points (Time Nodes 262-280) along the Time Axis 108. Each pair maps a Time Node to a Horizontal Position x measured from the left edge of the Time Axis 108. FIG. 2A shows the Sampled Time-Space Function 232 for the Time Axis 108 configuration of FIG. 15.

The Sampled Time-Space Function 232 (square symbols) in FIG. 2A illustrates the handling of Normal Timespans and Maverick Timespans and shows the computed set of time-space pairs for the Time Axis 108 of FIG. 15. It starts out with a Normal Timespan 234 for the set of days June 1-June 10, followed by a 150%-zoomed Non-Linear Timespan 236 for the set of days June 11-June 17, in the middle of which is a Discontinuous Timespan 238 for the hidden day June 14 and a 550%-zoomed Non-Linear Timespan 240 for June 16. Then comes a second Normal Timespan 242 for the set of days June 18-June 24, followed by a second Discontinuous Timespan 244 for the hidden days June 25-July 1. And finally comes a Normal Timespan 246 for the set of days July 2-July 7 to complete the configuration of the Time Axis 108.

A preferred way for the Drawing Engine 202 to compute the Sampled Time-Space Function 232 from the Time Axis Rules 208 refers to FIG. 2B and is as follows:

1. Define a set of Time Nodes 262-280 along the Time Axis 108, constructed as the union of all the start times and end times of the set of Timespans 234-246 that define the Time Axis 108. In the example given, these Time Nodes 262-280 are a set of ten time values between June 1 and Jul. 7, 2017.
2. For each Time Node 270 in the set of Time Nodes 262-280, compute a Time Slope 288, which is a constant whose value depends on a highest-priority Timespan 240 between the Time Node 270 and a next Time Node 272. Find the highest-priority Timespan 240 from the set of all Timespans 236, 240 intersecting the times between the Time Node 270 and the next Time Node 272 by ranking Timespans from Weekday Rules 210 as the highest, followed by Timespans from Working Time Rules 214, followed by Timespans from Time Axis Rules 208, followed by the Normal Timespans 160, 234, 242. When more than one of these Time Axis Rules 208 exists between the Time Node 270 and the next Time Node 272, the highest-priority rule is the one with the lowest value of Time Axis Rule Priority 1680.
   a. If the highest-priority Timespan 234 between the Time Node 262 and the next Time Node 264 is a Normal Timespan 160, compute the Time Slope 284 as the Nominal Day Width 190 divided by 1 day.
   b. If a highest-priority Timespan 238 between a Time Node 266 and a next Time Node 268 is a Discontinuous Timespan 238, 244 or a Timespan from a Weekday Rule 210 or a Working Time Rule 214, compute a Time Slope 286 as zero.
   c. If a highest-priority Timespan 240 between a Time Node 270 and the next Time Node 272 is a Non-Linear Timespan 236, 240, 530, compute a Time Slope 288 as the Nominal Day Width 190 multiplied by the Zoom Factor 820 and divided by 1 day.
3. Start with a leftmost Time Node 262 (in this case, Time Node 262 has time t=June 1) in the set of Time Nodes 262-280 constructed above, and assign a value zero (x=0.0) as a Horizontal Position associated with it.
4. Store (t=June 1, x=0 cm) as a first pair 250 of values in the Sampled Time-Space Function 232.
5. Now compute a Horizontal Position 292 associated with a second Time Node 262 at June 11 as $x=0$ cm+2 cm/day*10 days $=20$ cm since a Time Interval 234 between June 1 and June 11 is 10 days and a Time Slope 284 at Time Node 264 is 2.0 cm/day.
6. Store (June 11, 20 cm) as a second pair 252 of values in the Sampled Time-Space Function 232.
7. Continue this process recursively from left to right:
   a. Use a recursion formula to compute a Horizontal Position 296 denoted as $x_{Next}$ at a next Time Node 276 (whose time is denoted as $t_{next}$) from a Horizontal Position 294 denoted as $x_{current}$ at a current Time Node 274 (whose time is denoted as $t_{current}$) and from a Time Slope 290 at the current Time Node 274 (denoting the Time Slope 290 as $S_{current}$):

$x_{Next}=x_{current}+S_{Current}*(t_{Next}-t_{current})$, b. Store ($t_{Next}$, $x_{Next}$) as a next pair 254 in the Sampled Time-Space Function 232.
8. Repeat until a last pair 256 for a last Time Node 280 on the Time Axis 108 has been computed and stored in the Sampled Time-Space Function 232.
9. Sort the set of Time Nodes 262-280 in the Sampled Time-Space Function 232 to be in increasing order on the time variable.

Once the computer 102 via the Drawing Engine 202 has computed this Sampled Time-Space Function 232, it performs standard linear interpolation to compute the Horizontal Position x for any time t that lies between the Time Nodes 262-280.

In FIG. 5, an example Marker 501 labeled "Bravo", among others, is drawn along the Time Axis 108 in the Project View 104 on the screen of the computer 102 in accordance with an Event's StartTime Data Attribute 432 and FinishTime Data Attribute 442, shown in FIG. 4. The Drawing Engine 202 computes the x value for the left edge of Marker 501 by using linear interpolation on StartTime Data Attribute 432 in a Sampled Time-Space Function 232. Likewise, the Drawing Engine 202 computes the x value for the right edge of marker 501 by using linear interpolation on FinishTime Data Attribute 442 in the Sampled Time-Space Function 232.

The user may hover the Cursor Control Device 030 over the right-hand edge of a weekly Time Axis Cell 510. A Cursor 520 will change its appearance from a pointer to a double-sided arrow, allowing the user to drag the right-hand edge of the weekly Time Axis Cell 510 to the right, thereby widening the Time Axis Cell 510 and creating a Non-Linear Timespan 530. The remainder of the previous Normal Timespan 160 is turned into a set of two Normal Timespans 540 and 550, adjacent to the Non-Linear Timespan 530 in either side. At the completion of this user-initiated change, the computer 102 via the Drawing Engine 202 re-computes a new Sampled Time-Space Function to account for the changed widths of Time Axis Cells 1540 and then re-draws all the markers on the screen using this new Sampled Time-Space Function. As a result, the width of the Marker 501 increases to ensure that its dates remain in alignment with the Non-Linear Timespan 530 and the Normal Timespan 550, since it touches both of them. A set of additional Markers 502, 503, and 504 do not change their widths, but do move horizontally to the right to account for the new horizontal position of the Normal Timespan 550 in which they are contained.

In this example, we assume that the user expands the Time Axis Cell 510 by a factor of two, which means that both the Non-Linear Timespan 530 and Time Axis Cell 510 will have a Zoom Factor 620 of 200% and a width of 28 centimeters, because there are seven days per week, and each day will have 200% the width of the Nominal Day Width 190 of 2 centimeters:

$$7 \text{ days} \times 2 \text{ centimeters} \times 200\% = 28 \text{ centimeters}$$

The remainder of the Time Axis 108 remains linear, meaning that it consists of the Normal Timespan 540 and the Normal Timespan 550 on either side of the Non-Linear Timespan 530. The widths of these Normal Timespans 540 and 550 continue to be defined as their duration in days multiplied by the Nominal Day Width 190.

The overall width of the Time Axis 108 is then re-computed by adding the widths of the Normal Timespan 540 (10 days×2 centimeters), the Non-Linear Timespan 530 (7 days×2 centimeters×200%), and the Normal Timespan 550 (20 days×2 centimeters) for a total width of 88 centimeters.

FIG. 6 depicts a Time Axis Configuration Screen 600 which shows a Time Axis Rule 610 resulting from the user's creation of the Non-Linear Timespan 530. The Time Axis Rule 610 specifies a Start Time 630 (Jun. 11, 2017 12:00:00 AM) and a Finish Time 640 (Jun. 17, 2017 11:59:59 PM) of the Non-Linear Timespan 530 and also specifies a Zoom Factor 620 of 200%. The Time Axis Rule 610 also specifies a Time Axis Rule Priority 650 of 10.

FIG. 7 shows how the user may now hover the Cursor Control Device 030 over the right-hand edge of a daily Time Axis Cell 710. The Cursor 520 will once again change its appearance to a double-sided arrow, allowing the user to drag the right-hand edge of the daily Time Axis Cell 710 to the right, thereby widening the Time Axis Cell 710 and creating a Non-Linear Timespan 732. Because the new Non-Linear Timespan 732 is contained within the previously-created Non-Linear Timespan 530, the Non-Linear Timespan 530 divides into a new set of Non-Linear Timespans 731 and 733 on either side of the Non-Linear Timespan 732.

The width of the Marker 501 further increases to ensure that its dates remain in alignment with the Non-Linear Timespans 731, 732, and 733, as well as with the Normal Timespan 550, all of which it touches. The additional Markers 502, 503, and 504 do not change their widths, but do once again move horizontally to the right to account for the new horizontal position of the Normal Timespan 550 in which they are contained. The Marker 500 is unchanged.

In this example, we assume that the user expands the Time Axis Cell 710 to a width of 11 centimeters, which means that the Non-Linear Timespan 732 will have a Zoom Factor 820 of 550% relative to the Nominal Day Width 190 of 2 centimeters.

The remainder of the Time Axis 108 remains unchanged, meaning that it consists of the Normal Timespan 540, the Non-Linear Timespans 731, 732, and 733, followed by the final Normal Timespan 550.

The width of the Time Axis Cell 510 (labeled "Week 25") is recomputed by adding the widths of the Non-Linear Timespan 731 (5 days×2 centimeters×200%), the Non-Linear Timespan 732 (1 day×2 centimeters×550%), and the Non-Linear Timespan 733 (1 day×2 centimeters×200%), for a total width of 35 centimeters.

The overall width of the Time Axis 108 is then re-computed by adding the widths of the Normal Timespan 540 (10 days×2 centimeters), the Non-Linear Timespan 731 (5 days×2 centimeters×200%), the Non-Linear Timespan 732 (1 day×2 centimeters×550%), the Non-Linear Timespan 733 (1 day×2 centimeters×200%), and the Normal Timespan 550 (20 days×2 centimeters) for a total width of 95 centimeters.

All of these expected horizontal positions with Normal and Non-Linear Timespans are guaranteed to be correct by the steps for computing the Sampled Time-Space Function as described in the discussion of FIGS. 2A and 2B.

FIG. 8 depicts the Time Axis Configuration Screen 600 which shows a new Time Axis Rule 810 resulting from the user's creation of the Non-Linear Timespan 732. The Time Axis Rule 810 specifies a Start Time 830 (Jun. 16, 2017 12:00:00 AM) and a Finish Time 840 (Jun. 16, 2017 11:59:59 PM) of the Non-Linear Timespan 732 and also specifies a Zoom Factor 820 of 550%. The Time Axis Rule 810 also specifies a Time Axis Rule Priority 850 of 9, which is numerically smaller than the Time Axis Rule Priority 650 of 10 from the previous Time Axis Rule 610. Therefore, for Timespans when both Time Axis Rules 610 and 810 both apply, Time Axis Rule 810 will take priority and the Zoom Factor 820 of 550% will be used.

The width of the Marker 501 further increases to ensure that its dates remain in alignment with the Non-Linear Timespans 731, 732, and 733, as well as with the Normal Timespan 550, all of which it touches. The additional Markers 502, 503, and 504 do not change their widths, but do once again move horizontally to the right to account for the new horizontal position of the Normal Timespan 550 in which they are contained.

FIG. 9 shows how the user may choose to modify the Zoom Factor 620 of the first Time Axis Rule 610 from 200% to 150%. When the Zoom Factor 620 is reduced, the corresponding Timespans 731 and 733 reduce in width. Even though the Timespan 732 is contained within the Start Time 630 and the Finish Time 640 of the Time Axis Rule 610, the Timespan 732 is also contained within the Start Time 830 and the Finish Time 840 of the Time Axis Rule 810. The Time Axis Rule 810 and its Time Axis Rule Priority 850 of 9 outranks the Time Axis Rule 610 and its Time Axis Rule Priority 650 of 10, and therefore the Zoom Factor 820 of 550% is still applied to Timespan 732 instead of the Zoom Factor 620 of 150%.

The overall width of the Time Axis 108 is then re-computed by adding the widths of the Normal Timespan 540 (10 days×2 centimeters), the Non-Linear Timespan 731 (5 days×2 centimeters×150%), the Non-Linear Timespan 732 (1 day×2 centimeters×550%), the Non-Linear Timespan 733 (1 day×2 centimeters×150%), and the Normal Timespan 550 (20 days×2 centimeters) for a total width of 89 centimeters. FIG. 10 depicts the Time Axis 108 redrawn with narrower dimensions for the Timespans 731 and 732.

The width of the Marker 501 becomes narrower due to the reduction in width of the Non-Linear Timespans 731 and 733. The additional Markers 502, 503, and 504 do not change their widths, but now move horizontally to the left to account for the new horizontal position of the Normal Timespan 550 in which they are contained.

All of these expected horizontal positions with Normal and Non-Linear Timespans are guaranteed to be correct by the steps for computing the Sampled Time-Space Function as described in the discussion of FIGS. 2A and 2B.

FIG. 11 illustrates how a user may move the Cursor Control Device 030 to hover the Cursor 520 over a Time Axis Cell 1100, which in this example corresponds to Wednesday, Jun. 14, 2017. When the user right-clicks the Cursor Control Device 030 over the Time Axis Cell 1100, a Context Menu 1120 appears, giving the user the option to hide the Time Axis Cell 1100 and thereby creating a Discontinuous Timespan 1220.

FIG. 12 illustrates how the Time Axis 108 will appear after the Time Axis Cell 1100 is hidden. The Time Axis Cell 1100 is removed from the Time Axis 108, and is replaced with the Discontinuous Timespan 1220 between Jun. 14, 2017 12:00:00 AM and Jun. 14, 2017 at 11:59:59 PM. Because the hidden Time Axis Cell 1100 was part of the Non-Linear Timespan 731, the Non-Linear Timespan 731 is divided, creating a new Non-Linear Timespan 1210 from Jun. 11, 2017 12:00:00 AM to Jun. 13, 2017 11:59:59 PM and another new Non-Linear Timespan 1230 from Jun. 15, 2017 12:00:00 AM to Jun. 15, 2017 11:59:59 PM.

The width of the Time Axis Cell 510 (labeled "Week 25") is recomputed by adding the widths of the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), for a total width of 26 centimeters.

The overall width of the Time Axis 108 is then re-computed by adding the widths of the Normal Timespan 540 (10 days×2 centimeters), the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), and the Normal Timespan 550 (20 days×2 centimeters) for a total width of 86 centimeters.

The width of the Marker 501 reduces due to the removal of the Time Axis Cell 1100 and the creation of the Discontinuous Timespan 1220. The additional Markers 502, 503, and 504 do not change their widths, but do shift horizontally to the left to account for the new horizontal position of the Normal Timespan 550 in which they are contained.

FIG. 13 shows the Time Axis Configuration Screen 600 with the addition of a new Time Axis Rule 1310. The Time Axis Rule 1310 consists of a Start Time 1330 of Jun. 14, 2017 12:00:00 AM, a Finish Time 1340 of Jun. 14, 2017 11:59:59 PM, and a Zoom Factor 1320 of 0%, corresponding to the Discontinuous Timespan 1220, and a Time Axis Rule Priority 1350 of 8.

FIG. 14 illustrates another example of how a user may move the Cursor Control Device 030 to hover the Cursor 520 over a Time Axis Cell 1400 ("Week 27"), which in this example begins on Jun. 25, 2017 12:00:00 AM and ends on Jul. 1, 2017 11:59:59 PM. When the user right-clicks the Cursor Control Device 030 over the Time Axis Cell 1400, the Context Menu 1120 reappears, giving the user the option to hide the Time Axis Cell 1400.

FIG. 15 illustrates how the Time Axis 108 will appear after the Time Axis Cell 1400 is hidden. The Time Axis Cell 1400 is removed from the Time Axis 108, and is replaced with a Discontinuous Timespan 1520 between Jun. 25, 2017 12:00:00 AM and Jul. 1, 2017 11:59:59 PM. Because the hidden Time Axis Cell 1400 was part of the Normal Timespan 550, the Normal Timespan 550 is divided, creating a new Normal Timespan 1510 from Jun. 18, 2017 12:00:00 AM to Jun. 24, 2017 11:59:59 PM and another new Normal Timespan 1530 from Jul. 2, 2017 12:00:00 AM to Jul. 7, 2017 11:59:59 PM. The Normal Timespans 1510 and 1530 are on either side of the Discontinuous Timespan 1520.

The overall width of the Time Axis 108 is then re-computed by adding the widths of the Normal Timespan 540 (10 days×2 centimeters), the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), the Normal Timespan 1510 (7 days×2 centimeters), the Discontinuous Timespan 1520 (7 days×2 centimeters×0%), and the Normal Timespan 1530 (6 days×2 centimeters) for a total width of 72 centimeters.

The width and positions of the Markers 500, 501, and 502 remain unchanged. The width of the Markers 503 and 504 reduce due to the removal of the Time Axis Cell 1400 and the creation of the Discontinuous Timespan 1520. The Marker 504 also moves horizontally to the left to account for the new horizontal position of the Normal Timespan 1530 in which it is partially contained.

All of these expected horizontal positions with Normal, Discontinuous, and Non-Linear Timespans are guaranteed by the steps for computing the Sampled Time-Space Function 232 as described in the discussion of FIGS. 2A and 2B. In fact, the Sampled Time-Space Function 232 corresponds precisely to the Time Axis 108 configuration of FIG. 15.

FIG. 16 shows the Time Axis Configuration Screen 600 with the addition of a new Time Axis Rule 1610. The Time Axis Rule 1610 consists of a Start Time 1630 of Jun. 25, 2017 12:00:00 AM, a Finish Time 1640 of Jul. 1, 2017 11:59:59 PM, a Zoom Factor 1620 of 0%, corresponding to the Discontinuous Timespan 1520, and a Time Axis Rule Priority 1650 of 7.

FIG. 17 shows how the user can use the Cursor Control Device 030 to hover the Cursor 520 over the Time Axis Rule 1610 and then click to select it. Once the Time Axis Rule 1610 is selected, the user may click a Delete Rule Button 1700 to delete the Time Axis Rule 1610. Upon deletion, the Time Axis Rule 1610 will no longer appear in the Time Axis Configuration Screen 600, and only the Time Axis Rules 610, 810, and 1310 shall remain.

FIG. 18 illustrates how the Time Axis 108 will appear after the Time Axis Rule 1610 is deleted. The Time Axis Cell 1400 is restored to the Time Axis 108. The Normal Timespan 1510, the Discontinuous Timespan 1520, and the Normal Timespan 1530 merge together to once again form the Normal Timespan 550.

The overall width of the Time Axis 108 is then re-computed by adding the widths of the Normal Timespan 540 (10 days×2 centimeters), the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), and the Normal Timespan 550 (20 days×2 centimeters) for a total width of 86 centimeters.

The widths and horizontal positions of the Markers 500, 501, and 502 are unchanged. The Markers 503 and 504 expand their widths due to the reintroduction of the Time Axis Cell 1400. The Marker 504 once again shifts horizontally to the right to account for the reintroduction of the Normal Timespan 550 in which it is contained.

FIG. 19 shows how the user can use the Cursor Control Device 030 to hover the Cursor 520 over the Add Rule Button 1900 and then click it. Once the Add Rule Button 1900 is clicked, the user may create a new Non-Discrete Time Axis Rule 1910. The Non-Discrete Time Axis Rule 1910 consists of a Start Time 1930 and a Finish Time 1940, the latter of which does not correspond to any discrete units on the Time Axis 108. The Time Axis 108 consists of the Time Axis Level 130, which is set to months, the Time Axis Level 140, which is set to weeks, and the Time Axis Level 150, which is set to days. The Time Axis Rule 1910 has the Start Time 1930 of Jun. 23, 2017 12:00:00 AM which does match the daily units of the Time Axis Level 150. However, the Finish Time 1940 of Jun. 24, 2017 12:00:00 PM is midway through the following calendar day and therefore does not match any of the discrete units of time on the Time Axis 108.

FIG. 20 illustrates how the Time Axis 108 will appear after the Non-Discrete Time Axis Rule 1910 is added. The Normal Timespan 550 is split apart, and a new set of Normal Timespans 2010, 2027, and 2030 are created to the left and right of a new set of Non-Linear Timespans 2020 and 2025, which correspond to the Non-Discrete Time Axis Rule 1910. A Time Axis Cell 2040 corresponding to Jun. 23, 2017 is expanded by a full Zoom Factor 1920 of 200% since it is fully contained within the Non-Discrete Time Axis Rule 1910. However, a neighboring Time Axis Cell 2050 corresponding to Jun. 24, 2017 is only expanded by 150%, since the Finish Time 1940 of the Non-Discrete Time Axis Rule 1910 is set to end earlier at Jun. 24, 2017 12:00:00 PM, compared to the Time Axis Cell 2050 ending on Jun. 24, 2017 11:59:59 PM, twelve hours later. To calculate the new width of the Time Axis Cell 2050, the first twelve-hour Timespan 2025 from Jun. 24, 2017 12:00:00 AM to 11:59:59 AM is computed based on the Zoom Factor 1920 of 200%. The second Timespan 2027 from Jun. 24, 2017 12:00:00 PM to 11:59:59 PM remains at 100%. Therefore, the width of Time Axis Cell 2050 is computed by adding the widths of the Non-Linear Timespan 2025 (0.5 days×2 centimeters×200%), and the Normal Timespan 2027 (0.5 days×2 centimeters×100%), for a total of 3 centimeters, which equates to 150% of the Nominal Day Width 190 of 2 centimeters.

The overall width of the Time Axis 108 is then re-computed by adding the widths of the Normal Timespan 540 (10 days×2 centimeters), the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), the Normal Timespan 2010 (5 days×2 centimeters×100%), the Non-Linear Timespan 2020 (1 day×2 centimeters×200%), the Non-Linear Timespan 2025 (0.5 days×2 centimeters×200%), the Normal Timespan 2027 (0.5 days×2 centimeters×100%), and the Normal Timespan 2030 (13 days×2 centimeters×100%), for a total width of width of 89 centimeters.

The widths and horizontal positions of the Markers 500, 501 and 502 are unchanged. The Marker 503 expands its width due to the expansion of the Time Axis Cells 2040 and 2050. The Marker 504 shifts horizontally to the right to account for the location of the Normal Timespan 2030 in which it is contained.

FIG. 21 illustrates how the user may modify the Time Axis Rule 1910 to hide the Timespans 2020 and 2025 instead of stretching them by changing the Zoom Factor 1920 from 200% to 0%. This change in the Zoom Factor 1920 causes the Timespans 2020 and 2025 to change from Non-Linear Timespans to Discontinuous Timespans.

FIG. 22 illustrates how the Time Axis 108 will appear after the Non-Discrete Time Axis Rule 1910 is modified to have the Zoom Factor 1920 of 0% instead of 200%. The Non-Linear Timespans 2020 and 2025 are now Discontinuous Timespans instead, and their widths are removed from the Time Axis 108.

The Time Axis Cell 2040 corresponding to Jun. 23, 2017 is fully hidden from the Time Axis 108 since it is fully contained within the Non-Discrete Time Axis Rule 1910. However, the neighboring Time Axis Cell 2050 corresponding to Jun. 24, 2017 is 50% hidden, since the Finish Time 1940 of the Non-Discrete Time Axis Rule 1910 is set to end earlier at Jun. 24, 2017 12:00:00 PM, compared to the Time Axis Cell 2050 ending on Jun. 24, 2017 11:59:59 PM, twelve hours later. To calculate the new width of the Time Axis Cell 2050, the first twelve-hour Timespan 2025 from Jun. 24, 2017 12:00:00 AM to 11:59:59 AM is computed based on the Zoom Factor 1920 of 0%. The second Timespan 2027 from Jun. 24, 2017 12:00:00 PM to 11:59:59 PM remains at 100%. Therefore, the width of Time Axis Cell 2050 is computed by adding the widths of the Non-Linear Timespan 2025 (0.5 days×2 centimeters×0%), and the Normal Timespan 2027 (0.5 days×2 centimeters×100%), for a total of 1 centimeter, which is equivalent to 50% of the Nominal Day Width 190 of 2 centimeters.

The overall width of the Time Axis 108 is then re-computed by adding the widths of the Normal Timespan 540 (10 days×2 centimeters), the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), the Normal Timespan 2010 (5 days×2 centimeters×100%), the Discontinuous Timespan 2020 (1 day×2 centimeters×0%), the Discontinuous Timespan 2025 (0.5 days×2 centimeters×0%), the Normal Timespan 2027 (0.5 days×2 centimeters×100%), and the Normal Timespan 2030 (13 days×2 centimeters×100%), for a total width of width of 83 centimeters.

The widths and horizontal positions of the Markers 500, 501, and 502 are unchanged. The Marker 503 reduces its width due to the complete removal of the Time Axis Cell 2040 and reduction in width of the Time Axis Cell 2050. The Marker 504 shifts horizontally to the left to account for the location of the Normal Timespan 2030 in which it is contained.

The user can then use the Cursor Control Device 030 to hover the Cursor 520 over the Non-Discrete Time Axis Rule 1910 and then click to select it. Once the Non-Discrete Time Axis Rule 1910 is selected, the user may click the Delete Rule Button 1700 to delete the Non-Discrete Time Axis Rule 1910. Upon deletion, the Non-Discrete Time Axis Rule 1910 will no longer appear in the Time Axis Configuration Screen 600, and only the Time Axis Rules 610, 810, and 1310 shall remain.

FIG. 23 illustrates how the Time Axis 108 will appear after the Non-Discrete Time Axis Rule 1910 is deleted. The Timespans 2010, 2020, 2025, 2027, and 2030 are merged back together and replaced with the Normal Timespan 550 again. The Time Axis Cell 2040 is unhidden from the Time Axis 108, and both Time Axis Cells 2040 and 2050 have a width equal to the Nominal Day Width 190 of 2 centimeters, since none of the remaining Time Axis Rules 610, 810, or 1310 apply to the Normal Timespan 550.

The overall width of the Time Axis 108 is then re-computed by adding the widths of the Normal Timespan 540 (10 days×2 centimeters), the Non-Linear Timespan 1210 (3 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Non-Linear Timespan 733 (1 day×2 centimeters×150%), and the Normal Timespan 550 (20 days×2 centimeters) for a total width of 86 centimeters.

The widths and horizontal positions of the Markers 500, 501, and 502 are unchanged. The Marker 503 expands its width due to the Time Axis Cells 2040 and 2050 now being equal to the Nominal Day Width 190. The Marker 504 once again shifts horizontally to the right to account for the reintroduction of the Normal Timespan 550 in which it is contained.

FIG. 24 depicts the Time Axis Configuration Screen 600 with a series of Weekday Rules 2410 ("Sunday") and 2470 ("Saturday"). When the user moves the Cursor Control Device 030 over the Weekday Rules 2410 and 2470 and clicks to uncheck each box, the Time Axis 108 will be redrawn to omit each instance of those unchecked days. In this example, the user has created the Weekday Rule 2410 to hide all Sundays from the Time Axis 108 and the second Weekday Rule 2470 to hide all Saturdays from the Time Axis 108.

FIG. 25 shows how the Weekday Rule 2410 ("Sunday") creates a series of Discontinuous Timespans 2516, 2526, 2536, 2546, and 2556 to remove all Sundays from the Time Axis 108. In a similar fashion, the Weekday Rule 2470 ("Saturday") creates a series of Discontinuous Timespans 2515, 2525, 2535, 2545, and 2555 to remove all Saturdays from the Time Axis 108. The Weekday Rules 2410 and 2470 are prioritized higher than all of the Time Axis Rules 610, 810, and 1310.

The Normal Timespan 540 is divided into a series of Normal Timespans 2510 and 2520 to account for the missing space on the Time Axis 108 from the Discontinuous Timespans 2515, 2516, and 2525. The Non-Linear Timespan 1210 is split into the Discontinuous Timespan 2526 and a new Non-Linear Timespan 2530. The Discontinuous Timespan 1220 and the Non-Linear Timespans 1230 and 732 remain unchanged. The Non-Linear Timespan 733 is replaced with the Discontinuous Timespan 2535. The Normal Timespan 550 is split into the Discontinuous Timespan 2536, a Normal Timespan 2540, the Discontinuous Timespans 2546 and 2545, a Normal Timespan 2550, the Discontinuous Timespans 2555 and 2556, and a Normal Timespan 2560.

The width of the Time Axis Cell 510 ("Week 25") is recomputed by summing the widths of the Discontinuous Timespan 2526 (1 days×2 centimeters×0%), the Non-Linear Timespan 2530 (2 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), and the Discontinuous Timespan 2535 (1 day×2 centimeters×0%), for a total width of 20 centimeters.

The overall width of the Time Axis 108 is then re-computed by adding the widths of the Normal Timespan 2510 (2 days×2 centimeters), the Discontinuous Timespans 2515 and 2516 (2 days×2 centimeters×0%), the Normal Timespan 2520 (5 days×2 centimeters), the Discontinuous Timespans 2525 and 2526 (2 days×2 centimeters×0%), the Non-Linear Timespan 2530 (2 days×2 centimeters×150%), the Discontinuous Timespan 1220 (1 day×2 centimeters×0%), the Non-Linear Timespan 1230 (1 day×2 centimeters×150%), the Non-Linear Timespan 732 (1 day×2 centimeters×550%), the Discontinuous Timespans 2535 and 2536 (2 days×2 centimeters×0%), the Normal Timespan 2540 (5 days×2 centimeters), the Discontinuous Timespans 2545 and 2546 (2 days×2 centimeters×0%), the Normal Timespan 2550 (5 days×2 centimeters), the Discontinuous Timespans 2555 and 2556 (2 days×2 centimeters×0%), and the Normal Timespan 2560 (5 days×2 centimeters), for a total width of 64 centimeters.

The Markers 500, 501, 502, 503 and 504 reduce their widths and shift horizontally to the left along the Time Axis 108 due to the addition of the Discontinuous Timespans 2515, 2516, 2525, 2526, 2535, 2536, 2545, 2546, 2555, and 2556. These Discontinuous Timespans are incorporated into a Sample Time-Space Function, by inclusion, as Discontinuous Timespans with Time Slopes of zero, as shown in FIG. 2A.

FIG. 26 shows how the user may use the Cursor Control Device 030 to hover the mouse cursor 520 over a Template Button 2600 and click it to create a new Template 2612 from the settings of the original Project View 104.

The new Template 2612 contains all of the Time Axis Rules 610, 810, and 1310, and Weekday Rules 2410 and 2470, among other settings from the original Project View 104, but does not contain any of the Event Data 100.

FIG. 27 shows a new set of Event Data 2700 which is unrelated to the original Event Data 100.

FIG. 28 and FIG. 29 illustrate the detailed method for creating a new Project View 2900 from the new Event Data 2700 and the Template 2612. One or more sets of Event Data 2700, in this case, project plans, are loaded into the non-transient storage of the computer 102. The Configuration Form 300 is shown again in FIG. 28, and specifies the Template 2612 for the Project View 2900. The Template 2612 provides the initial settings and formatting for a set of new Markers 2901, 2902, 2903, 2904, and 2905, for the Time Axis 2908, and other elements of the Project View 2900.

Because the template 2612 contains all of the Weekday Rules 2410 and 2470 prioritized first, followed by the Time Axis Rules 610, 810, and 1310, the same Timespans 2510, 2515, 2516, 2520, 2525, 2526, 2530, 1220, 1230, 732, 2535, 2536, 2540, 2545, 2546, 2550, 2555, 2556, and 2560 from the original Project View 104 still exist and impact the Drawing Engine's 202 drawing of the Markers 2901, 2902, 2903, 2904, and 2905 along the Time Axis 2908 in the Project View 2900 in accordance with the Event Data 2700.

Should the user decide to delete the Weekday Rules 2410 and 2470, and the Time Axis Rules 610, 810, and 1310, then the Project View 2900 will be redrawn with a single Normal Timespan 3100, and the Markers 2901, 2902, 2903, 2904, and 2905 will be shown at full width (no non-linear or discontinuous sections) as illustrated in FIG. 31.

The Event Data has a set of Percent Complete Data Attributes 2751, 2752, 2753, 2754, and 2755 which indicate how close each Event is to being complete. The user may wish to represent these Percent Complete Data Attributes 2751, 2752, 2753, 2754, and 2755 graphically in the Project View 2900.

FIG. 32 shows how the user can use a Percent Complete Settings Form 3200 to configure a Percent Complete Field Mapping Dropdown 3210 to use a "% Complete" Field 2710 from the Event Data 2700. The Percent Complete Settings Form 3200 also allows the user to select a Percent Complete Bar Color 3220.

The Project View 2900 is then redrawn in FIG. 33 to represent the "% Complete" Field 2710. The Marker "Foxtrot" 2901 is given a Progress Bar 3301, which based on the Percent Complete Data Attribute 2751 of 50%, shades 50% of the normal horizontal width of the Marker 2901 (50%×6 calendar days), giving the Progress Bar 3301 a width of 3 calendar days, or 6 centimeters (3 calendar days×2 centimeters).

The Marker "Golf" 2902 is given a Progress Bar 3302, which based on the Percent Complete Data Attribute 2752 of 100%, shades 100% of the normal horizontal width of the Marker 2902 (100%×19 calendar days), giving the Progress Bar 3302 a width of 19 calendar days or 38 centimeters (19 calendar days×2 centimeters).

The Marker "Hotel" 2903 is given a Progress Bar 3303, which based on the Percent Complete Data Attribute 2753 of 100%, shades 100% of the normal horizontal width of the Marker 2903 (100%×6 calendar days), giving the Progress Bar 3303 a width of 6 calendar days, or 12 centimeters (6 calendar days×2 centimeters).

The Marker "India" 2904 is given a Progress Bar 3304, which based on the Percent Complete Data Attribute 2754 of 75%, shades 75% of the normal horizontal width of the Marker 2904 (75%×12 calendar days), giving the Progress Bar 3304 a width of 9 calendar days, or 18 centimeters (9 calendar days×2 centimeters).

The Marker "Juliet" 2905 is given a Progress Bar 3305, which based on the Percent Complete Data Attribute 2755 of 25%, shades 25% of the normal horizontal width of the Marker 2905 (25%×6 calendar days), giving the Progress Bar 3305 a width of 1.5 calendar days, or 3 centimeters (1.5 calendar days×2 centimeters).

The widths of the Progress Bars 3301, 3302, 3303, 3304 and 3305 need not always be based on calendar days, however. FIG. 34 and FIG. 35 illustrate how the user may use the Cursor Control Device 030 to hover the mouse cursor 520 over a Set Working Times Button 3400 and click it to open a new Working Times Form 3500 that allows the user to define Working Time in the Project View 2900. In most cases, people do not work around the clock. Rather, they work during normal business hours, meaning that there are some days of the week where work is performed (e.g. weekdays) and other days of the week where work is not performed at all (e.g. weekends). Within working days of the week, there are given Working Times. Again, even if Monday is a working day, it is not expected that people will work a full 24-hour shift each Monday. Eight hours with a lunch break is more typical.

In this example, the user may wish to define Working Time as Monday through Friday from 8:00:00 a.m. to 5:00:00 p.m. with a one-hour lunch break between 12:00:00 p.m. and 1:00:00 p.m. To do this, the user would use the cursor 520 to simultaneously select the days Monday, Tuesday, Wednesday, Thursday, and Friday in a Weekday Selection List 3501, and then use a Working Time Rules Grid 3502 to define a Working Time Rule 3510 that sets morning Working Time from 8:00:00 a.m. to 12:00:00 p.m. for those five weekdays, followed by a second Working Time Rule 3520 that sets afternoon Working Time from 12:00:00 p.m. to 5:00:00 p.m. for the same five weekdays. Because Saturday and Sunday were not selected in the Weekday Selection List 3501 and do not have any Working Time Rules defined in the Working Time Rules Grid 3502, these two weekend days are considered entirely Non-Working Time.

FIG. 36 shows how the user may choose to hide all Non-Working Time, which in this case, means weekends and early/late hours on weekdays. On the Time Axis Configuration Screen 600, the user can reinstate the Weekday Rules 2410 and 2470, and use the cursor 520 to enable a Hide Non-Working Times setting 3600 which will create a set of recurring Discontinuous Timespans along the Time Axis 2908 based on the Working Time Rules 3510 and 3520. The user also adjusts the Nominal Day Width 190 from 2 centimeters to 6 centimeters to preserve readability.

FIG. 37 shows a portion of the Project View 2900 and how it is redrawn to account for the removal of all Non-Working Time pertaining to the "Foxtrot" Marker 2901. The overall Time Axis 2908 has a multitude of Timespans, so only the Timespans pertaining to the "Foxtrot" Marker 2901 are shown in FIG. 37 as a simple example. The remainder of the Time Axis 2908 follows the same pattern.

The Time Axis 2908 consists of a Discontinuous Timespan 3700 for the early morning from Jun. 28, 2017 at 12:00:00 a.m. to Jun. 28, 2017 at 7:59:59 a.m., followed by a Normal Timespan 3701 from Jun. 28, 2017 at 8:00:00 a.m. to Jun. 28, 2017 at 11:59:59 a.m., followed by a Discontinuous Timespan 3702 for lunch from Jun. 28, 2017 at 12:00:00 p.m. to Jun. 28, 2017 at 12:59:59 p.m., followed by a Normal Timespan 3703 for Working Time from Jun. 28, 2017 at 1:00:00 p.m. to Jun. 28, 2017 at 4:59:59 p.m., followed by a Discontinuous Timespan 3704 for late evening from Jun. 28, 2017 at 5:00:00 p.m. to Jun. 28, 2017 at 11:59:59 p.m., followed by a Discontinuous Timespan 3710 for the early morning from Jun. 29, 2017 at 12:00:00 a.m. to Jun. 29, 2017 at 7:59:59 a.m., followed by a Normal Timespan 3711 from Jun. 29, 2017 at 8:00:00 a.m. to Jun. 29, 2017 at 11:59:59 a.m., followed by a Discontinuous Timespan 3712 for lunch from Jun. 29, 2017 at 12:00:00 p.m. to Jun. 29, 2017 at 12:59:59 p.m., followed by a Normal Timespan 3713 for Working Time from Jun. 29, 2017 at 1:00:00 p.m. to Jun. 29, 2017 at 4:59:59 p.m., followed by a Discontinuous Timespan 3714 for late evening from Jun. 29, 2017 at 5:00:00 p.m. to Jun. 29, 2017 at 11:59:59 p.m., followed by a Discontinuous Timespan 3720 for the early morning from Jun. 30, 2017 at 12:00:00 a.m. to Jun. 30, 2017 at 7:59:59 a.m., followed by a Normal Timespan 3721 from Jun. 30, 2017 at 8:00:00 a.m. to Jun. 30, 2017 at 11:59:59 a.m., followed by a Discontinuous Timespan 3722 for lunch from Jun. 30, 2017 at 12:00:00 p.m. to Jun. 30, 2017 at 12:59:59 p.m., followed by a Normal Timespan 3723 for Working Time from Jun. 30, 2017 at 1:00:00 p.m. to Jun. 30, 2017 at 4:59:59 p.m., followed by a Discontinuous Timespan 3724 for late evening from Jun. 30, 2017 at 5:00:00 p.m. to Jun. 30, 2017 at 11:59:59 p.m., followed by a Discontinuous Timespan 3730 for the weekend (Saturday) from Jul. 1, 2017 at 12:00:00 a.m. to Jul. 1, 2017 at 11:59:59 p.m., followed by a Discontinuous Timespan 3740 for the weekend (Sunday) from Jul. 2, 2017 at 12:00:00 a.m. to Jul. 2, 2017 at 11:59:59 p.m., followed by a Discontinuous Timespan 3750 for the early morning from Jul. 3, 2017 at 12:00:00 a.m. to Jul. 3, 2017 at 7:59:59 a.m., followed by a Normal Timespan 3751 from Jul. 3, 2017 at 8:00:00 a.m. to Jul. 3, 2017 at 11:59:59 a.m., followed by a Discontinuous Timespan 3752 for lunch from Jul. 3, 2017 at 12:00:00 p.m. to Jul. 3, 2017 at 12:59:59 p.m., followed by a Normal Timespan 3753 for Working Time from Jul. 3, 2017 at 1:00:00 p.m. to Jul. 3, 2017 at 4:59:59 p.m., followed by a Discontinuous Timespan 3754 for late evening from Jul. 3, 2017 at 5:00:00 p.m. to Jul. 3, 2017 at 11:59:59 p.m. These Discontinuous Timespans are incorporated into a Sample Time-Space Function, by inclusion, as Discontinuous Timespans with Time Slopes of zero, as shown in FIG. 2A.

The Progress Bar 3301 is still three calendar days (6 centimeters) wide, which equates to 50% of the normal six calendar day (12 centimeter) width of the Marker 2901. However, because two calendar days of the Marker 2901 (Saturday, Jul. 1, 2017 and Sunday, Jul. 2, 2017) are hidden by the Discontinuous Timespans 3730 and 3740, but no calendar days of the Progress Bar 3301 are hidden by the same Discontinuous Timespans 3730 and 3740, the width of the Marker 2901 is reduced to four calendar days (8 centimeters), while the width of the Progress Bar 3301 remains the same at three calendar days (6 centimeters). The resulting Project View 2900 therefore displays a Progress Bar 3301 width that appears to be 75% of the width of the Marker 2901 (6 centimeters divided by 8 centimeters) even though the Percent Complete Data Attribute 2751 remains at 50%. This occurrence is a drawback of using Percent Complete in conjunction with showing only working time, so there is an alternative discussed in the next figure.

FIG. 38 shows how the Percent Complete Field Mapping Dropdown 3210 can be changed to only consider Working Time when drawing the Progress Bars 3301, 3302, 3303, 3304 and 3305 based on the "% Complete" Field 2710.

Taking the Progress Bar 3301 as an example, it is already known that the Percent Complete Data Attribute 2751 is 50%. Previously, this had been calculated as 50% of the six calendar day width of the Marker 2901, with a resulting width of three calendar days for the Progress Bar 3301. With the change of the Percent Complete Field Mapping Dropdown 3210 to only consider Working Time, the days of Saturday, July $1^{st}$ and Sunday July $2^{nd}$ can be subtracted from the width of the Marker 2901 due to the fact that neither of the only two Working Time Rules 3510 and 3520 in the Working Time Rules Grid 3502 define any Working Time on Saturdays or Sundays. The width of the Marker 2901 is therefore reduced from six calendar days (Wednesday, Jun. 28, 2017 through Monday, Jul. 3, 2017) to four working days: Wednesday, Jun. 28, 2017, Thursday, Jun. 29, 2017, Friday, Jun. 30, 2017, and Monday, Jul. 3, 2017, for a total width of 8 centimeters (4 days×2 centimeters). The width of the Progress Bar 3301 is then taken to be 50% of four working days, for a total of two working days, or 4 centimeters (2 days×2 centimeters) in width. FIG. 39 shows the redrawn Progress Bar 3301 with the revised width.

The user can then disable the Hide Non-Working Times setting 3600, disable the Weekday Rules 2410 and 2470, and reset the Nominal Day Width 190 from 6 centimeters back to 2 centimeters, as it was originally configured. This will convert the entire Time Axis 2908 back into the single Normal Timespan 3100, as shown in FIG. 40.

Due to the addition of Non-Working time back to the Time Axis 2908 under Normal Timespan 3100, the width of the "Foxtrot" Marker 2901 expands back to six calendar days, or 12 centimeters wide (6 days×2 centimeters). However, because the Percent Complete Field Mapping Dropdown 3210 is still set to only consider Working Time, the Progress Bar 3301 remains at 2 working days through Jun. 29, 2017, for a width of 4 centimeters (2 days×2 centimeters). Therefore, the Progress Bar 3301 appears to be approximately 33.3% the width of the Marker 2901 (4 centimeters divided by 12 centimeters), even though the Percent Complete Data Attribute 2751 remains set to 50%.

FIG. 41 depicts a new Time Axis Rule 4110 resulting from the user's creation of a Non-Linear Timespan 4220. The Time Axis Rule 4110 specifies a Start Time 4130 (Jun. 29, 2017 12:00:00 AM) and a Finish Time 4140 (Jun. 29, 2017 11:59:59 PM) of the Non-Linear Timespan 4220 and also specifies a Zoom Factor 4120 of 900%.

FIG. 42 shows how the Normal Timespan 3100 is replaced with a Normal Timespan 4210 which is 56 centimeters in width (28 days×2 centimeters), the Non-Linear Timespan 4220 which is 18 centimeters in width (1 day×2 centimeters×900%), and another Normal Timespan 4230 which is 16 centimeters in width (8 days×2 centimeters), giving the Time Axis 2908 a total width of 90 centimeters.

The "Foxtrot" Marker 2901 expands its width to account for the added space in the Non-Linear Timespan 4220. The width of the Marker 2901 is computed by adding the width of a Time Axis Cell 4251 corresponding to Jun. 28, 2017 (1 day×2 centimeters), plus the width of a Time Axis Cell 4252 corresponding to Jun. 29, 2017 (1 day×2 centimeters× 900%), plus the Nominal Day Widths 190 of a set of Time Axis Cells 4253, 4254, 4255, and 4256 each corresponding to one of the four days of Jun. 30, 2017 through Jul. 3, 2017, (4 total days×2 centimeters), resulting in a total width of 28 centimeters over the six calendar days for the Marker 2901.

By comparison, the Progress Bar 3301 also expands. The Progress Bar 3301 still begins on the Time Axis Cell 4251 for Jun. 28, 2017 (1 day×2 centimeters) and ends after two working days on the Time Axis Cell 4252 for Jun. 29, 2017 (1 day×2 centimeters×900%), meaning that the total width for the Progress Bar 3301 is calculated as 20 centimeters.

Therefore, the Progress Bar 3301 appears to be approximately 71.4% the width of the Marker 2901 (20 centimeters divided by 28 centimeters), even though the Percent Complete Data Attribute 2751 remains set to 50%.

FIG. 42 also illustrates how a user may move the Cursor Control Device 030 to hover the Cursor 520 over the Time Axis 2908. When the user right-clicks the Cursor Control Device 030 over the Time Axis 2908, the Context Menu 1120 appears with an Equalize Control 4270, which enables the user to set all Time Axis Cells along the Time Axis 2908 to a constant width. This equalization is computed by dividing the number of days along the Time Axis 2908, currently 37 days, into the total width of the Time Axis 2908, which is 90 centimeters, due to the Non-Linear Timespan 4220. This calculation removes the Non-Linear Timespan 4220, and the associated Time Axis Rule 4110, and then resets the Nominal Day Width 190 to approximately 2.43 centimeters (37 days divided by 90 centimeters).

The Timespans 4210, 4220, and 4230 are removed, and the earlier Normal Timespan 3100 is restored to encompass the entire Time Axis 2908 with a width of 90 centimeters (37 days×~2.43 cm). The Markers 2901, 2902, 2903, 2904, and 2905 are resized along with the respective Progress Bars 3301, 3302, 3303, 3304, and 3305 in accordance with the Normal Timespan 3100.

Advantages

From the description above, a number of advantages of the described embodiment become evident. It is to be appreciated that other embodiments falling within the scope of the claims may not exhibit some or even all of these advantages.

The described embodiment facilitates the creation of project timelines using a standard set of visual characteristics stored in Templates, saving project managers considerable time compared to the process of manually configuring a common visual standard.

Time Axis Rules, Weekday Rules, and Working Time Rules can all be utilized to create consistent reporting across different projects, and providing for clear communication between project managers and key stakeholders. These rules eliminate the need for project managers to manually adjust the settings on their time axis for each report. Rather, project managers can invest the time to set up a standard layout for the time axis in one timeline, and then replicate that standard across multiple unrelated timelines, saving considerable effort, reducing the room for errors and inconsistencies.

CONCLUSION, RAMIFICATIONS, AND SCOPE

While the invention has been described and disclosed here in connection with certain embodiments, the description is not intended to limit the invention to the specific disclosed embodiments. Rather, the description is intended to provide an illustration of several exemplary embodiments, and the invention is intended to cover all embodiments and modifications that fall within the spirit and scope of the invention as defined by the appended claims as well as any equivalents thereof.

We claim:

1. A computer-implemented method for representing events in a project as a project view, the method comprising:
providing a computer system including a display, non-transient data storage, a processor; and an input device;
storing event data containing data attributes pertaining to one or more events in the non-transient data storage, the data attributes having data types of at least one of strings, numbers, and dates;
providing a set of time axis rules that create one or more timespans along a time axis on the display, each time axis rule comprising a pair of conditions consisting of both a start time and a finish time, the start time and finish time both defined manually on the display by a user manipulating the input device; each time axis rule also comprising a result consisting of a zoom factor, the zoom factor defined manually on the display by the user manipulating the input devices; and
the processor rendering the time axis in the project view on the display, each timespan on the time axis having a horizontal width determined by a sampled time-space function that evaluates the conditions of each time axis rule and when both conditions of the time axis rule are met, applies the zoom factor of the rule to the timespan on the time axis; and
for each of the one or more events, rendering a marker in the project view along the time axis on the display, the width and horizontal position of each displayed marker being determined based on the width and horizontal position of at least one timespan having times which intersect with the times specified in the data attributes of the corresponding event.

2. The computer-implemented method of claim 1, wherein at least one of the time axis rules creates at least one non-linear timespan along the time axis.

3. The computer-implemented method of claim 1, wherein at least one of the time axis rules creates at least one discontinuous timespan along the time axis.

4. The computer-implemented method of claim 1, wherein each time axis rule includes a priority.

5. The computer-implemented method of claim 4, wherein more than one of the time axis rules may apply to fully or partially-overlapping date ranges, and the priority of each of the time axis rules governs which time axis rule shall create non-linear timespans or discontinuous timespans for the overlapping dates.

6. The computer-implemented method of claim 1, wherein the project view has more than one time axis rule, and each of the time axis rules has a zoom factor, a start time, and a finish time that is different than the other time axis rules, and each of the different time axis rules thereby creates at least one corresponding timespan of a different size and horizontal position along the time axis in accordance with its zoom factor, start time, and finish time.

7. The computer-implemented method of claim 1, wherein the time axis contains at least one time axis cell, and at least one of the time axis rules is a non-discrete time axis rule, and therefore the non-discrete time axis rule has at least one of a start time or a finish time which does not correspond to a left or right edge of the time axis cell on the time axis, and the non-discrete time axis rule creates a non-linear timespan or a discontinuous timespan in accordance with its start time and finish time, causing non-discrete portions of the time axis to be resized or hidden, including a fractional portion of at least one of the time axis cells that are contained within the start time and finish time of the non-discrete time axis rule, while leaving the remaining fractional portions of the same time axis cells that are not contained within the start time and finish time of the non-discrete time axis rule unchanged.

8. The computer-implemented method of claim 1, wherein all non-linear timespans and discontinuous timespans that were previously present are removed, the width of the time axis remains unchanged, and the widths of each of the time axis cells in each of a time axis level is recomputed to a constant defined as the width of the time axis divided by the number of time axis cells in each time axis level.

9. The computer-implemented method of claim 1 further comprising, creating and saving to the non-transient data storage, a template comprising the set of time axis rules, the template being configured for selective use with other project views.

10. A computer system for representing events in a project into a project view, the computer system comprising:
a processor;
a display;
an input device; and
non-transient data storage, the non-transient data storage including (i) machine readable instructions, (ii) event data containing one or more data attributes pertaining to one or more events, the data attributes having data types of at least one of strings, numbers, and dates, and (iii) a set of time axis rules that create one or more timespans along a time axis on the display, each time axis rule comprising a pair of conditions consisting of both a start time and a finish time, the start time and finish time both defined manually on the display by a user manipulating the input device; each time axis rule also comprising a result consisting of a zoom factor, the zoom factor defined manually on the display by the user manipulating the input device, and (iv) the instructions when executed by the processor rendering the time axis in the project view on the display, each timespan on the time axis having a horizontal width determined by a sampled time-space function that evaluates the conditions of each time axis rule and when both conditions of the time axis rule are met, applies the zoom factor of the rule to the timespan on the time axis.

11. The computer system of claim 10, wherein at least one of the time axis rules creates at least one non-linear timespan along the time axis.

12. The computer system of claim 10, wherein at least one of the time axis rules creates at least one discontinuous timespan along the time axis.

13. The computer system of claim 10, wherein the instructions when executed by the processor further cause the computer to define the set of time axis rules specifying relationships between data attributes and the horizontal position and width of the corresponding rendered markers.

14. The computer system of claim 10, wherein the computer system comprises one of a smart phone or a tablet computer.

15. The computer system of claim 10, wherein the user may use the input device to create at least one of a non-linear timespan or a discontinuous timespan, which causes the processor to create a corresponding time axis rule.

16. A non-transitory storage having machine readable instructions stored thereon, the instructions, when executed on a general-purpose computer with a display and an input device cause the computer to:
 (i) receive event data in the form of data attributes pertaining to one or more events of a project, the data attributes having data types of at least one of strings, numbers, and dates;
 (ii) receive a set of time axis rules that create one or more timespans along a time axis in a project view on the display, each time axis rule comprising a pair of conditions consisting of both a start time and a finish time, the start time and finish time both defined manually on the display by a user manipulating the input device; each time axis rule also comprising a result consisting of a zoom factor, the zoom factor defined manually on the display by the user manipulating the input device, and (iii) the instructions when executed by the computer rendering the time axis in the project view on the display, each timespan on the time axis having a horizontal width determined by a sampled time-space function that evaluates the conditions of each time axis rule and when both conditions of the time axis rule are met. applies the zoom factor of the rule to the timespan on the time axis.

\* \* \* \* \*